United States Patent
Antoina et al.

(10) Patent No.: US 9,903,934 B2
(45) Date of Patent: Feb. 27, 2018

(54) APPARATUS AND METHOD OF MEASURING SIX DEGREES OF FREEDOM

(71) Applicant: FARO Technologies, Inc., Lake Mary, FL (US)

(72) Inventors: Mathieu Antoina, Conshohocken, PA (US); Lawrence B. Brown, Cochranville, PA (US); Jonathan R. Day, Wilimington, DE (US); Matthew Frederick Evans, Wyndmoor, PA (US); Ricardo Martins, Chester Springs, PA (US); Jacob J. Mertz, Downingtown, PA (US); John Mountney, Philadelphia, PA (US); Robert Mark Neal, Cochranville, PA (US); James Schloss, Exton, PA (US); Quintin Stotts, Springfiled, PA (US); Ding Wang, Austin, TX (US); Robert E. Bridges, Kennett Square, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 53 days.

(21) Appl. No.: 15/194,914

(22) Filed: Jun. 28, 2016

(65) Prior Publication Data
US 2017/0003372 A1    Jan. 5, 2017

Related U.S. Application Data

(60) Provisional application No. 62/186,447, filed on Jun. 30, 2015, provisional application No. 62/237,299, filed on Oct. 5, 2015.

(51) Int. Cl.
| | |
|---|---|
| G01C 21/02 | (2006.01) |
| G01S 3/786 | (2006.01) |
| G01S 17/66 | (2006.01) |
| G01B 11/00 | (2006.01) |
| G01S 3/783 | (2006.01) |
| G01S 5/16 | (2006.01) |

(52) U.S. Cl.
CPC ............ *G01S 3/786* (2013.01); *G01B 11/002* (2013.01); *G01S 3/783* (2013.01); *G01S 5/163* (2013.01); *G01S 17/66* (2013.01)

(58) Field of Classification Search
CPC .............................. G10C 15/002; G01S 17/66
See application file for complete search history.

(56) References Cited

U.S. PATENT DOCUMENTS

| | | | |
|---|---|---|---|
| 6,667,798 B1 * | 12/2003 | Markendorf | ............ G01S 5/163 356/139.03 |
| 7,327,446 B2 | 2/2008 | Cramer et al. | |

(Continued)

OTHER PUBLICATIONS

International Search Report and Written Opinion for International Application No. PCT/US2016/039932 dated Sep. 29, 2016; 11 pages.

*Primary Examiner* — Thanh Luu
(74) *Attorney, Agent, or Firm* — Cantor Colburn LLP

(57) ABSTRACT

A dimensional measuring device sends a beam of light to a remote probe having a retroreflector and a pitch/yaw sensor. The pitch/yaw sensor passes the light through an aperture and a lens to a position sensor that generates an electrical signal indicative of the position of the received light. A processor uses the electrical signal to determine a pitch angle and a yaw angle of the remote probe.

20 Claims, 71 Drawing Sheets

SIDE VIEW

(56) References Cited

U.S. PATENT DOCUMENTS

| | | |
|---|---|---|
| 7,352,446 B2 | 4/2008 | Bridges et al. |
| 7,701,559 B2 | 4/2010 | Bridges et al. |
| 7,800,758 B1 | 9/2010 | Bridges et al. |
| 8,525,983 B2 | 9/2013 | Bridges et al. |
| 2010/0149525 A1 | 6/2010 | Lau |
| 2013/0155386 A1 | 6/2013 | Bridges |
| 2014/0373369 A1 | 12/2014 | Bockem |
| 2015/0253137 A1 | 9/2015 | Jensen et al. |
| 2016/0187470 A1 | 6/2016 | Becker et al. |

\* cited by examiner

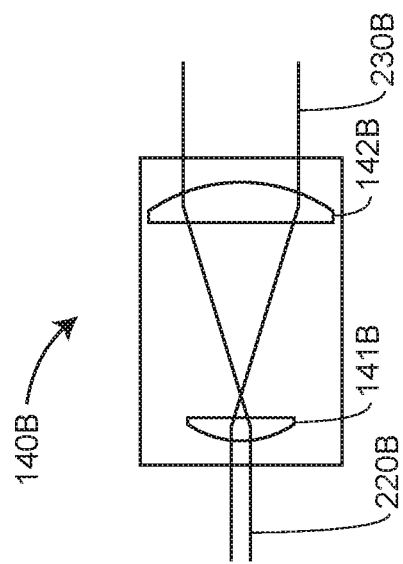
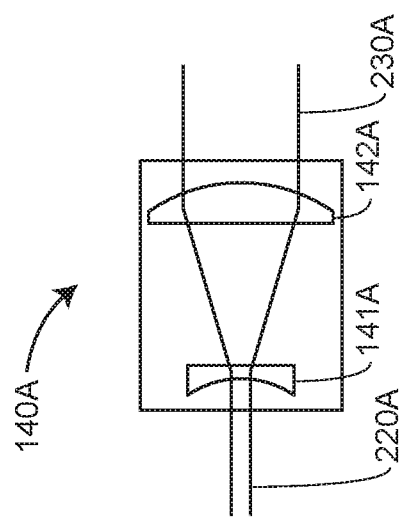
PRIOR ART
FIG. 4B
PRIOR ART
FIG. 4A

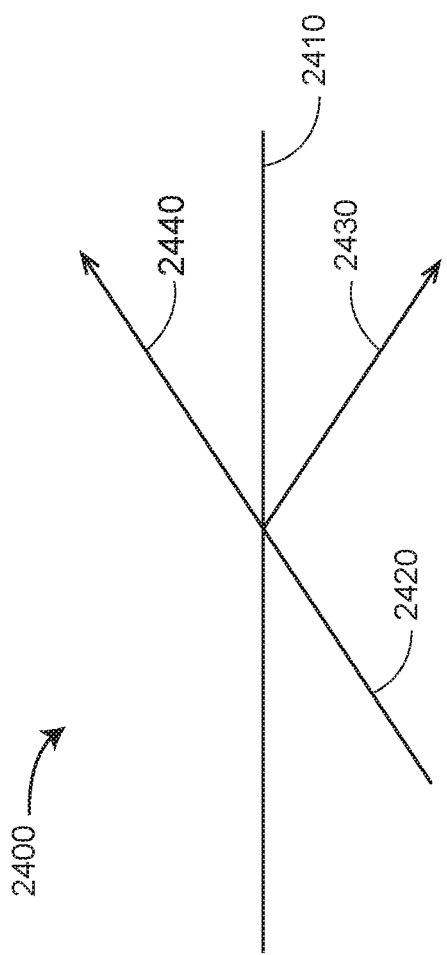

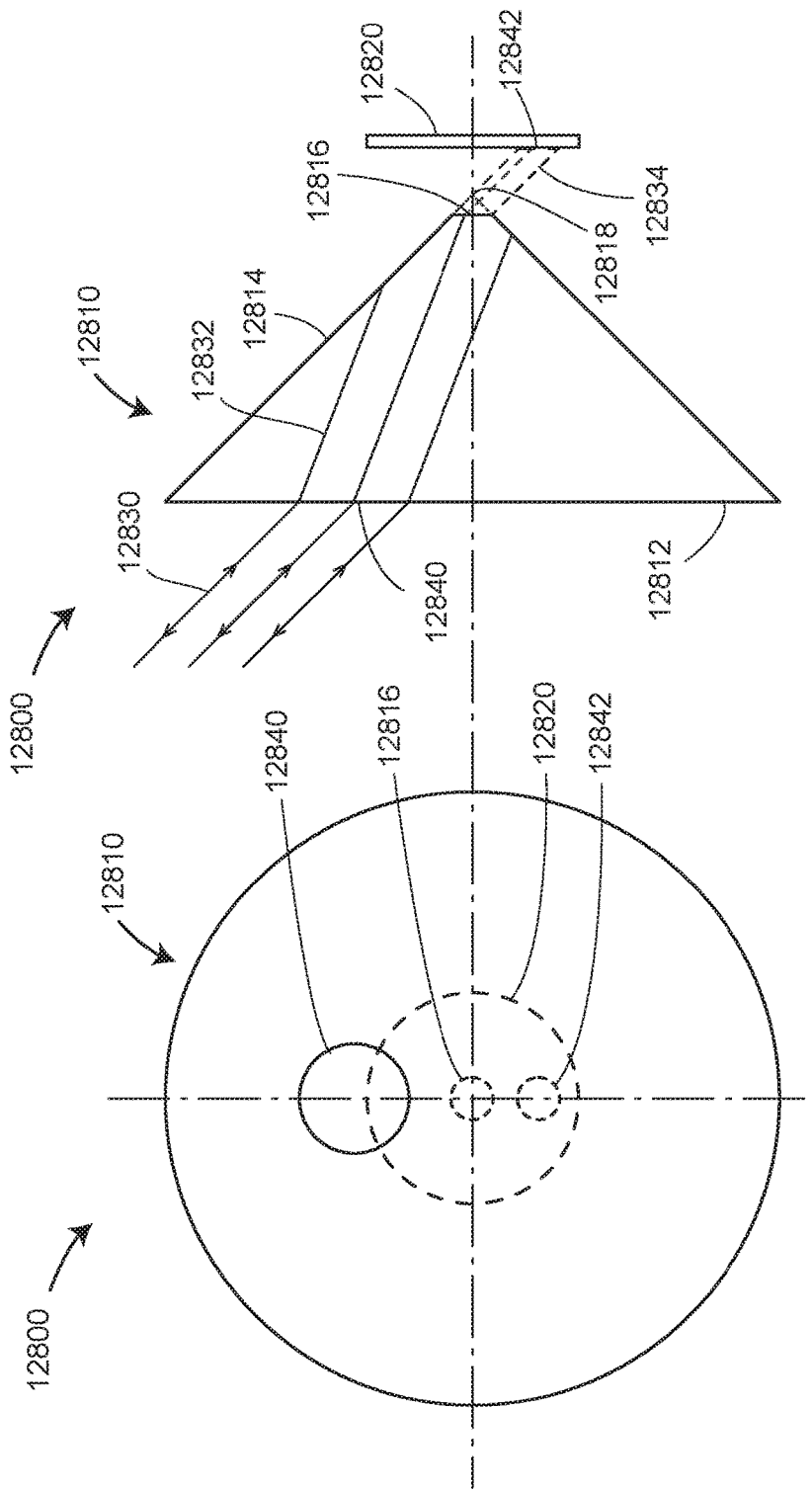

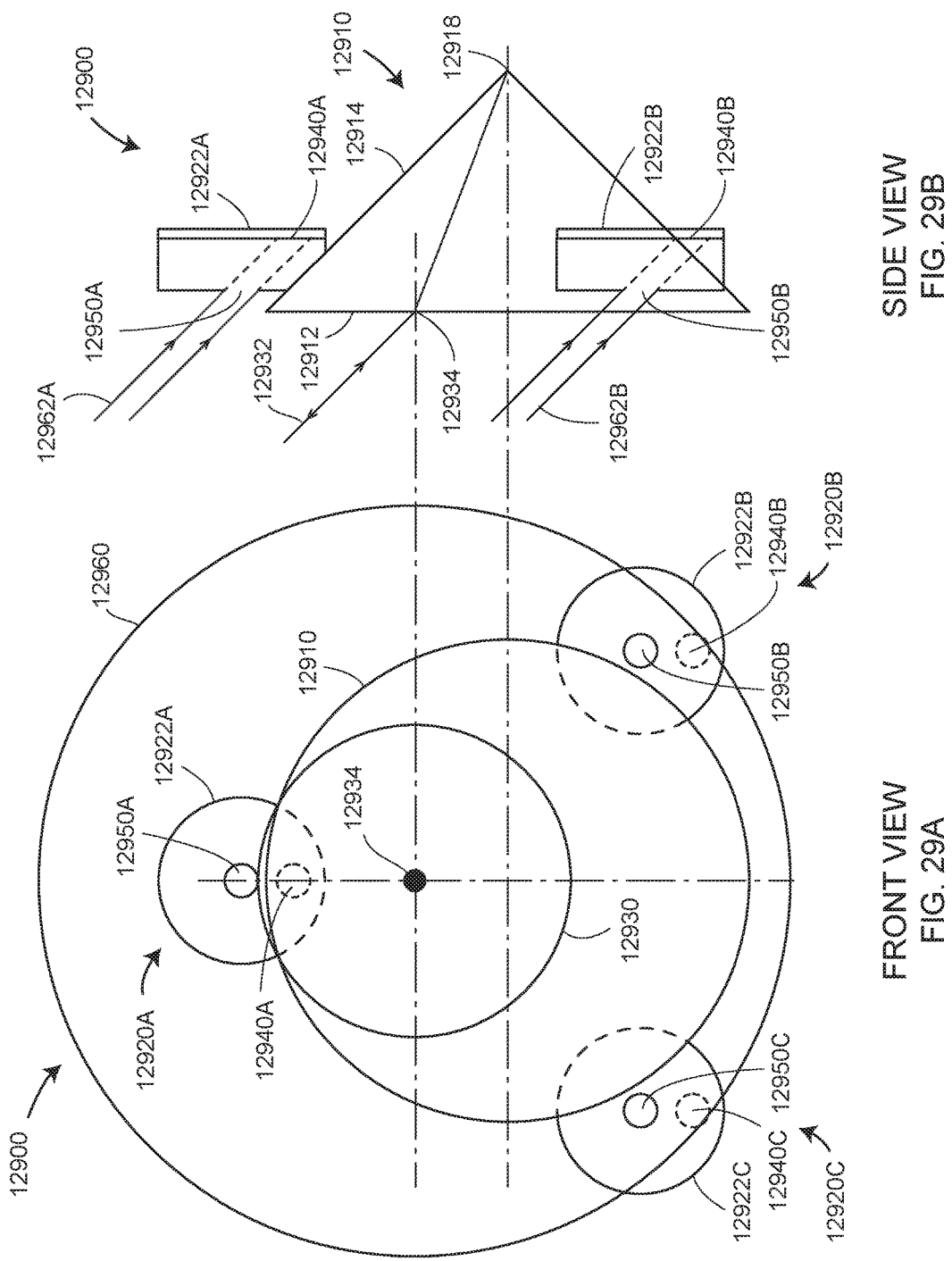

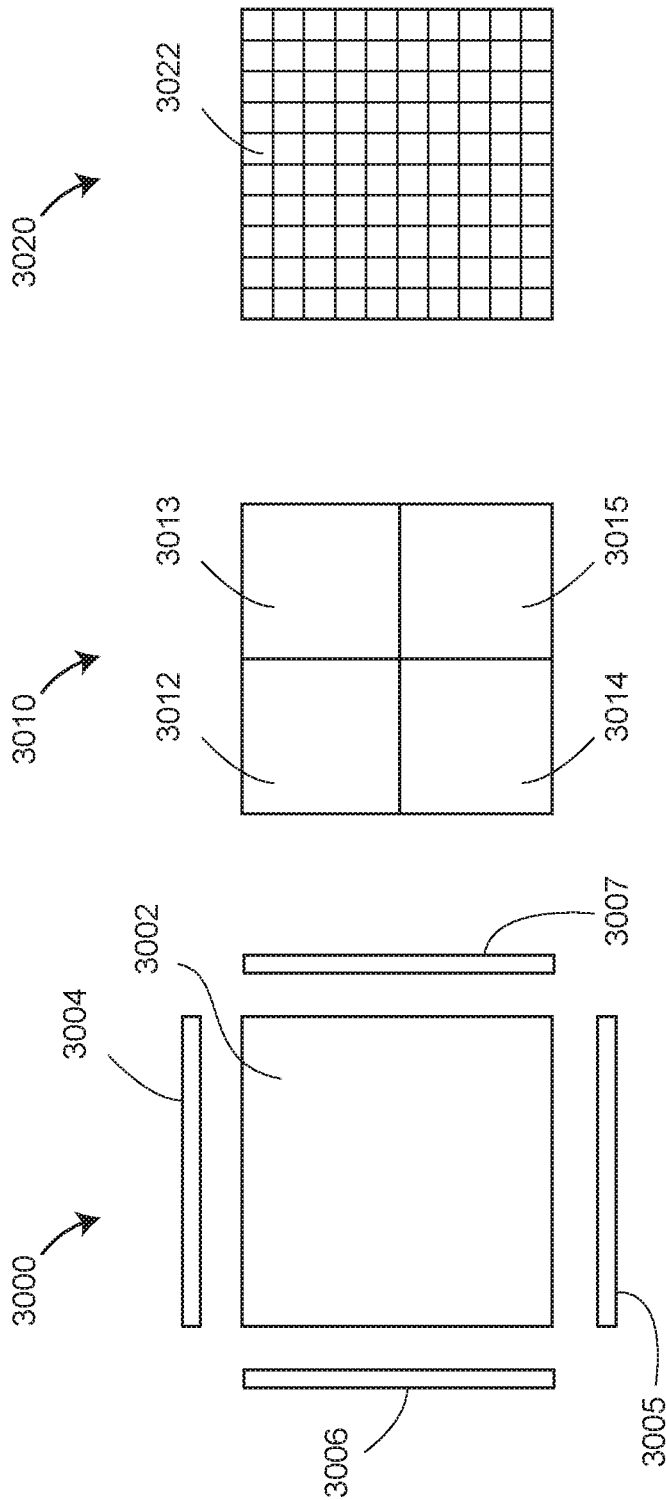

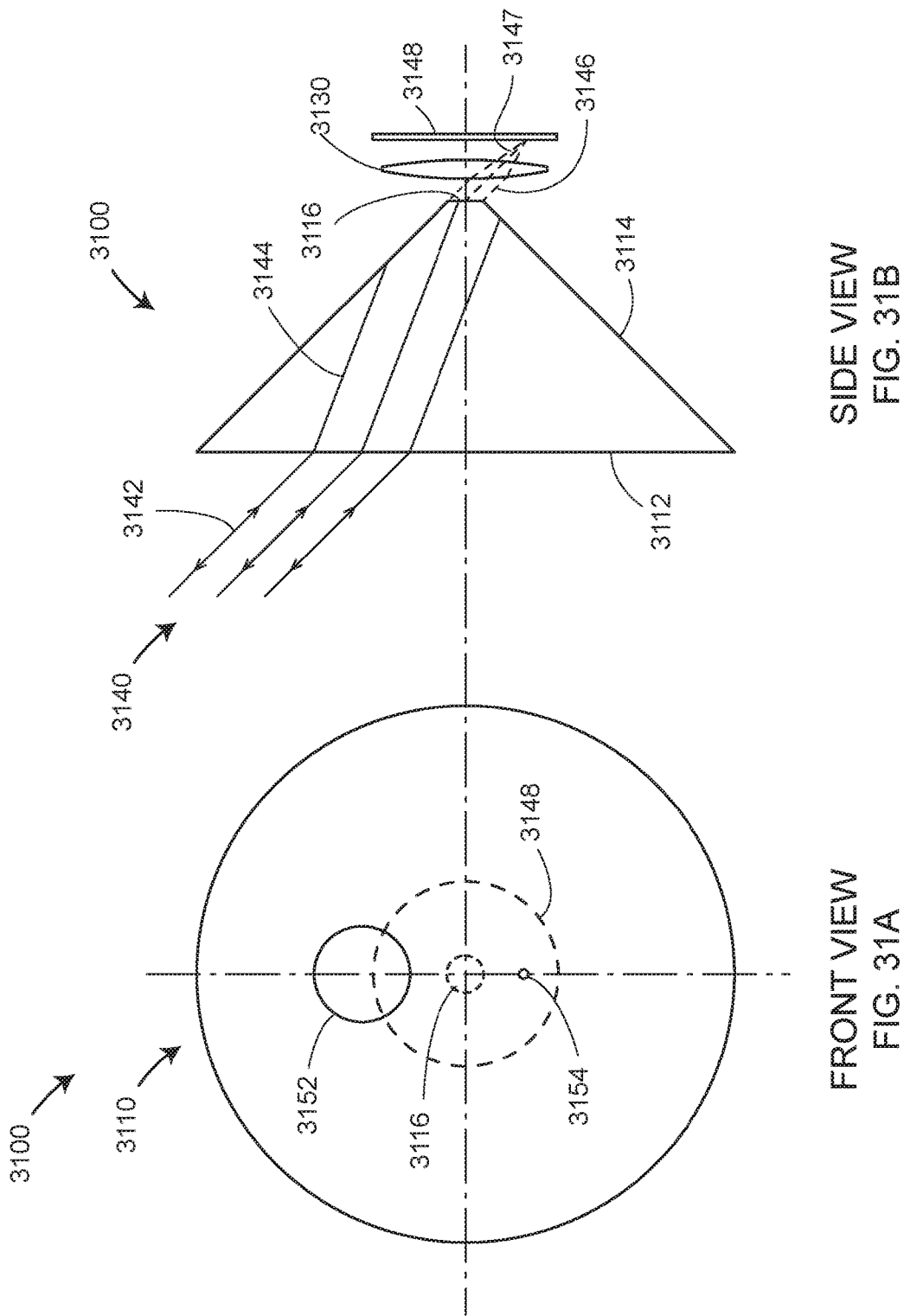

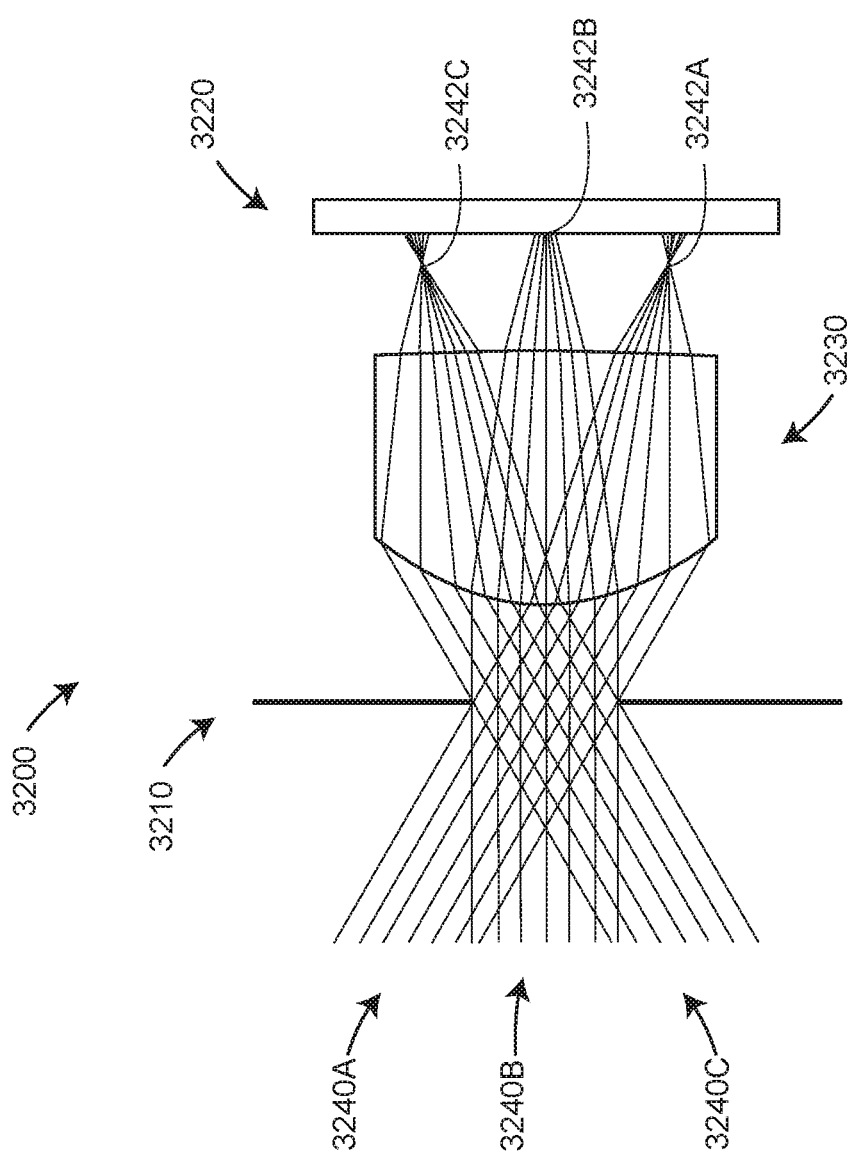

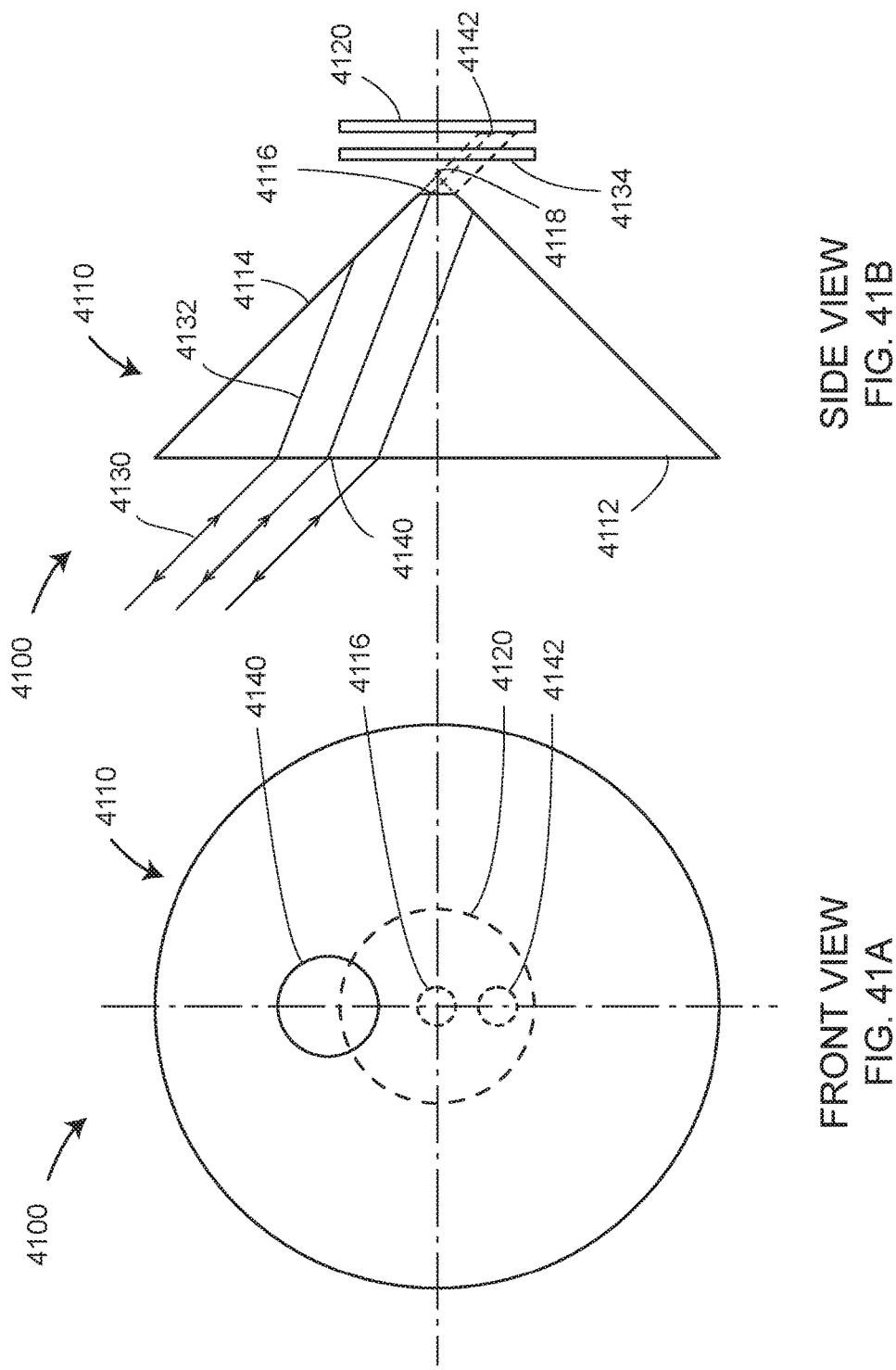

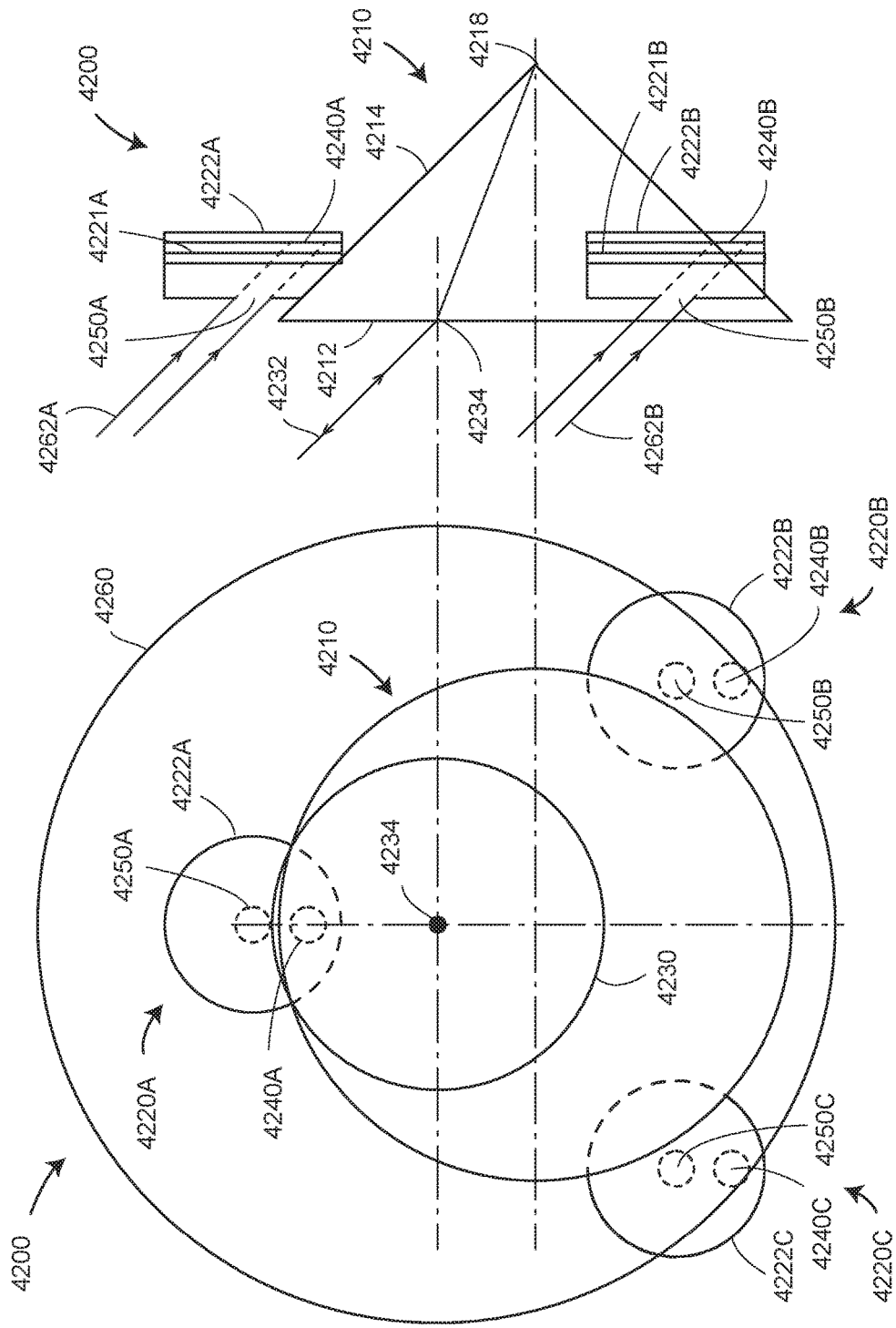

SECTION A-A

SECTION B-B

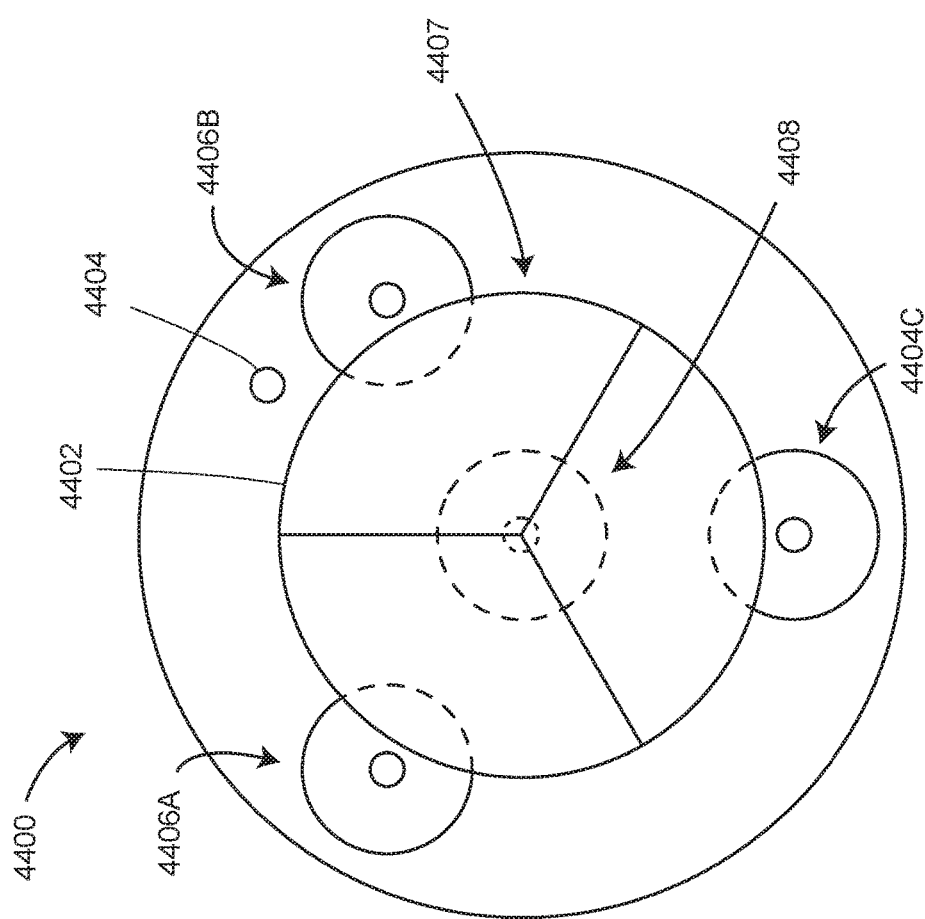

CROSS-SECTION A-A

FRONT VIEW

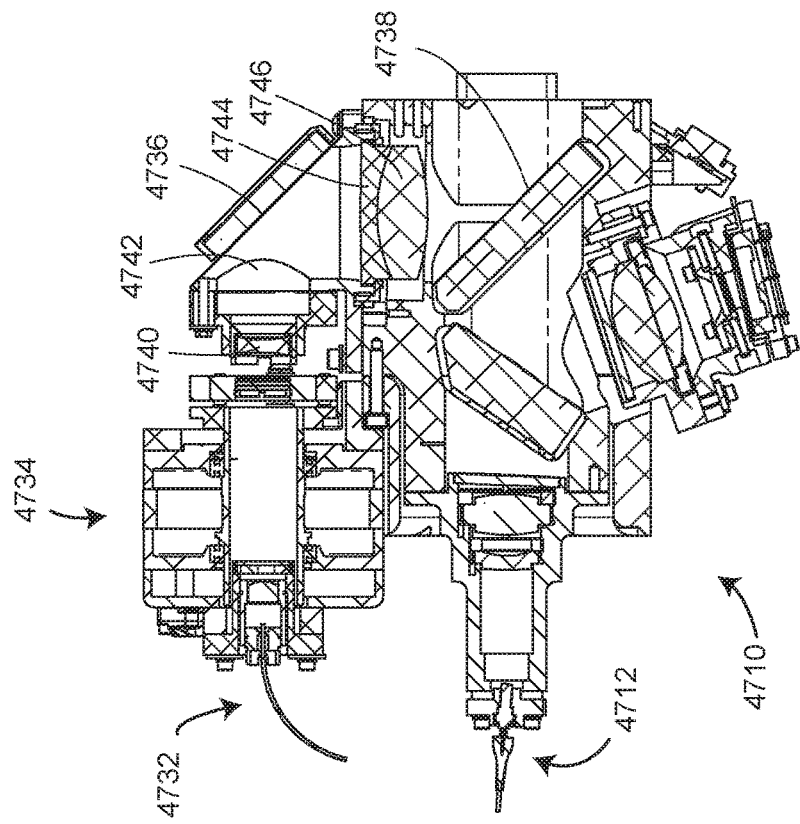
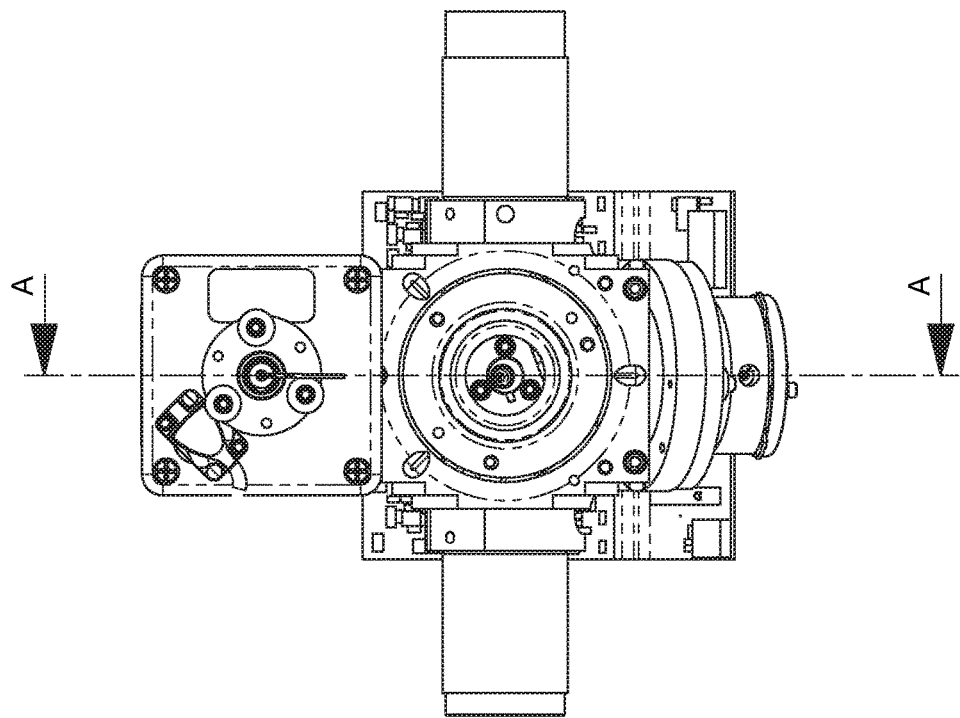
SECTION A-A
FIG. 48B
FIG. 48A

SIDE VIEW

TOP VIEW

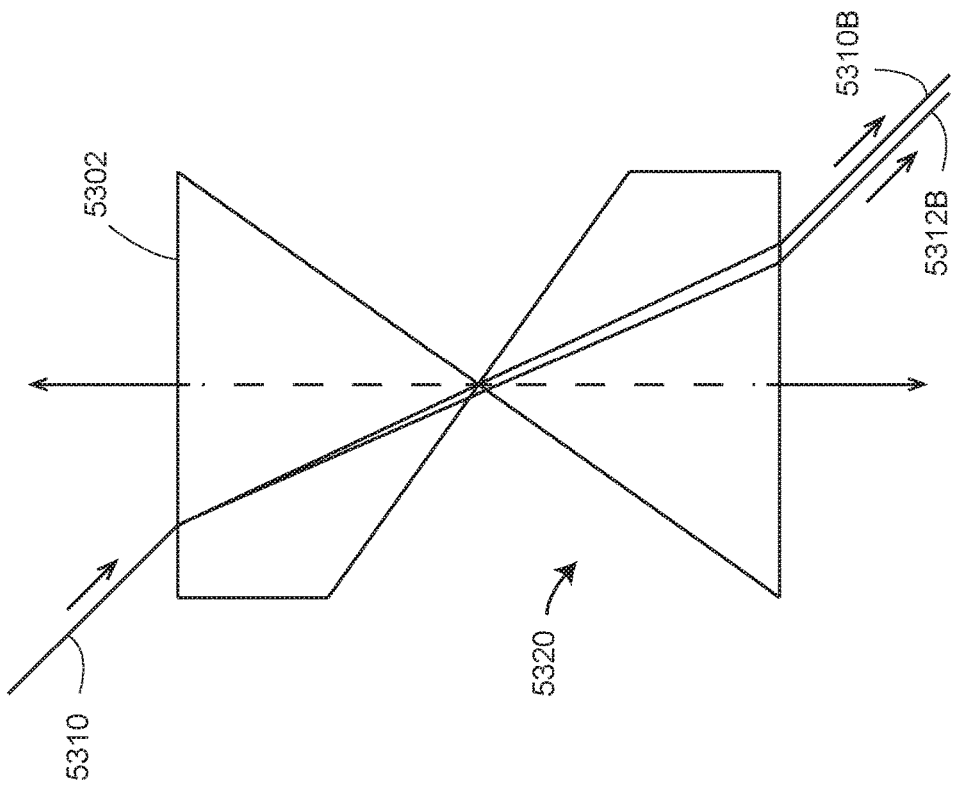
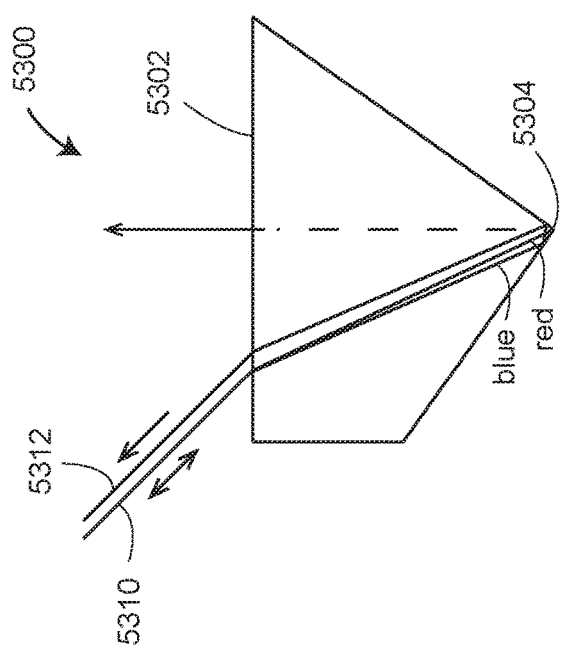

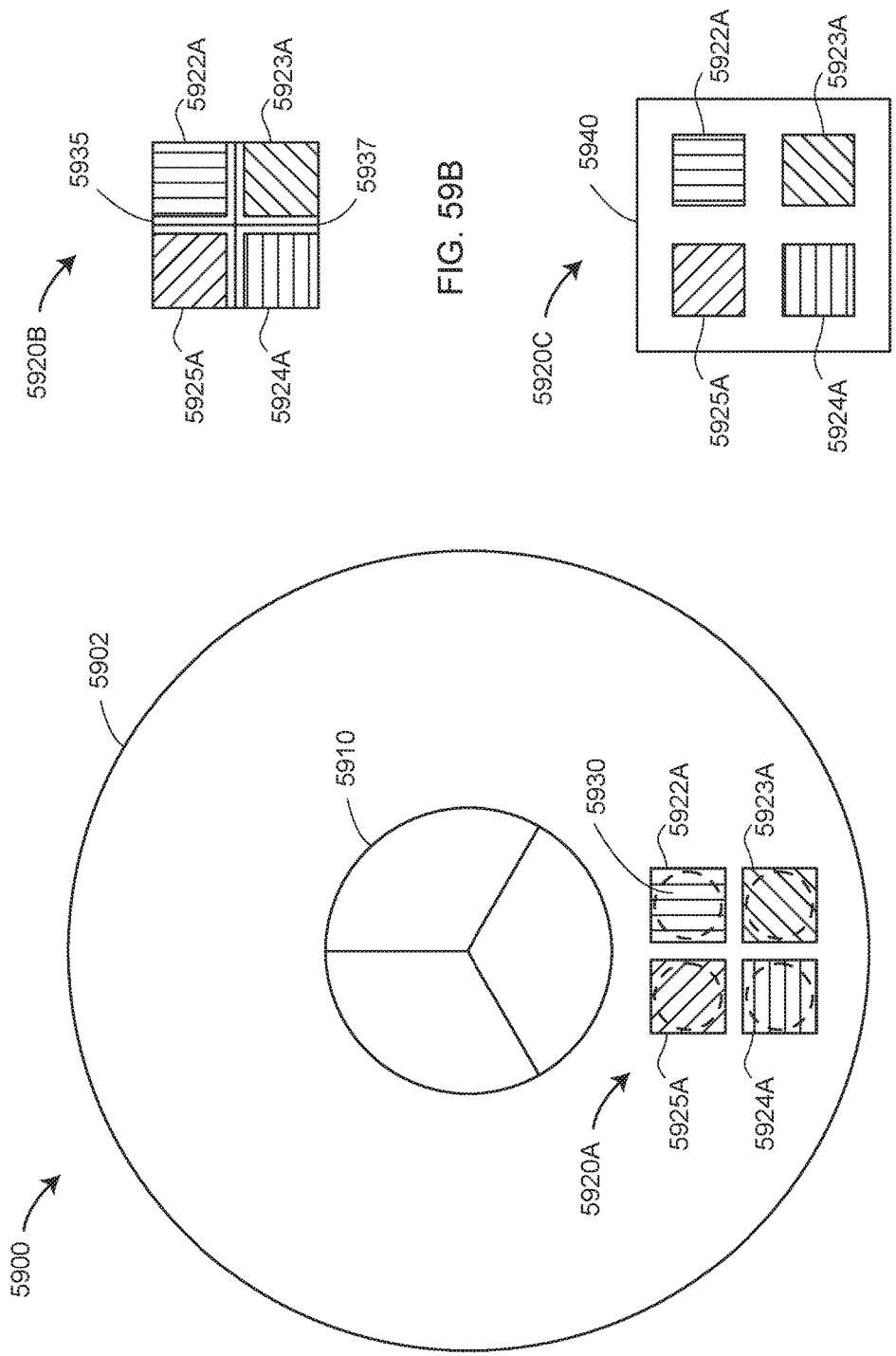

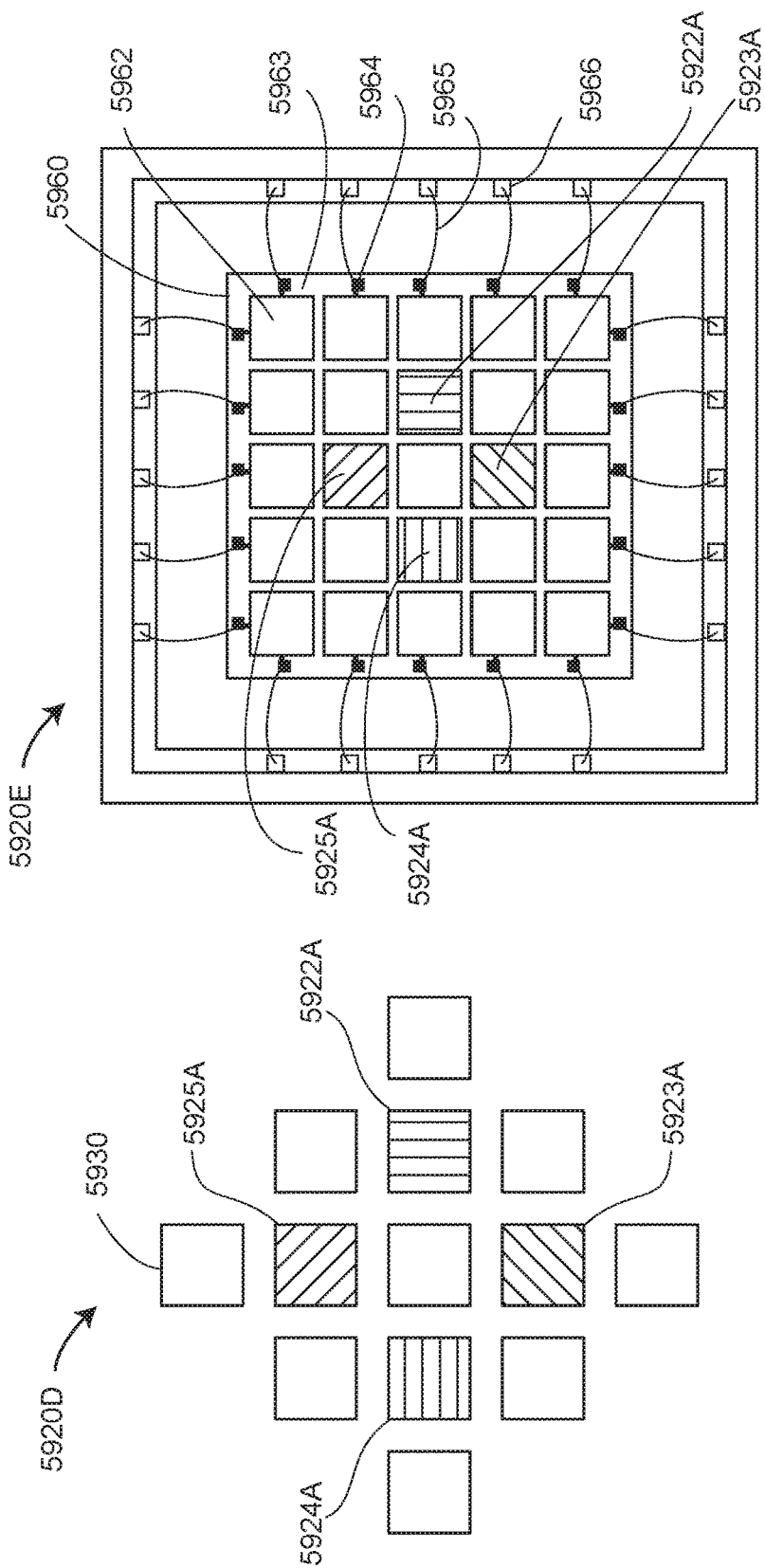

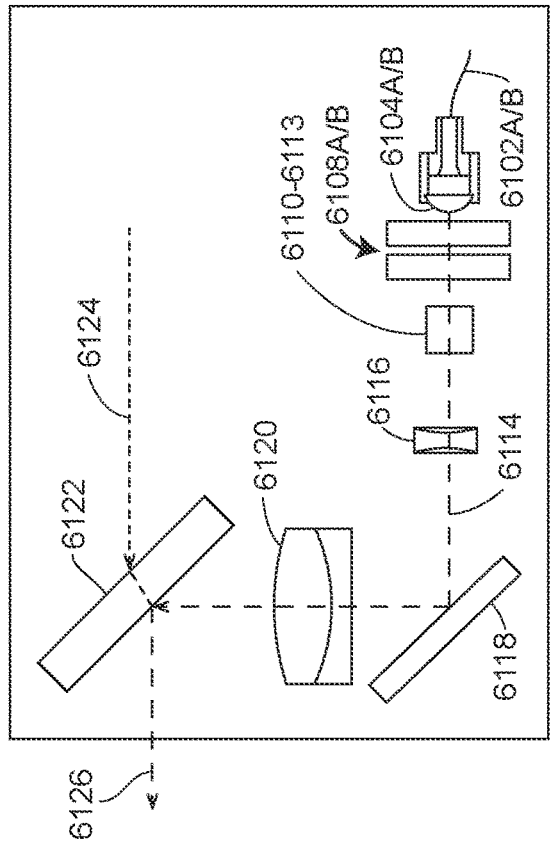
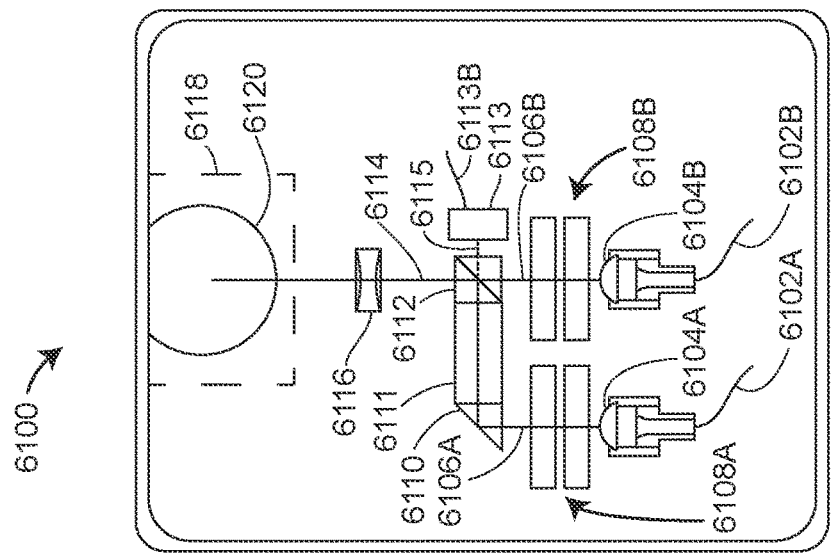
SIDE VIEW
FIG. 61B
TOP VIEW
FIG. 61A

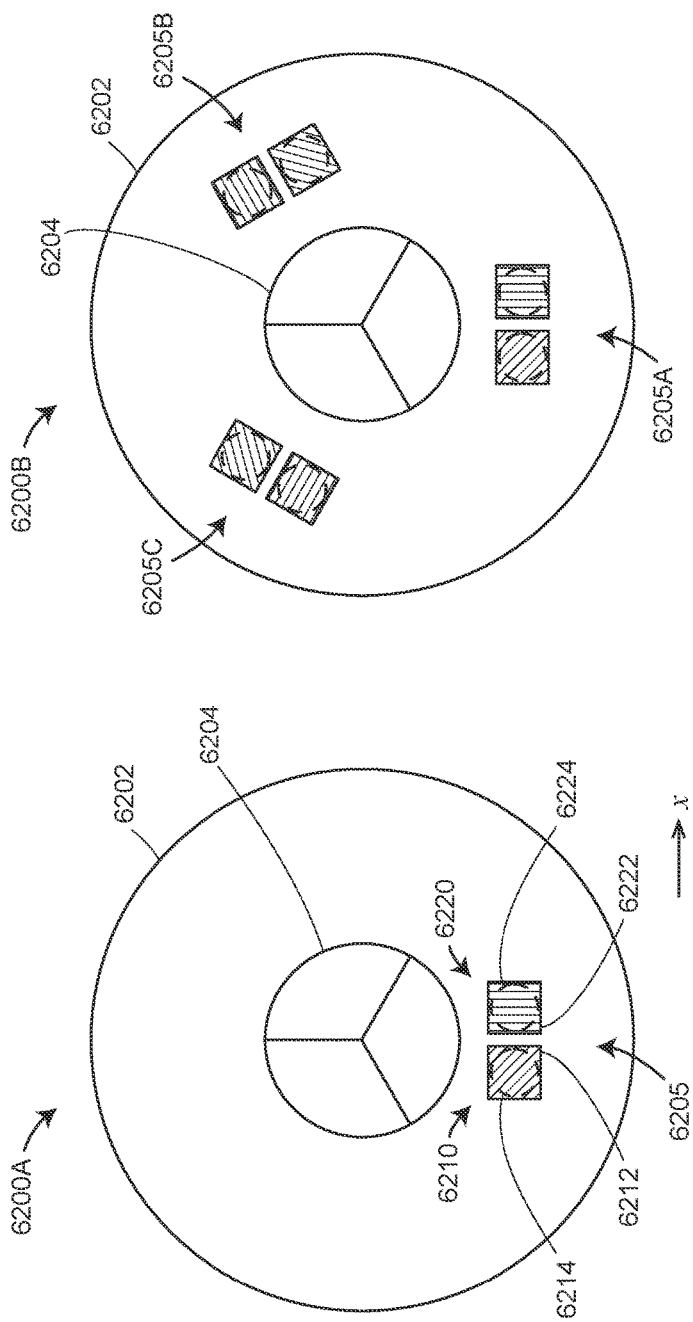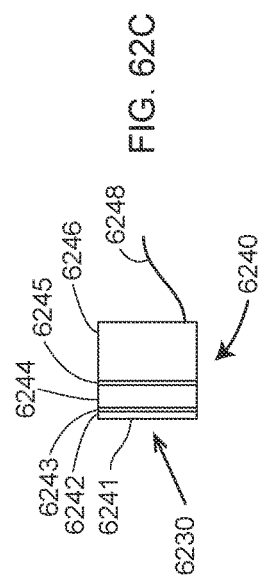

APPARATUS AND METHOD OF MEASURING SIX DEGREES OF FREEDOM

CROSS REFERENCE TO RELATED APPLICATIONS

This application claims the benefit of U.S. Provisional Patent Application No. 62/186,447 filed on Jun. 30, 2015 and U.S. Provisional Patent Application No. 62/237,299, filed on Oct. 5, 2015, the entire contents all of which are incorporated herein by reference in their entirety.

BACKGROUND

The present disclosure relates to a coordinate measuring device having the ability to determine three orientational degrees of freedom, and in particular to a coordinate measuring device cooperates with a device configured to measure three translational degrees of freedom, thereby enabling determination of the position and orientation of a rigid body in space.

Some coordinate measurement devices have the ability to measure the three-dimensional (3D) coordinates of a point (the three translational degrees of freedom of the point) by sending a beam of light to the point. Some such devices send the beam of light onto a retroreflector target in contact with the point. The device determines the coordinates of the point by measuring the distance and the two angles to the target. The distance is measured with a distance-measuring device such as an absolute distance meter (ADM) or an interferometer. The angles are measured with an angle-measuring device such as an angular encoder. The device may include a gimbaled beam-steering mechanism to direct the beam of light to the point of interest.

The laser tracker is a particular type of coordinate-measuring device that tracks the retroreflector target by emitting one or more beams of light. A coordinate-measuring device closely related to the laser tracker is the total station. In many cases, the total station, which is most often used in surveying applications, may be used to measure the coordinates of a retroreflector. Hereinafter, the term "laser tracker" is used in a broad sense to include total stations. It is also understood that the laser tracker may use any type of light source and is not restricted to a laser light source.

Ordinarily the laser tracker sends a beam of light to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors that intersect in a common vertex point. For the case of a "hollow" SMR having reflecting surface in contact with air, the vertex is located at the center of the sphere. Because of this placement of the cube corner within the sphere, the perpendicular distance from the vertex to a surface on which the SMR rests remains constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

One type of laser tracker contains only an interferometer (IFM) without an ADM. If an object blocks the path of the beam of light from one of these trackers, the IFM loses its distance reference. The operator then tracks the retroreflector to a known location to reset to a reference distance before continuing the measurement. A way around this limitation is to also provide an ADM in the tracker. The ADM can measure distance in a point-and-shoot manner, as described in more detail below. Some laser trackers contain only an ADM without an interferometer. U.S. Pat. No. 7,352,446 ('446) to Bridges et al., the contents of which are herein incorporated by reference, describes a laser tracker having only an ADM (and no IFM) that is able to accurately scan a moving target. Prior to the '446 patent, absolute distance meters were too slow to accurately find the position of a moving target.

A gimbal mechanism within the laser tracker may be used to direct the beam of light from the tracker to the SMR. Part of the light retroreflected by the SMR enters the laser tracker and passes onto a position detector. A control system within the laser tracker can use the position of the light on the position detector to adjust the rotation angles of the mechanical axes of the laser tracker to keep the laser beam centered on the SMR. In this way, the tracker is able to follow (track) an SMR that is moved over the surface of an object of interest. The gimbal mechanism used for a laser tracker may be used for a variety of other applications. As a simple example, the laser tracker may be used in a gimbal steering device having a visible pointer beam but no distance meter to steer a light beam to series of retroreflector targets and measure the angles of each of the targets.

Angle measuring devices such as angular encoders are attached to the mechanical axes of the tracker. The one distance measurement and two angle measurements performed by the laser tracker are sufficient to determine the three-dimensional location of the SMR.

Several laser trackers are available or have been proposed for measuring six, rather than the ordinary three, degrees of freedom. Such laser trackers combine measurement of three orientational degrees of freedom with measurement of three translational degrees of freedom to obtain measurement of six degrees of freedom.

A variety of methods have been used or proposed for measuring six degrees of freedom with a laser tracker. These methods usually include measuring three degrees of a retroreflector target by determining a distance and two angles to the retroreflector. In one approach, the three orientational degrees of freedom are determined by measuring the positions of points of light using a camera affixed to the laser tracker. In another approach, an inclinometer pendulum is used in combination with a "leaky" retroreflector to determine the three orientational degrees of freedom. In another approach, marks on a cube-corner retroreflector are imaged by a camera affixed to the laser tracker to determine the three orientational degrees of freedom.

Although each of these methods of measuring six degrees of freedom with are laser tracker are suitable for the intended purpose, each has certain shortcomings in terms of product cost and flexibility of operation. What is needed is a method of measuring six degrees of freedom with a laser tracker that overcomes these limitations.

SUMMARY OF THE INVENTION

According to one embodiment of the invention, a system includes: a dimensional measuring device having a light projecting unit, a steering unit, and a tracking unit, the light projecting unit configured to project a first beam of light having a first wavelength and a second beam of light having a second wavelength, the first beam of light being collinear with the first beam of light, the tracking unit configured to steer the first beam of light to a retroreflector; a remote probe having the retroreflector, a pitch/yaw sensor, and a body, the retroreflector and the pitch/yaw sensor coupled to the body, the pitch/yaw sensor including an aperture, a lens, and a position sensor, the pitch/yaw sensor configured to receive a first portion of the second beam of light through the aperture and to pass the first portion through the lens onto the position sensor, the position sensor being an optical detector configured to produce a first electrical signal indicative of position of received light on the detector; and a processor configured to determine a pitch angle and a yaw angle based at least in part on the first electrical signal.

According to another embodiment of the invention, a method is provided. The method comprising: A method comprising: providing a dimensional measuring device, a remote probe, and a processor, the dimensional measuring device configured to project a first beam of light having a first wavelength and a second beam of light having a second wavelength, the second beam of light being collinear to the first beam of light, the remote probe having a body coupled to a retroreflector and a pitch/yaw sensor, the pitch/yaw sensor having an aperture, a lens and an position sensor, the position sensor being a first optical detector configured to produce an electrical signal indicative of position of received light on the first optical detector; projecting the first beam of light onto the retroreflector and the second beam of light onto the pitch/yaw sensor; passing a portion of the second beam of light through the aperture and the lens onto the position sensor and generating a first electrical signal in response; and determining with the processor a pitch angle and a yaw angle of the remote probe based at least in part on the first electrical signal.

These and other advantages and features will become more apparent from the following description taken in conjunction with the drawings.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 4A and FIG. 4B shows two types of prior art afocal beam expanders;

FIG. 21 is a drawing showing a method of evaluation optical reflections;

FIGS. 28A, 28B is a schematic drawing of a target that passes light to a position detector for determining pitch/yaw angles;

FIGS. 29A, 29B show front and side views, respectively, that schematically illustrate determining pitch/yaw angles using three position detectors peripheral to the retroreflector according to an embodiment;

FIGS. 30A, 30B, and 30C illustrate three types of position detectors that may be used according to an embodiment;

FIG. 31A and FIG. 31B are front and side views, respectively, that schematically represent using a lens to focus light from an aperture onto a position detector to reduce noise according to an embodiment;

FIG. 32 illustrates using a lens to measure light through an aperture according to an embodiment;

FIG. 41A and FIG. 41B are schematic representations of rotating linearly polarized light passing through a cube corner prism and polarizer onto a detector to determine roll angle of the prism according to an embodiment;

FIG. 42A and FIG. 42B show a cube corner retroreflector surrounded by three polarization-roll detectors used to measure roll angle according to an embodiment;

FIG. 44 illustrates three sensors, either polarization roll sensors or pitch/yaw sensors surrounding a retroreflector combined with the complementary pitch/yaw sensor or polarization roll sensor positioned to capture light passed through the retroreflector according to an embodiment;

FIG. 48A and FIG. 48B are top and cross-sectional views, respectively, of components internal to a six-DOF laser tracker according to an embodiment;

FIG. 53A illustrates the separation produced in reflected light for two different wavelengths of light incident on a retroreflector according to an embodiment;

FIG. 53B illustrates a mathematically equivalent path followed by the two different wavelengths of light;

FIG. 59A is a schematic representation of a retroreflector 5910 in combination with a roll sensor 5920A according to an embodiment;

FIGS. 59B-59F are schematic representations of roll sensors, each including linear polarizers in a prescribed arrangement according to embodiments;

FIG. 61A and FIG. 61B are top and side views, respectively, of elements in a secondary optical path of a laser tracker according to an embodiment;

FIG. 62A and FIG. 62B are front views of six-DOF sensors that include a retroreflector and roll sensors according to an embodiment;

FIG. 62C is a cross-sectional view of a roll-sensor component according to an embodiment;

DETAILED DESCRIPTION

Figure 1:
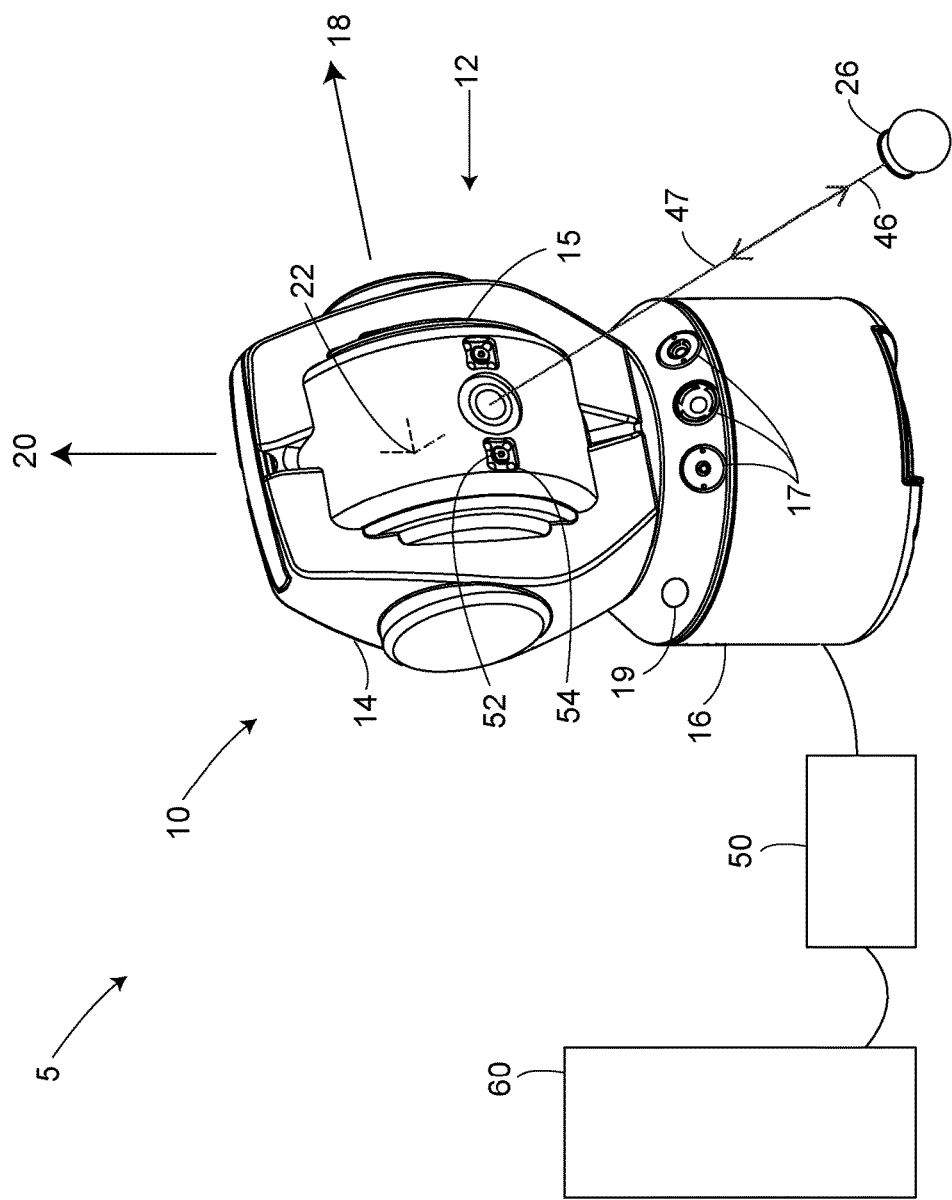
FIG. 1 is a perspective view of a laser tracker system with a retroreflector target in accordance with an embodiment of the present invention.

An exemplary laser tracker system 5 illustrated in FIG. 1 includes a laser tracker 10, a retroreflector target 26, an optional auxiliary unit processor 50, and an optional auxiliary computer 60. An exemplary gimbaled beam-steering mechanism 12 of laser tracker 10 comprises a zenith carriage 14 mounted on an azimuth base 16 and rotated about an azimuth axis 20. A payload 15 is mounted on the zenith carriage 14 and rotated about a zenith axis 18. Zenith axis 18 and azimuth axis 20 intersect orthogonally, internally to tracker 10, at gimbal point 22, which is typically the origin for distance measurements. A beam of light 46 virtually passes through the gimbal point 22 and is pointed orthogonal to zenith axis 18. In other words, beam of light 46 lies in a plane approximately perpendicular to the zenith axis 18 and that passes through the azimuth axis 20. Outgoing beam of light 46 is pointed in the desired direction by rotation of payload 15 about zenith axis 18 and by rotation of zenith carriage 14 about azimuth axis 20. Motors, described in more detail in reference to FIGS. 8 and 9, steer the outgoing light beam by rotating tracker components about the azimuth and zenith axes. A zenith angular encoder, internal to the tracker, is attached to a zenith mechanical axis aligned to the zenith axis 18. An azimuth angular encoder, internal to the tracker, is attached to an azimuth mechanical axis aligned to the azimuth axis 20. The zenith and azimuth angular encoders measure the zenith and azimuth angles of rotation to relatively high accuracy. Outgoing beam of light 46 travels to the retroreflector target 26, which might be, for example, an SMR as described above. By measuring the radial distance between gimbal point 22 and retroreflector 26, the rotation angle about the zenith axis 18, and the rotation angle about the azimuth axis 20, the position of retroreflector 26 is found within the spherical coordinate system of the tracker.

Outgoing beam of light 46 may include one or more wavelengths, as described hereinafter. For the sake of clarity and simplicity, a steering mechanism of the sort shown in FIG. 1 is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Magnetic nests 17 may be included on the laser tracker for resetting the laser tracker to a "home" position for different sized SMRs—for example, 1.5, 7/8, and 1/2 inch SMRs. An on-tracker retroreflector 19 may be used to reset the tracker to a reference distance. In addition, an on-tracker mirror, not visible from the view of FIG. 1, may be used in combination with the on-tracker retroreflector to enable performance of a self-compensation, as described in U.S. Pat. No. 7,327,446, the contents of which are incorporated by reference.

Figure 2:
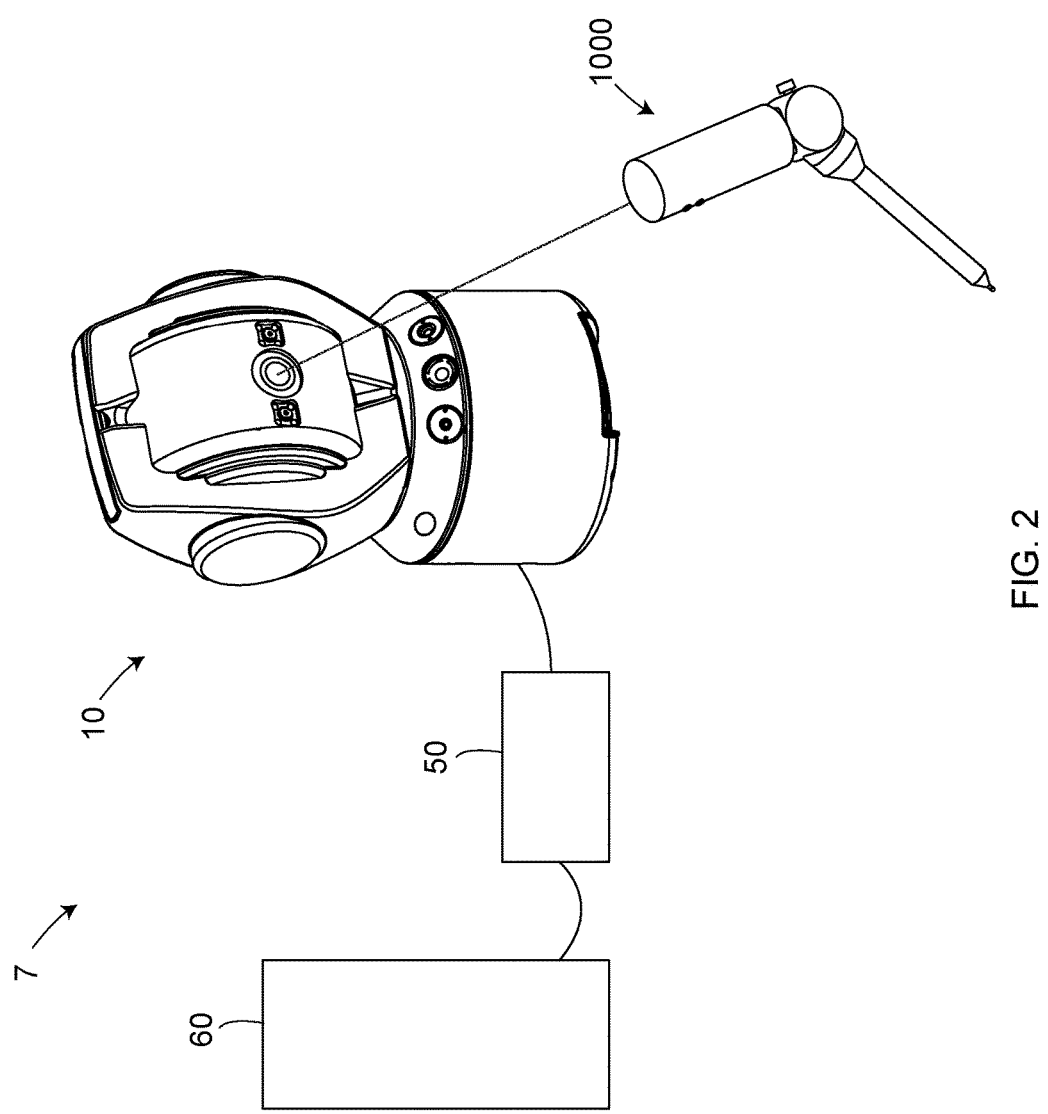
FIG. 2 is a perspective view of a laser tracker system with a six-DOF target in accordance with an embodiment of the present invention.

FIG. 2 shows an exemplary laser tracker system 7 that is similar to the laser tracker system 5 of FIG. 1 except that retroreflector target 26 is replaced with a six-DOF probe 1000. In FIG. 1, other types of retroreflector targets may be used. For example, a cateye retroreflector, which is a glass retroreflector in which light focuses to a small spot of light on a reflective rear surface of the glass structure, is sometimes used.

Figure 3:
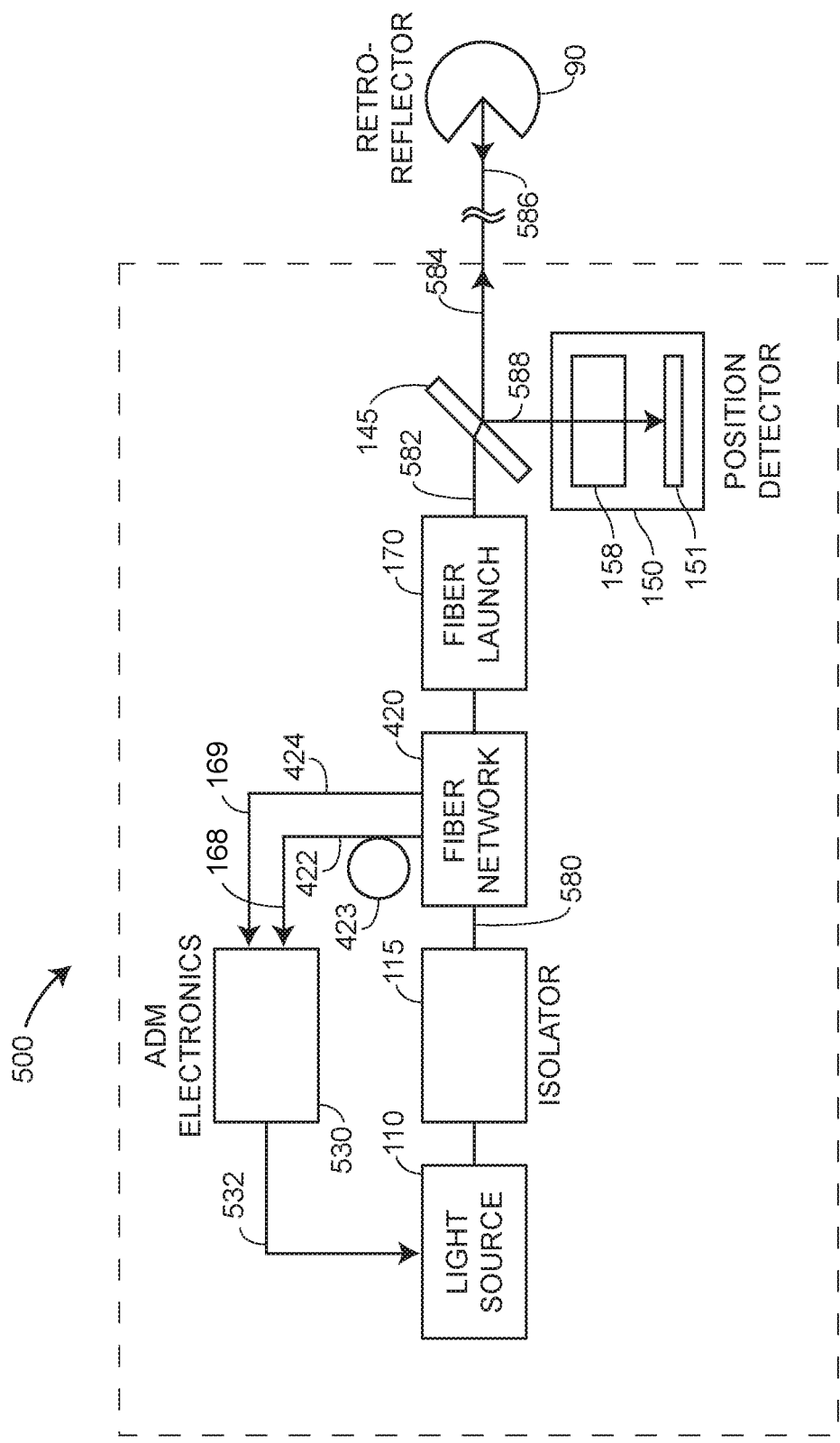
FIG. 3 is a block diagram describing elements of laser tracker optics and electronics in accordance with an embodiment of the present invention.

In an embodiment illustrated in FIG. 3, a laser tracker includes an opto-electronic system 500 that emits a single wavelength of visible light form the tracker. Other embodiments, including some embodiments shown herein below, emit multiple wavelengths of light, some outside the visible spectrum. In an embodiment, the opto-electronic system 500 includes a visible light source 110, an isolator 115, a fiber network 420, ADM electronics 530, a fiber launch 170, a beam splitter 145, and a position detector assembly 150. The visible light source 110 might be, for example, a red or green diode laser, a vertical cavity surface emitting laser (VCSEL), or a superluminescent diode. The isolator might be a Faraday isolator, an attenuator, or any other device capable of sufficiently reducing the amount of light fed back into the light source to prevent instability in the light source 110. The light from the isolator 115 travels into the fiber network 420, which in an embodiment is the fiber network 420A of FIG. 7.

Figure 5:
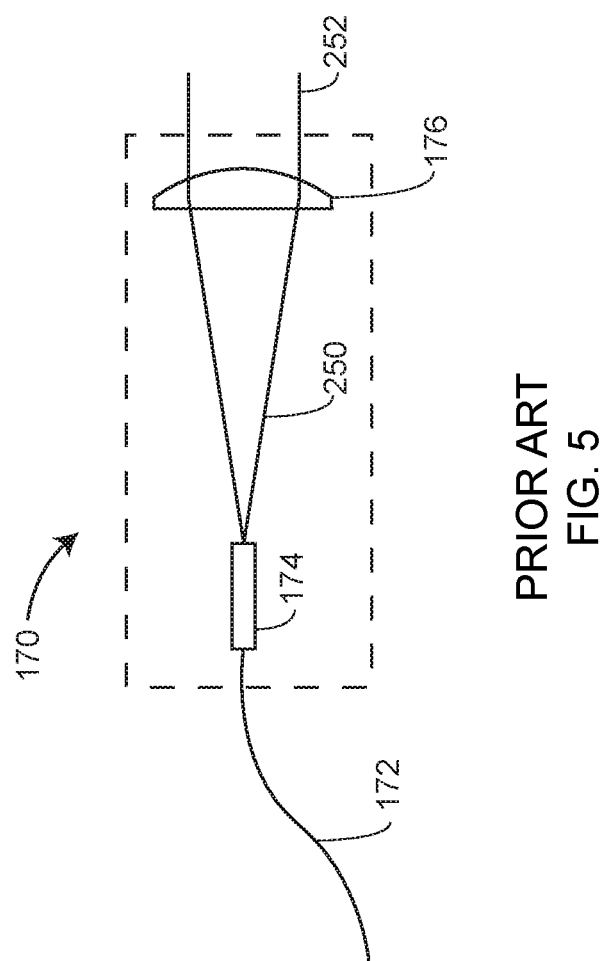
FIG. 5 shows a prior art fiber-optic beam launch.

In the configuration illustrated in FIG. 3, a lens 176 in the fiber launch 170 of FIG. 5 is used to collimate light 250 emitted by the fiber optic ferrule 174 to produce collimated light 252. In other embodiments, the light emitted from a fiber launch or emitted directly from a light source may be collimated by a lens and then sent later in the path through a beam expander. Examples of two types of beam expanders 140A and 140B are shown in FIGS. 4A and 4B, respectively. FIG. 4A illustrates a beam expander 140A in which a negative lens 141A is followed by a positive lens 142A arranged so as to expand a relatively small collimated beam 220A of light into a relatively larger beam of light 230A. FIG. 4B illustrates a beam expander 140B that includes two positive lenses 141B, 142B. The two positive lenses are arranged so as to expand a relatively small collimated beam of light 220B into a relatively larger beam of light 230B.

In an embodiment, the ADM 160 includes a light source 110, ADM electronics 530, a fiber network 420, an interconnecting electrical cable 532, and interconnecting optical fibers 422, 423, and 424. ADM electronics send electrical modulation and bias voltages to light source 110, which may, for example, be a semiconductor laser that operates at 635 nm. In an embodiment, the fiber network 420 may be the prior art fiber-optic network 420A shown in FIG. 7. In this embodiment, light from the light source 110 in FIG. 3 travels over the optical fiber 580, which is equivalent to the optical fiber 432 in FIG. 7.

Figure 7:
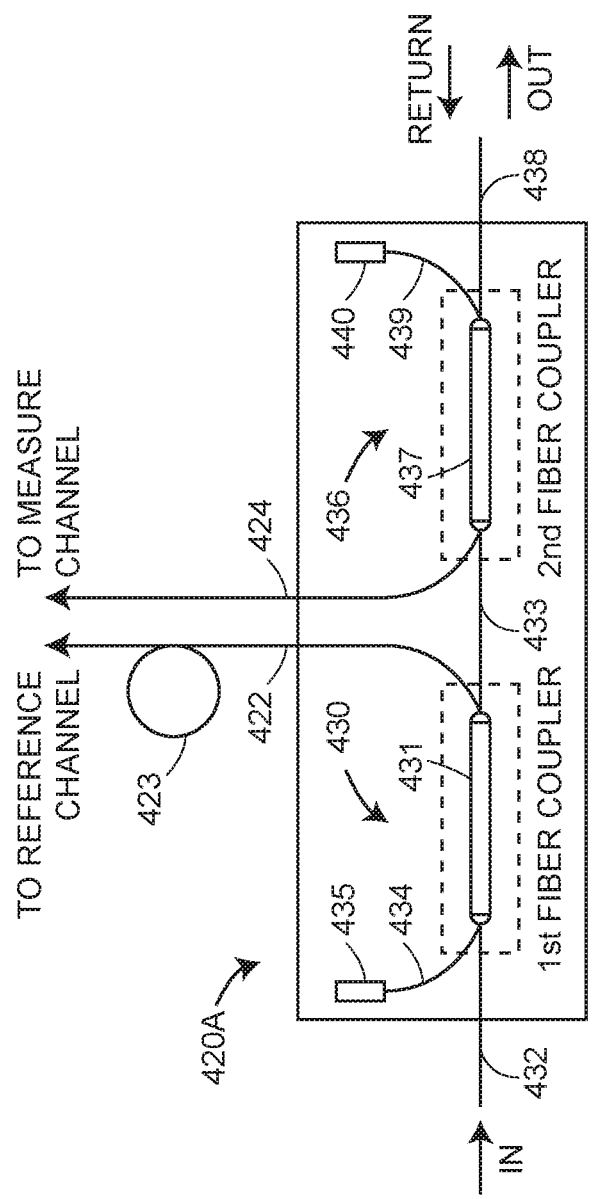
FIG. 7 is a schematic figure showing fiber-optic elements within a prior art fiber-optic network.

In an embodiment, the fiber network 420A of FIG. 7 includes a first fiber coupler 430, a second fiber coupler 436, and low-reflectance terminators 435, 440. It should be understood that many types of fiber networks may be constructed and the fiber network 420 is not limited to the fiber network 420A of FIG. 7. The light in fiber network 420A travels through the first fiber coupler 430 and splits between two paths, the first path through optical fiber 433 to the second fiber coupler 436 and the second path through optical fiber 422 and fiber length equalizer 423. Fiber length equalizer 423 connects to fiber length 422 in FIG. 3, which travels to the reference channel of the ADM electronics 530. The purpose of fiber length equalizer 423 is to match the length of optical fibers traversed by light in the reference channel to the length of optical fibers traversed by light in the measure channel. Matching the fiber lengths in this way reduces ADM errors caused by changes in the ambient temperature. Such errors may arise because the effective optical path length of an optical fiber is equal to the average index of refraction of the optical fiber times the length of the fiber. Since the index of refraction of the optical fibers depends on the temperature of the fiber, a change in the temperature of the optical fibers causes changes in the effective optical path lengths of the measure and reference channels. If the effective optical path length of the optical fiber in the measure channel changes relative to the effective optical path length of the optical fiber in the reference channel, the result will be an apparent shift in the position of the retroreflector target 90, even if the retroreflector target 90 is kept stationary. To get around this problem, two steps are performed. First, the length of the fiber in the reference channel is matched, as nearly as possible, to the length of the fiber in the measure channel. Second, the measure and reference fibers are routed side by side to the extent possible to ensure that the optical fibers in the two channels see nearly the same changes in temperature.

In FIG. 7, some light travels through the second fiber optic coupler 436 and splits into two paths, the first path to the low-reflection fiber terminator 440 and the second path to optical fiber 438, from which it travels to optical fiber 186 in FIG. 3. The light on optical fiber 186 travels through to the second fiber launch 170.

In an embodiment, fiber launch 170 is shown in prior art FIG. 5. The light from optical fiber 438 of FIG. 7 goes to fiber 172 in FIG. 5. The fiber launch 170 includes optical fiber 172, ferrule 174, and lens 176. The optical fiber 172 is attached to ferrule 174, which is stably attached to a structure within the laser tracker 10. If desired, the end of the optical fiber may be polished at an angle to reduce back reflections. The light 250 emerges from the core of the fiber, which may be a single mode optical fiber with a diameter of between 4 and 12 micrometers, depending on the wavelength of the light being used and the particular type of optical fiber. The light 250 diverges at an angle and intercepts lens 176, which collimates it.

The beam of light 584 travels out of the laser tracker to retroreflector 90 as a first beam, which returns a second portion of the light as a second beam 586. The second portion of the light returns to the fiber launch 170, which couples the light back into the optical fiber 172.

In an embodiment, the optical fiber 172 corresponds to the optical fiber 438 in FIG. 7. The returning light travels from optical fiber 438 through the second fiber coupler 436 and splits between two paths. A first path leads to optical fiber 424 that, in an embodiment, leads to the measure channel of the ADM electronics 530 in FIG. 3. A second path leads to optical fiber 433 and then to the first fiber coupler 430. The light leaving the first fiber coupler 430 splits between two paths, a first path to the optical fiber 432 and a second path to the low reflectance termination 435. In an embodiment, optical fiber 432 in FIG. 7 leads through an isolator 115 to the light source 110 in FIG. 3.

Figure 6:
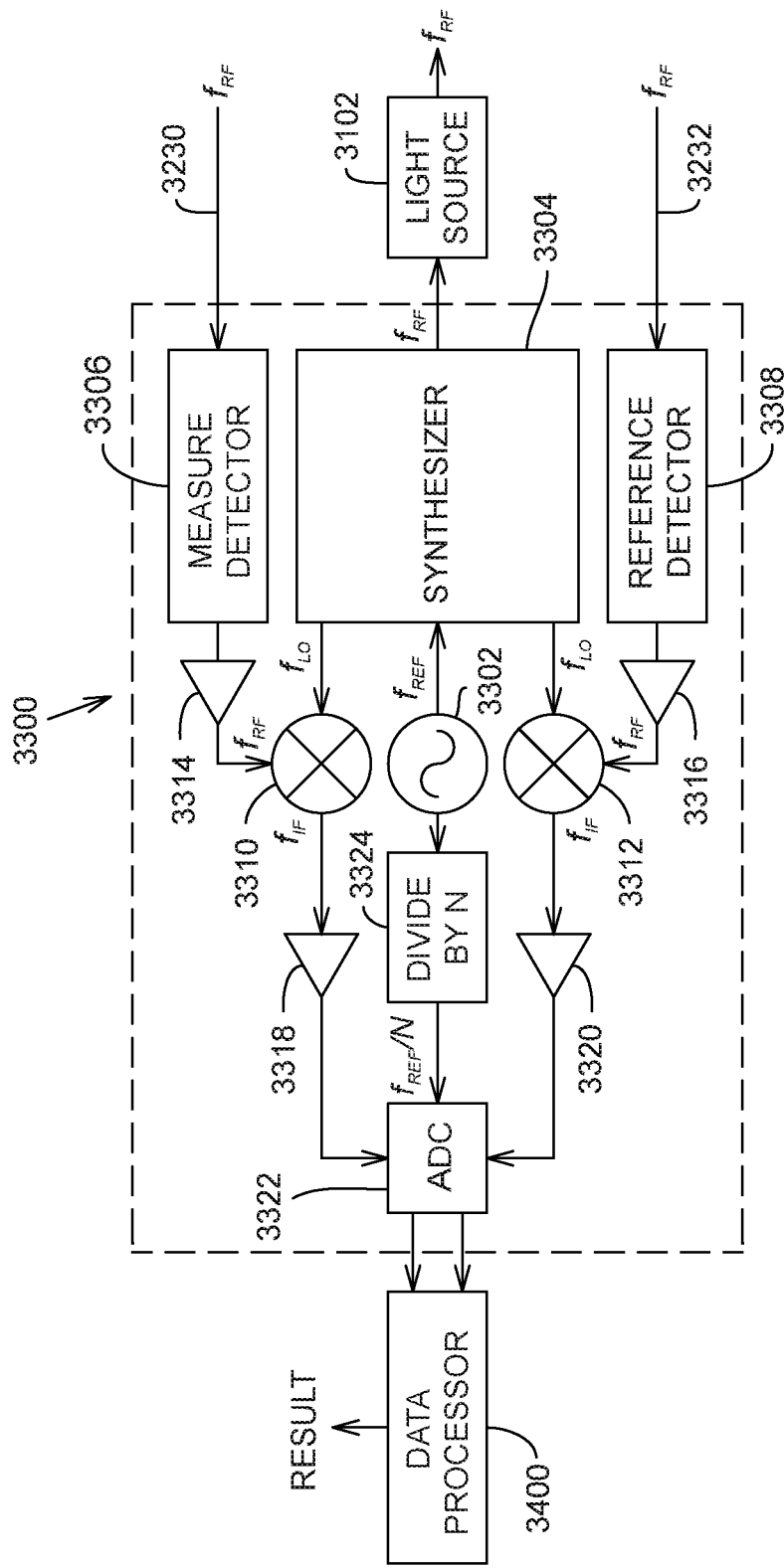
FIG. 6 is a block diagram of electrical and electro-optical elements within a prior art ADM.

The light from the fiber network 420 enters ADM electronics 530 through optical fibers 168, 169. An embodiment of prior art ADM electronics is shown in FIG. 6 Optical fiber 168 in FIG. 3 corresponds to optical fiber 3232 in FIG. 6, and optical fiber 169 in FIG. 3 corresponds to optical fiber 3230 in FIG. 6. Referring now to FIG. 6, ADM electronics 3300 includes a frequency reference 3302, a synthesizer 3304, a measure detector 3306, a reference detector 3308, a measure mixer 3310, a reference mixer 3312, conditioning electronics 3314, 3316, 3318, 3320, a divide-by-N prescaler 3324, and an analog-to-digital converter (ADC) 3322. The frequency reference, which might be an oven-controlled crystal oscillator (OCXO), for example, sends a reference frequency $f_{REF}$, which might be 10 MHz, for example, to the synthesizer, which generates two electrical signals—one signal at a frequency $f_{RF}$ and two signals at frequency $f_{LO}$. The signal $f_{RF}$ goes to the light source 3102, which corresponds to the light source 162 in FIG. 3. The two signals at frequency $f_{LO}$ go to the measure mixer 3310 and the reference mixer 3312. The light from optical fibers 168, 169 in FIG. 3 appear on fibers 3232, 3230 in FIG. 6, respectively, and enter the reference and measure channels, respectively. Reference detector 3308 and measure detector 3306 convert the optical signals into electrical signals. These signals are conditioned by electrical components 3316, 3314, respectively, and are sent to mixers 3312, 3310, respectively. The mixers produce a frequency $f_{IF}$ equal to the absolute value of $f_{LO}-f_{RF}$. The signal $f_{RF}$ may be a relatively high frequency, for example, 2 GHz, while the signal $f_{IF}$ may have a relatively low frequency, for example, 10 kHz.

The reference frequency $f_{REF}$ is sent to the prescaler 3324, which divides the frequency by an integer value. For example, a frequency of 10 MHz might be divided by 40 to obtain an output frequency of 250 kHz. In this example, the 10 kHz signals entering the ADC 3322 would be sampled at a rate of 250 kHz, thereby producing 25 samples per cycle. The signals from the ADC 3322 are sent to a data processor 3400, which might, for example, be one or more digital signal processor (DSP) units located in ADM electronics 530 of FIG. 3.

The method for extracting a distance is based on the calculation of phase of the ADC signals for the reference and measure channels. This method is described in detail in U.S. Pat. No. 7,701,559 ('559) to Bridges et al., the contents of which are herein incorporated by reference. Calculation includes use of equations (1)-(8) of patent '559. In addition, when the ADM first begins to measure a retroreflector, the frequencies generated by the synthesizer are changed some number of times (for example, three times), and the possible ADM distances calculated in each case. By comparing the possible ADM distances for each of the selected frequencies, an ambiguity in the ADM measurement is removed. The equations (1)-(8) of patent '559 combined with synchronization methods described with respect to FIG. 5 of patent '559 and the Kalman filter methods described in patent '559 enable the ADM to measure a moving target. In other embodiments, other methods of obtaining absolute distance measurements, for example, by using pulsed time-of-flight rather than phase differences, may be used.

Referring to FIG. 3, in an embodiment the return light beam 586 arrives at the beam splitter 145, which sends part of the return light 582 to the fiber launch 170 and another part of the light 588 to the position detector assembly 150. The light 584 emerging from the laser tracker 10 may be referred to as a first beam and the portion of that light 586 reflecting off the retroreflector 90 as a second beam. Portions of the second beam are sent to different functional elements of the opto-electronic system 500. For example, a first portion may be sent to a distance meter such as an ADM of FIG. 3. A second portion 588 may be sent to a position detector assembly 150. In the example of FIG. 3, the beam splitter 145 reflects the light 588 onto the position detector assembly and transmits the light 581 into the fiber launch 170 and ADM. However, the function of the beam splitter could have been reversed, transmitting light to the position detector assembly and reflecting it to the fiber launch and ADM.

The position detector assembly 150 includes a position detector 151 and optional conditioning elements 158. In one embodiment, the position detector is an analog detector designed to indicate position according to the location the return beam of light strikes the detector surface. Examples of such analog detectors include lateral effect detectors and quadrant detectors. In another embodiment, the position detector is a photosensitive array designed to indicate position by calculating a central position of the return light. Such a calculation might be based, for example, on calculating with a processor a centroid value of the return light. Such a photosensitive array might be, for example, a high speed CMOS array. In an embodiment, the position detector further includes one or more conditioning elements such as an aperture or a diffusor. An aperture 158 may be used to help block unwanted ghost beams. A diffuser may help improve uniformity of the beam, for example, to reduce speckle and diffraction effects.

A retroreflector of the sort discussed here, a cube corner or a cateye retroreflector, for example, has the property of reflecting a ray of light that enters the retroreflector in a direction parallel to the incident ray. In addition, the incident and reflected rays are symmetrically placed about the point of symmetry of the retroreflector. For example, in an open-air cube corner retroreflector, the point of symmetry of the retroreflector is the vertex of the cube corner. In a glass cube corner retroreflector, the point of symmetry is also the vertex, but one may consider the bending of the light at the glass-air interface in this case. In a cateye retroreflector having an index of refraction of 2.0, the point of symmetry is the center of the sphere. In a cateye retroreflector made of two glass hemispheres symmetrically seated on a common plane, the point of symmetry is a point lying on the plane and at the spherical center of each hemisphere. For the type of retroreflectors ordinarily used with laser trackers, the light returned by a retroreflector to the tracker is shifted to the other side of the vertex relative to the incident laser beam.

This behavior of a retroreflector 90 in FIG. 3 is the basis for the tracking of the retroreflector by the laser tracker. The position sensor has on its surface an ideal retrace point. The ideal retrace point is the point at which a laser beam sent to the point of symmetry of a retroreflector (e.g., the vertex of the cube corner retroreflector in an SMR) will return. Usually the retrace point is near the center of the position sensor. If the laser beam is sent to one side of the retroreflector, it reflects back on the other side and appears off the retrace point on the position sensor. By noting the position of the returning beam of light on the position sensor, the control system of the laser tracker 10 can cause the motors to move the light beam toward the point of symmetry of the retroreflector.

If the retroreflector moves transverse to the tracker light at a constant velocity, the light beam at the retroreflector will strike the retroreflector (after transients have settled) a fixed offset distance from the point of symmetry of the retroreflector. The laser tracker makes a correction to account for this offset distance at the retroreflector based on scale factor obtained from controlled measurements. The position detector performs two functions—enabling tracking and correcting measurements to account for the movement of the retroreflector.

Figure 8:
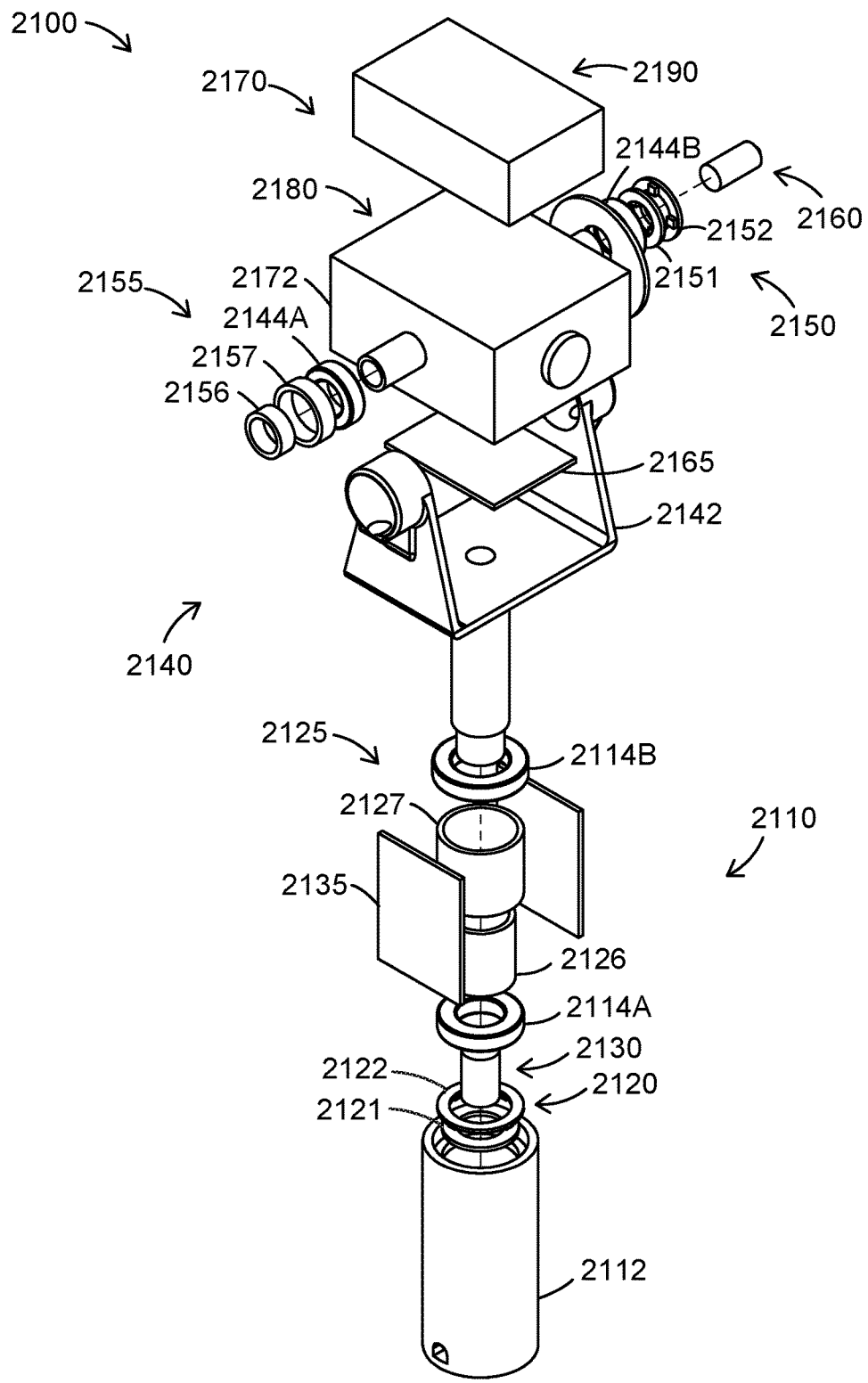
FIG. 8 is an exploded view of a prior art laser tracker.
Figure 9:
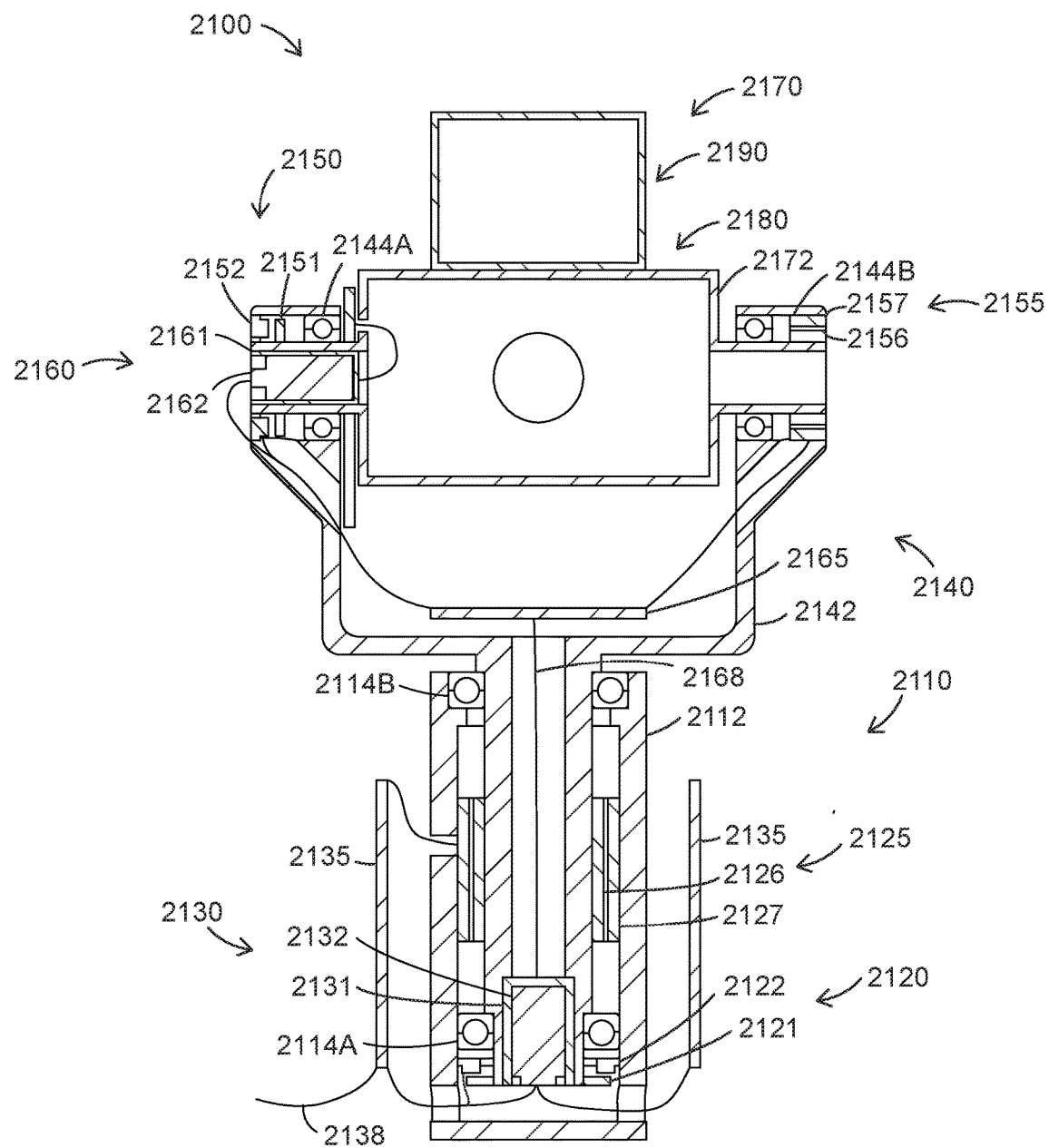
FIG. 9 is a cross-sectional view of a prior art laser tracker.

FIGS. 8 and 9 show exploded and cross sectional views, respectively, of a prior art laser tracker 2100, which is depicted in FIGS. 2 and 3 of U.S. Pat. No. 8,525,983 to Bridges et al., which is incorporated by reference herein. Azimuth assembly 2110 includes post housing 2112, azimuth encoder assembly 2120, lower and upper azimuth bearings 2114A, 2114B, azimuth motor assembly 2125, azimuth slip ring assembly 2130, and azimuth circuit boards 2135.

The purpose of azimuth encoder assembly 2120 is to accurately measure the angle of rotation of yoke 2142 with respect to the post housing 2112. Azimuth encoder assembly 2120 includes encoder disk 2121 and read-head assembly 2122. Encoder disk 2121 is attached to the shaft of yoke housing 2142, and read head assembly 2122 is attached to post assembly 2110. Read head assembly 2122 comprises a circuit board onto which one or more read heads are fastened. Laser light sent from read heads reflect off fine grating lines on encoder disk 2121. Reflected light picked up by detectors on encoder read head(s) is processed to find the angle of the rotating encoder disk in relation to the fixed read heads.

Azimuth motor assembly 2125 includes azimuth motor rotor 2126 and azimuth motor stator 2127. Azimuth motor rotor comprises permanent magnets attached directly to the shaft of yoke housing 2142. Azimuth motor stator 2127 comprises field windings that generate a prescribed magnetic field. This magnetic field interacts with the magnets of azimuth motor rotor 2126 to produce the desired rotary motion. Azimuth motor stator 2127 is attached to post frame 2112.

Azimuth circuit boards 2135 represent one or more circuit boards that provide electrical functions required by azimuth components such as the encoder and motor. Azimuth slip ring assembly 2130 includes outer part 2131 and inner part 2132. In an embodiment, wire bundle 2138 emerges from auxiliary unit processor 50. Wire bundle 2138 may carry power to the tracker or signals to and from the tracker. Some of the wires of wire bundle 2138 may be directed to connectors on circuit boards. In the example shown in FIG. 9, wires are routed to azimuth circuit board 2135, encoder read head assembly 2122, and azimuth motor assembly 2125. Other wires are routed to inner part 2132 of slip ring assembly 2130. Inner part 2132 is attached to post assembly 2110 and consequently remains stationary. Outer part 2131 is attached to yoke assembly 2140 and consequently rotates with respect to inner part 2132. Slip ring assembly 2130 is designed to permit low impedance electrical contact as outer part 2131 rotates with respect to the inner part 2132.

Zenith assembly 2140 comprises yoke housing 2142, zenith encoder assembly 2150, left and right zenith bearings 2144A, 2144B, zenith motor assembly 2155, zenith slip ring assembly 2160, and zenith circuit board 2165.

The zenith encoder assembly 2150 accurately measures the angle of rotation of payload frame 2172 with respect to yoke housing 2142. Zenith encoder assembly 2150 comprises zenith encoder disk 2151 and zenith read-head assembly 2152. Encoder disk 2151 is attached to payload housing 2142, and read head assembly 2152 is attached to yoke housing 2142. Zenith read head assembly 2152 comprises a circuit board onto which one or more read heads are fastened. Laser light sent from read heads reflect off fine grating lines on encoder disk 2151. Reflected light picked up by detectors on encoder read head(s) is processed to find the angle of the rotating encoder disk in relation to the fixed read heads.

Zenith motor assembly 2155 comprises azimuth motor rotor 2156 and azimuth motor stator 2157. Zenith motor rotor 2156 comprises permanent magnets attached directly to the shaft of payload frame 2172. Zenith motor stator 2157 comprises field windings that generate a prescribed magnetic field. This magnetic field interacts with the rotor magnets to produce the desired rotary motion. Zenith motor stator 2157 is attached to yoke frame 2142.

Zenith circuit board 2165 represents one or more circuit boards that provide electrical functions required by zenith components such as the encoder and motor. Zenith slip ring assembly 2160 comprises outer part 2161 and inner part 2162. Wire bundle 2168 emerges from azimuth outer slip ring 2131 and may carry power or signals. Some of the wires of wire bundle 2168 may be directed to connectors on circuit board. In the example shown in FIG. 9, wires are routed to zenith circuit board 2165, zenith motor assembly 2150, and encoder read head assembly 2152. Other wires are routed to inner part 2162 of slip ring assembly 2160. Inner part 2162 is attached to yoke frame 2142 and consequently rotates in azimuth angle, but not in zenith angle. Outer part 2161 is attached to payload frame 2172 and consequently rotates in both zenith and azimuth angles. Slip ring assembly 2160 is designed to permit low impedance electrical contact as outer part 2161 rotates with respect to the inner part 2162. Payload assembly 2170 includes a main optics assembly 2180 and a secondary optics assembly 2190.

Figure 10:
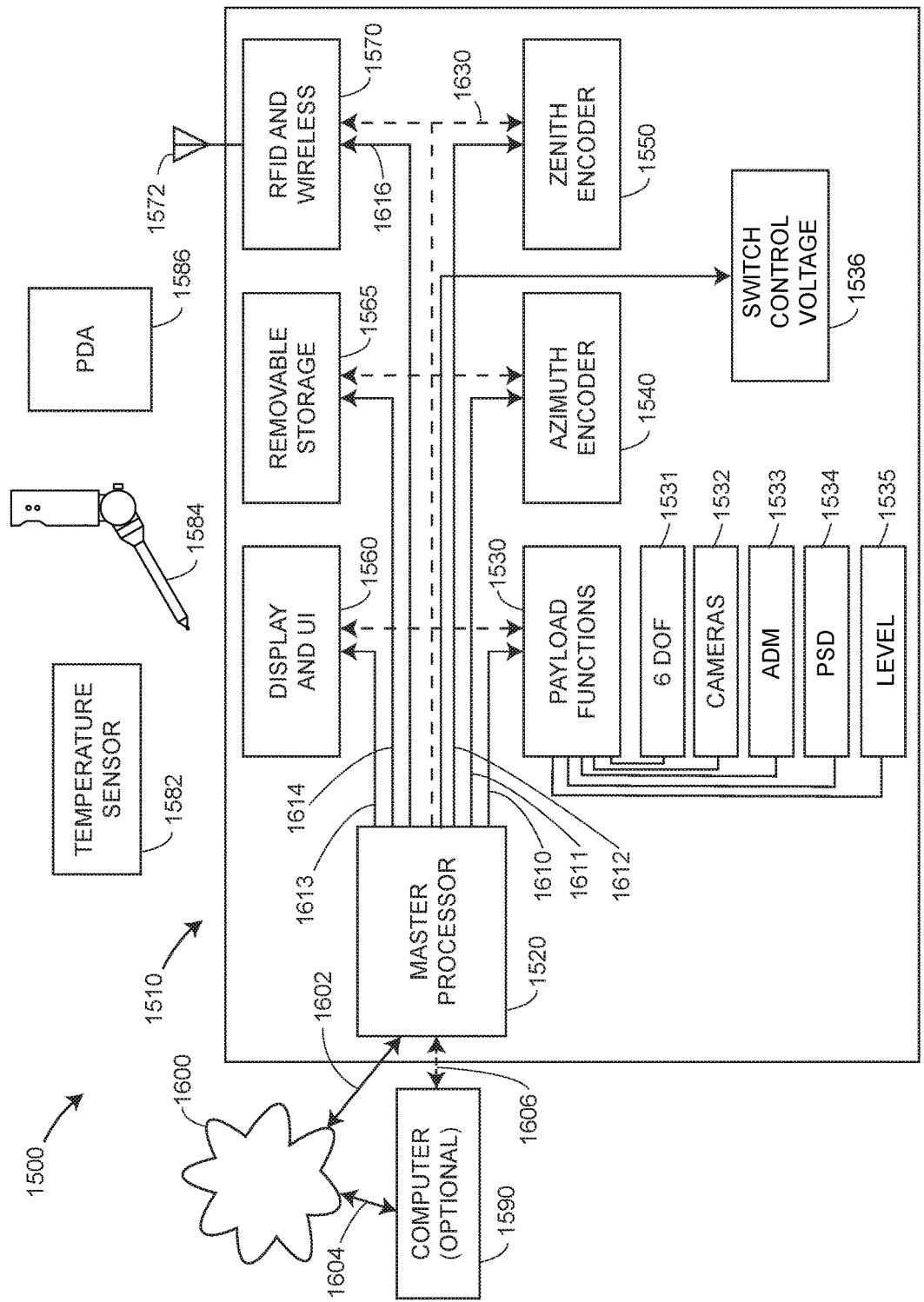
FIG. 10 is a block diagram of the computing and communication elements of a laser tracker in accordance with an embodiment of the present invention.

FIG. 10 is a block diagram depicting a dimensional measurement electronics processing system 1500 that includes a laser tracker electronics processing system 1510, processing systems of peripheral elements 1582, 1584, 1586, computer 1590, and other networked components 1600, represented here as a cloud. Exemplary laser tracker electronics processing system 1510 includes a master processor 1520, payload functions electronics 1530, azimuth encoder electronics 1540, zenith encoder electronics 1550, display and user interface (UI) electronics 1560, removable storage hardware 1565, radio frequency identification (RFID) electronics, and an antenna 1572. The payload functions electronics 1530 includes a number of subfunctions including the six-DOF electronics 1531, the camera electronics 1532, the ADM electronics 1533, the position detector (PSD) electronics 1534, and the level electronics 1535. Most of the subfunctions have at least one processor unit, which might be a digital signal processor (DSP) or field programmable gate array (FPGA), for example. The electronics units 1530, 1540, and 1550 are separated as shown because of their location within the laser tracker. In an embodiment, the payload functions 1530 are located in the payload 2170 of FIGS. 8, 9, while the azimuth encoder electronics 1540 is located in the azimuth assembly 2110 and the zenith encoder electronics 1550 is located in the zenith assembly 2140.

Many types of peripheral devices are possible, but here three such devices are shown: a temperature sensor 1582, a six-DOF probe 1584, and a personal digital assistant, 1586, which might be a smart phone, for example. The laser tracker may communicate with peripheral devices in a variety of means, including wireless communication over the antenna 1572, by means of a vision system such as a camera, and by means of distance and angular readings of the laser tracker to a cooperative target such as the six-DOF probe 1584. Peripheral devices may contain processors. The six-DOF accessories may include six-DOF probing systems, six-DOF scanners, six-DOF projectors, six-DOF sensors, and six-DOF indicators. The processors in these six-DOF devices may be used in conjunction with processing devices in the laser tracker as well as an external computer and cloud processing resources. Generally, when the term laser tracker processor or measurement device processor is used, it is meant to include possible external computer and cloud support.

In an embodiment, a separate communications bus goes from the master processor 1520 to each of the electronics units 1530, 1540, 1550, 1560, 1565, and 1570. Each communications line may have, for example, three serial lines that include the data line, clock line, and frame line. The frame line indicates whether or not the electronics unit should pay attention to the clock line. If it indicates that attention should be given, the electronics unit reads the current value of the data line at each clock signal. The clock-signal may correspond, for example, to a rising edge of a clock pulse. In an embodiment, information is transmitted over the data line in the form of a packet. In an embodiment, each packet includes an address, a numeric value, a data message, and a checksum. The address indicates where, within the electronics unit, the data message is to be directed. The location may, for example, correspond to a processor subroutine within the electronics unit. The numeric value indicates the length of the data message. The data message contains data or instructions for the electronics unit to carry out. The checksum is a numeric value that is used to minimize the chance that errors are transmitted over the communications line.

In an embodiment, the master processor 1520 sends packets of information over bus 1610 to payload functions electronics 1530, over bus 1611 to azimuth encoder electronics 1540, over bus 1612 to zenith encoder electronics 1550, over bus 1613 to display and UI electronics 1560, over bus 1614 to removable storage hardware 1565, and over bus 1616 to RFID and wireless electronics 1570.

In an embodiment, master processor 1520 also sends a synch (synchronization) pulse over the synch bus 1630 to each of the electronics units at the same time. The synch pulse provides a way of synchronizing values collected by the measurement functions of the laser tracker. For example, the azimuth encoder electronics 1540 and the zenith electronics 1550 latch their encoder values as soon as the synch pulse is received. Similarly, the payload functions electronics 1530 latch the data collected by the electronics contained within the payload. The six-DOF, ADM, and position detector all latch data when the synch pulse is given. In most cases, the camera and inclinometer collect data at a slower rate than the synch pulse rate but may latch data at multiples of the synch pulse period.

The azimuth encoder electronics 1540 and zenith encoder electronics 1550 are separated from one another and from the payload electronics 1530 by the slip rings 2130, 2160 shown in FIG. 8 and FIG. 9. As such, the bus lines 1610, 1611, and 1612 are depicted as separate bus line in FIG. 10.

The laser tracker electronics processing system 1510 may communicate with an external computer 1590, or it may provide computation, display, and UI functions within the laser tracker. The laser tracker communicates with computer 1590 over communications link 1606, which might be, for example, an Ethernet line or a wireless connection. The laser tracker may also communicate with other elements 1600, represented by the cloud, over communications link 1602, which might include one or more electrical cables, such as Ethernet cables, and one or more wireless connections. An example of an element 1600 is another three dimensional test instrument—for example, an articulated arm CMM, which may be relocated by the laser tracker. A communication link 1604 between the computer 1590 and the elements 1600 may be wired (e.g., Ethernet) or wireless. An operator sitting on a remote computer 1590 may make a connection to the Internet, represented by the cloud 1600, over an Ethernet or wireless line, which in turn connects to the master processor 1520 over an Ethernet or wireless line. In this way, a user may control the action of a remote laser tracker.

Figure 11:
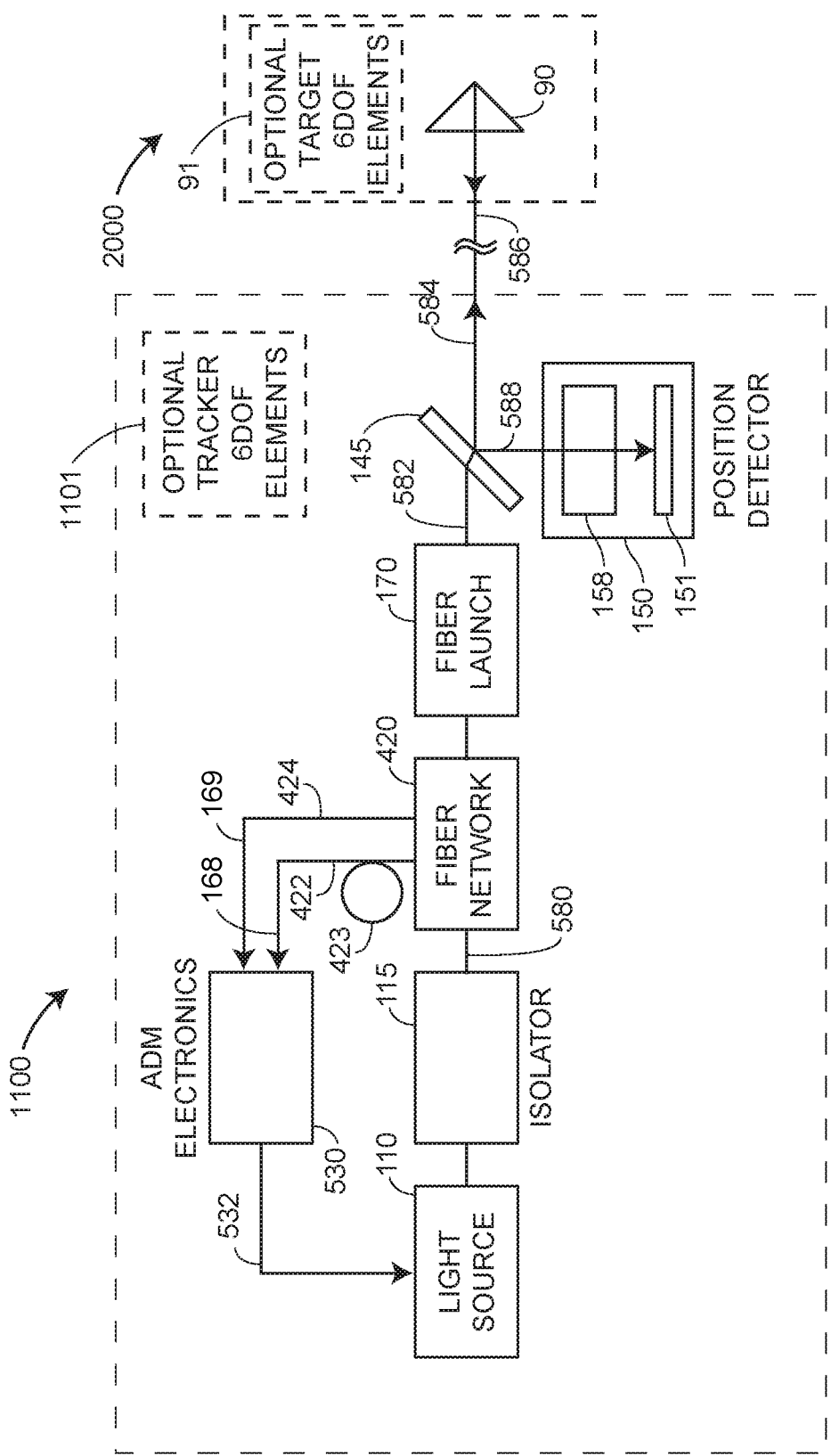
FIG. 11 is a block diagram of elements in a laser tracker with six-DOF capability according to an embodiment of the present invention.

FIG. 11 is a block diagram of a six-DOF laser tracker 1100 used in combination with a six-DOF target 2000. In an embodiment, the six-DOF laser tracker 1100 includes the elements of FIG. 3 and in addition includes optional tracker six-DOF elements 1101 needed to measure three orientational degrees of freedom of the six-DOF target 2000. In an embodiment, the six-DOF target 2000 includes optional target six-DOF elements 91 in addition to a retroreflector 90. The elements 91 may assist in determining three orientation degrees of freedom of the six-DOF target 2000 and in providing local probing capability—for example, tactile measurement capability, triangulation scanner capability (line scanner or area scanner), indicator capability, projector capability, or sensor capability.

Figure 12:
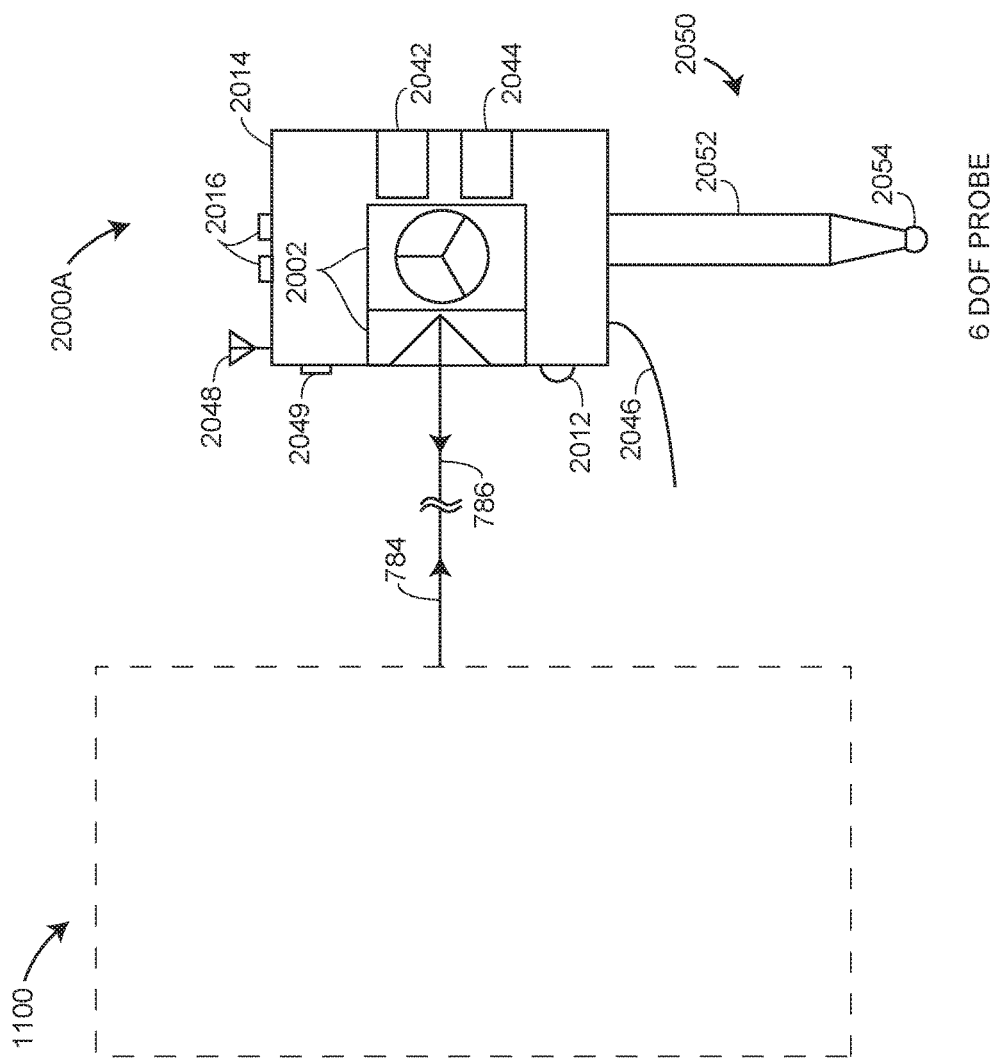
FIG. 12 is a schematic representation of a six-DOF tactile probe according to an embodiment.

FIG. 12 shows an embodiment of a six-DOF tactile probe 2000 used in conjunction with laser tracker 1100. The six-DOF probe 2000A includes a body 2014, one or more six-DOF assemblies 2002, a probe extension assembly 2050, an optional electrical cable 2046, an optional battery 2044, an interface component 2012, an identifier element 2049, actuator buttons 2016, an antenna 2048, and an electronics circuit board 2042. Each six-DOF assembly 2002 includes a retroreflector, which may be a cube corner retroreflector with a hollow (air) core or a glass core. Several embodiments of six-DOF assemblies 2002 are described herein below. The retroreflector may be a cube-corner retroreflector, a cateye retroreflector, or any other type of retroreflector. The probe extension assembly 2050 includes a probe extension 2052 and a probe tip 2054. The probe tip 2054 is brought into contact with the object under test. Although the probe tip 2054 is separated from the retroreflector, it is possible for a six-DOF laser tracker to determine the three dimensional coordinates of the probe tip 2054 at a point hidden from the line of sight of the light beam 784 from the laser tracker. This is why a six-DOF tactile probe is sometimes referred to as a hidden-point probe.

In an embodiment, electric power may be provided over an optional electrical cable 2046 or by an optional battery 2044. Electric power is provided to an electronics circuit board 2042 and to the antenna 2048, which may communicate with the laser tracker or an external computer, and to actuator buttons 2016. The actuator buttons 2016 provide the user a convenient way of communicating with the laser tracker or external computer. Electric power may also be provided to a light emitting diode (LED), a material temperature sensor (not shown), an air temperature sensor (not shown), an inertial sensor (not shown) or inclinometer (not shown). The interface component 2012 may be, for example, a light source (such as an LED), a small retroreflector, a region of reflective material, or a reference mark. The optional interface component 2012 may be used to establish a coarse orientation of the six-DOF assemblies. The identifier element 2049 is used to provide the laser tracker with parameters or with a serial number for the six-DOF probe. The identifier element may be, for example, a bar code, radio frequency identification (RFID) tag, or near-field communication (NFC) tag.

In an embodiment, the six-DOF laser tracker 1100 may provide the light beam 784 to any of a plurality of retroreflectors within a corresponding plurality of six-DOF assemblies 2002. By providing the light beam 784 to any of a plurality of retroreflectors, the six-DOF probe 2000A may be oriented in a wide variety of directions while probing with the probing extension assembly 2050.

The six degrees of freedom measured by the laser tracker 1100 may be considered to include three translational degrees of freedom and three orientational degrees of freedom. The three translational degrees of freedom may include a radial distance measurement, a first angular measurement, and a second angular measurement. The radial distance measurement may be made with an IFM or an ADM. The first angular measurement may be made with an azimuth angular measurement device, such as an azimuth angular encoder, and the second angular measurement made with a zenith angular measurement device. In another embodiment, the first angular measurement device may be the zenith angular measurement device and the second angular measurement device may be the azimuth angular measurement device. The radial distance, first angular measurement, and second angular measurement constitute three coordinates in a spherical coordinate system, which can be transformed into three coordinates in a Cartesian coordinate system or another coordinate system.

The three orientational degrees of freedom may be determined using a variety of methods, as described herein below. The three translational degrees of freedom and the three orientational degrees of freedom fully define the position and orientation of the six-DOF assembly 2002 in space. It is possible to have systems in which the six degrees of freedom are not independent, but the term six degrees of freedom, as used herein, means that the six degrees of freedom are sufficient to fully define the position and orientation of the six-DOF assemblies 2002 in space. Similarly this information is sufficient to determine the position and orientation of the six-DOF probes 2000A, 2000B, 2000C, 2000D, 2000E, 2000F, and 2000G in FIGS. 12, 13, 14, 15, 16, 17, and 18, respectively. The term "translational set" means three degrees of translational freedom of a six-DOF accessory (such as a six-DOF probe) in the tracker frame-of-reference (or device frame of reference). The term "orientational set" means three orientational degrees of freedom of a six-DOF accessory in a tracker frame of reference. The term "surface set" means three-dimensional coordinates of a point on the object surface in a device frame of reference.

Figure 13:
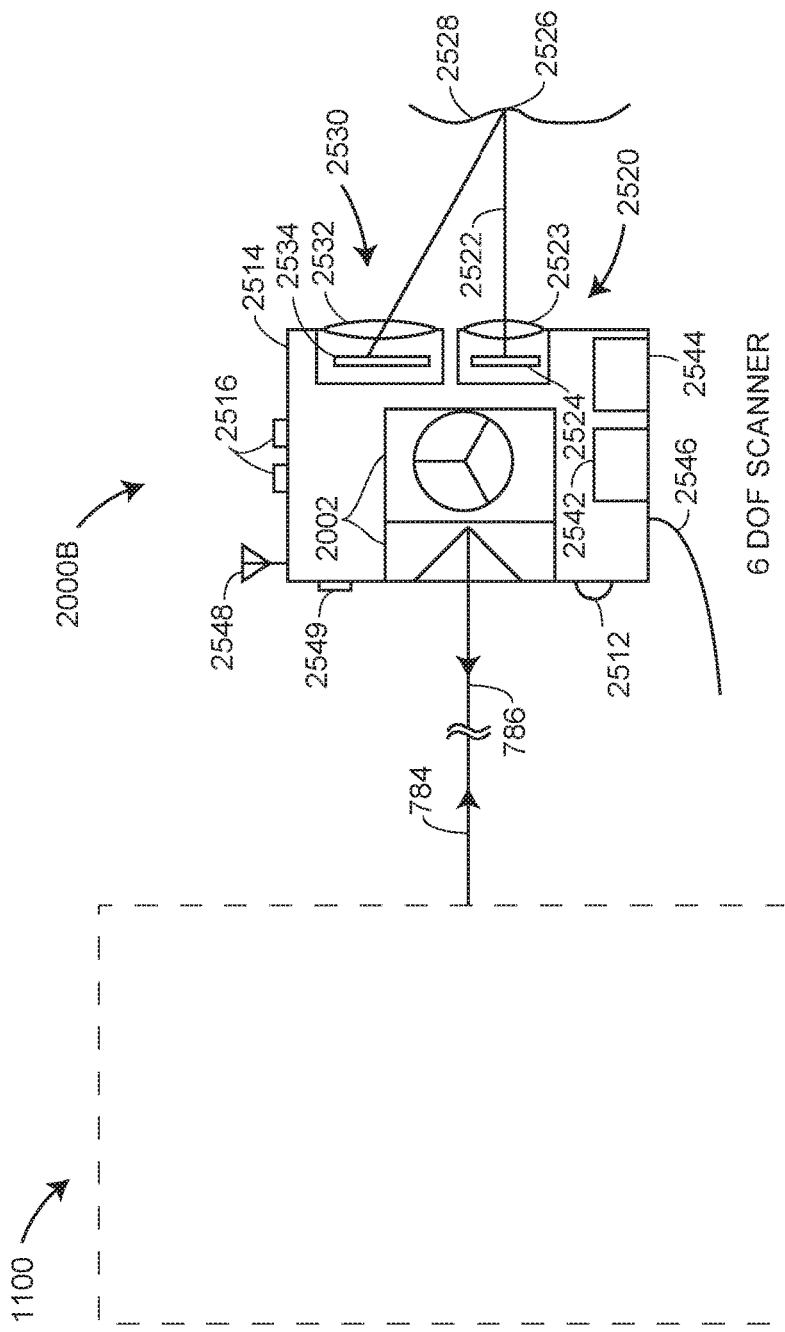
FIG. 13 is a schematic representation of a six-DOF triangulation scanner according to an embodiment.

FIG. 13 shows an embodiment of a six-DOF triangulation scanner 2000B used in conjunction with six-DOF tracker 1100. The six-DOF scanner 2000B may also be referred to as a "target scanner." The six-DOF scanner 2000B includes a body 2514, one or more six-DOF assemblies 2002, a scanner camera 2530, a scanner light projector 2520, an optional electrical cable 2546, an optional battery 2444, an interface component 2512, an identifier element 2549, actuator buttons 2516, an antenna 2548, and an electronics circuit board 2542. Each six-DOF assembly 2002 includes a retroreflector. The six-DOF assembly 2002, the optional electrical cable 2546, the optional battery 2544, the interface component 2512, the identifier element 2549, the actuator buttons 2516, the antenna 2548, and the electronics circuit board 2542 in FIG. 13 correspond to the six-DOF assemblies 2002, the optional electrical cable 2046, the optional battery 2044, the interface component 2012, the identifier element 2049, actuator buttons 2016, the antenna 2048, and the electronics circuit board 2042, respectively, in FIG. 12. The descriptions for these corresponding elements are the same as discussed in reference to FIG. 12. Together, the scanner projector 2520 and the scanner camera 2530 are used to measure the three dimensional coordinates of a workpiece 2528. The camera 2530 includes a camera lens system 2532 and a photosensitive array 2534. The photosensitive array 2534 may be a CCD or CMOS array, for example. The scanner projector 2520 includes a projector lens system 2523 and a source pattern of light 2524. The source pattern of light may emit a point of light, a line of light, or a structured (two dimensional) pattern of light. If the scanner light source emits a point of light, the point may be scanned, for example, with a moving mirror, to produce a line or an array of lines. If the scanner light source emits a line of light, the line may be scanned, for example, with a moving mirror, to produce an array of lines. In an embodiment, the source pattern of light might be an LED, laser, or other light source reflected off a digital micromirror device (DMD) such as a digital light projector (DLP) from Texas Instruments, an liquid crystal device (LCD) or liquid crystal on silicon (LCOS) device, or it may be a similar device used in transmission mode rather than reflection mode. The source pattern of light might also be a slide pattern, for example, a chrome-on-glass slide, which might have a single pattern or multiple patterns, the slides moved in and out of position as needed.

The six-DOF scanner 2000B may be held by hand or mounted, for example, on a tripod, an instrument stand, a motorized carriage, or a robot end effector. The three dimensional coordinates of the workpiece 2528 are measured by the scanner camera 2530 by using the principles of triangulation. There are several ways that the triangulation measurement may be implemented, depending on the pattern of light emitted by the scanner light source 2520 and the type of photosensitive array 2534. For example, if the pattern of light emitted by the scanner light source 2520 is a line of light or a point of light scanned into the shape of a line and if the photosensitive array 2534 is a two dimensional array, then one dimension of the two dimensional array 2534 corresponds to a direction of a point 2526 on the surface of the workpiece 2528. The other dimension of the two dimensional array 2534 corresponds to the distance of the point 2526 from the scanner light source 2520. Hence the three dimensional coordinates of each point 2526 along the line of light emitted by scanner light source 2520 is known relative to the local frame of reference of the six-DOF scanner 2000B. From the six degrees of freedom determined by the tracker 2000 in cooperation with the six-DOF target 2000B, the three dimensional coordinates of the scanned line of light may be found in the tracker frame of reference, which in turn may be converted into the frame of reference of the workpiece 2528 through the measurement by the laser tracker of three points on the workpiece, for example.

If the six-DOF scanner 2000B is held by hand, a line of laser light emitted by the scanner light source 2520 may be moved in such a way as to "paint" the surface of the workpiece 2528, thereby obtaining the three dimensional coordinates for the entire surface. It is also possible to "paint" the surface of a workpiece using a scanner light source 2520 that emits a structured pattern of light. Alternatively, when using a scanner 2500 that emits a structured pattern of light, more accurate measurements may be made by mounting the 6-DOF scanner on a tripod or instrument stand. The structured light pattern emitted by the scanner light source 2520 might, for example, include a pattern of fringes, each fringe having an irradiance that varies sinusoidally over the surface of the workpiece 2528. In an embodiment, the sinusoids are shifted by three or more phase values. The amplitude level recorded by each pixel of the camera 2530 for each of the three or more phase values is used to provide the position of each pixel on the sinusoid. This information is used to help determine the three dimensional coordinates of each point 2526. In another embodiment, the structured light may be in the form of a coded pattern that may be evaluated to determine three-dimensional coordinates based on single, rather than multiple, image frames collected by the camera 2530. Use of a coded pattern may enable relatively accurate measurements while the 6-DOF scanner 2000B is moved by hand at a reasonable speed.

Projecting a structured light pattern, as opposed to a line of light, has some advantages. In a line of light projected from a handheld six-DOF scanner 2000B, the density of points may be high along the line but much less between the lines. With a structured light pattern, the spacing of points is usually about the same in each of the two orthogonal directions. In addition, in some modes of operation, the three-dimensional points calculated with a structured light pattern may be more accurate than other methods. For example, by fixing the six-DOF scanner 2000B in place, for example, by attaching it to a stationary stand or mount, a sequence of structured light patterns may be emitted that enable a more accurate calculation than would be possible other methods in which a single pattern was captured (i.e., a single-shot method). An example of a sequence of structured light patterns is one in which a pattern having a first spatial frequency is projected onto the object. In an embodiment, the projected pattern is pattern of stripes that vary sinusoidally in optical power. In an embodiment, the phase of the sinusoidally varying pattern is shifted, thereby causing the stripes to shift to the side. For example, the pattern may be made to be projected with three phase angles, each shifted by 120 degrees relative to the previous pattern. This sequence of projections provides enough information to enable relatively accurate determination of the phase of each point of the pattern, independent of the background light. This can be done on a point by point basis without considering adjacent points on the object surface.

Although the procedure above determines a phase for each point with phases running from 0 to 360 degrees between two adjacent lines, there may still be a question about the identification of the lines. One way to identify the lines is to repeat the sequence of phases, as described above, but using a sinusoidal pattern with a different spatial frequency (i.e., a different fringe pitch). In some cases, the same approach needs to be repeated for three or four different fringe pitches. The method of removing ambiguity using this method is well known in the art and is not discussed further here.

To obtain a higher level of accuracy using a sequential projection method such as the sinusoidal phase-shift method described above, it may be advantageous to minimize the movement of the six-DOF scanner. Although the position and orientation of the six-DOF scanner are known from the six-DOF measurements made by the laser tracker and although corrections can be made for movements of a handheld six-DOF scanner, the resulting noise will be somewhat higher than it would have been if the scanner were kept stationary by placing it on a stationary mount, stand, or fixture.

In general, 3D coordinates obtained through the use of triangulation require knowledge of the distance between perspective centers of a projector lens and a camera lens or a distance between two camera lenses. The distance between these perspective centers is referred to as the baseline distance. In addition, knowledge of the relative orientation of the projector and camera or first camera and second camera are required to complete a triangulation calculation. Some measurement is usually carried out, perhaps by a manufacture or perhaps by a user, to determine the baseline distance and relative orientations.

Figure 14:
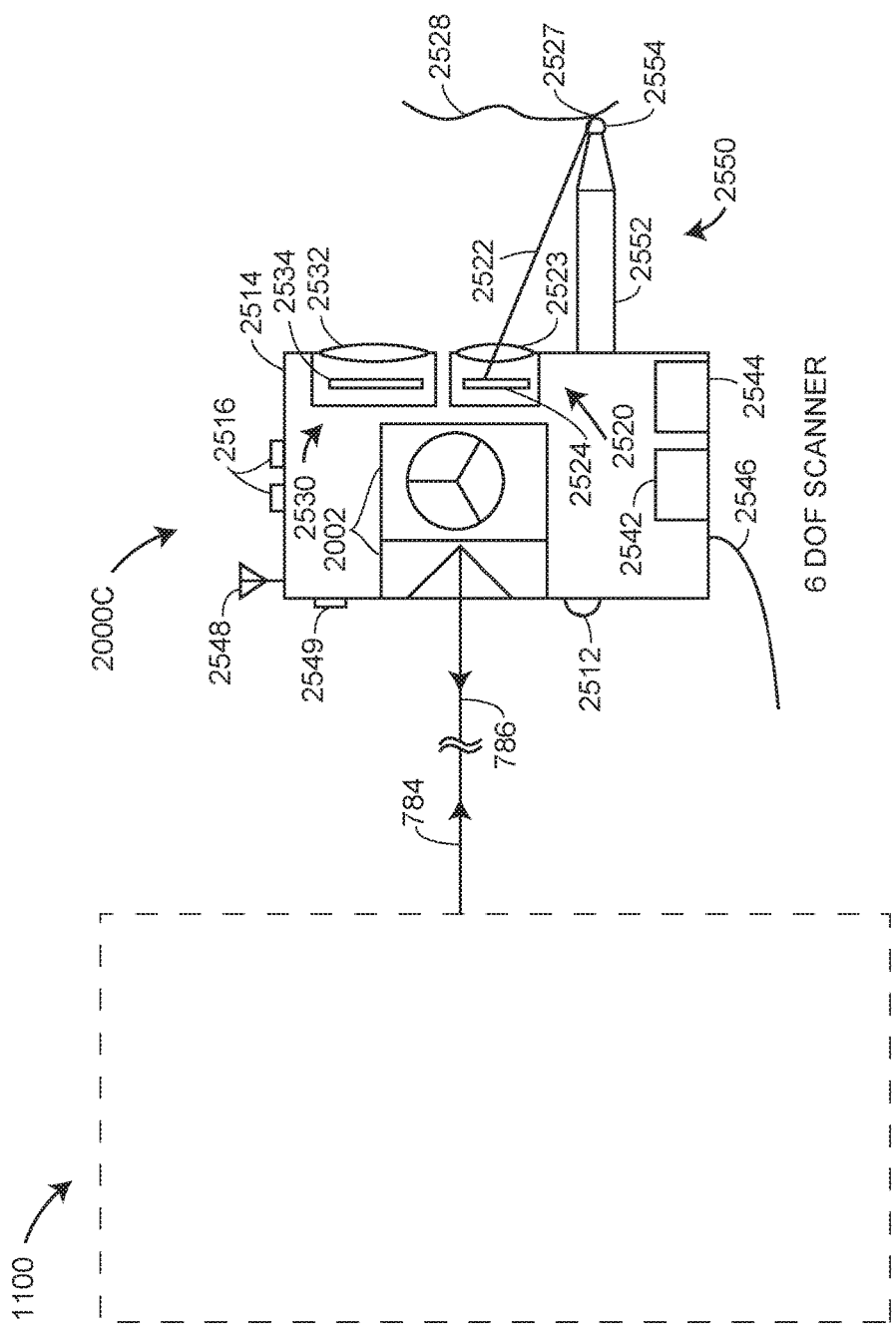
FIG. 14 is a schematic representation of a six-DOF triangulation scanner further including a tactile probe according to an embodiment.

One limitation in the accuracy of scanners may be present for certain types of objects. For example, some features such as holes or recesses may be difficult to scan effectively. The edges of objects or holes may be difficult to obtain as smoothly as might be desired. Some types of materials may not return as much light as desired or may have a large penetration depth for the light. In other cases, light may reflect off more than one surface (multipath interference) before returning to the scanner so that the observed light is "corrupted," thereby leading to measurement errors. In any of these cases, it may be advantageous to measure the difficult regions using a six-DOF scanner 2000C shown in FIG. 14 that includes a tactile probe that includes the probe tip 2554, which is part of the probe extension assembly 2550. After it has been determined that it would be advantageous to measure with a tactile probe, the projector 2520 may send a laser beam to illuminate the region to be measured. In FIG. 14, a projected ray of beam of light 2522 is illuminating a point 2527 on an object 2528, indicating that this point is to be measured by the probe extension assembly 2550. In some cases, the tactile probe may be moved outside the field of projection of the projector 2550 so as to avoid reducing the measurement region of the scanner. In this case, the beam 2522 from the projector may illuminate a region that the operator may view. The operator can then move the tactile probe 2550 into position to measure the prescribed region. In other cases, the region to be measured may be outside the projection range of the scanner. In this case, the scanner may point the beam 2522 to the extent of its range in the direction to be measured or it may move the beam 2522 in a pattern indicating the direction to which the beam should be placed. Another possibility is to present a CAD model or collected data on a display monitor and then highlight on the display those regions of the CAD model or collected data that should be re-measured. It is also possible to measure highlighted regions using other tools, for example, a spherically mounted retroreflector or a six-DOF probe under control of a laser tracker.

Figure 15:
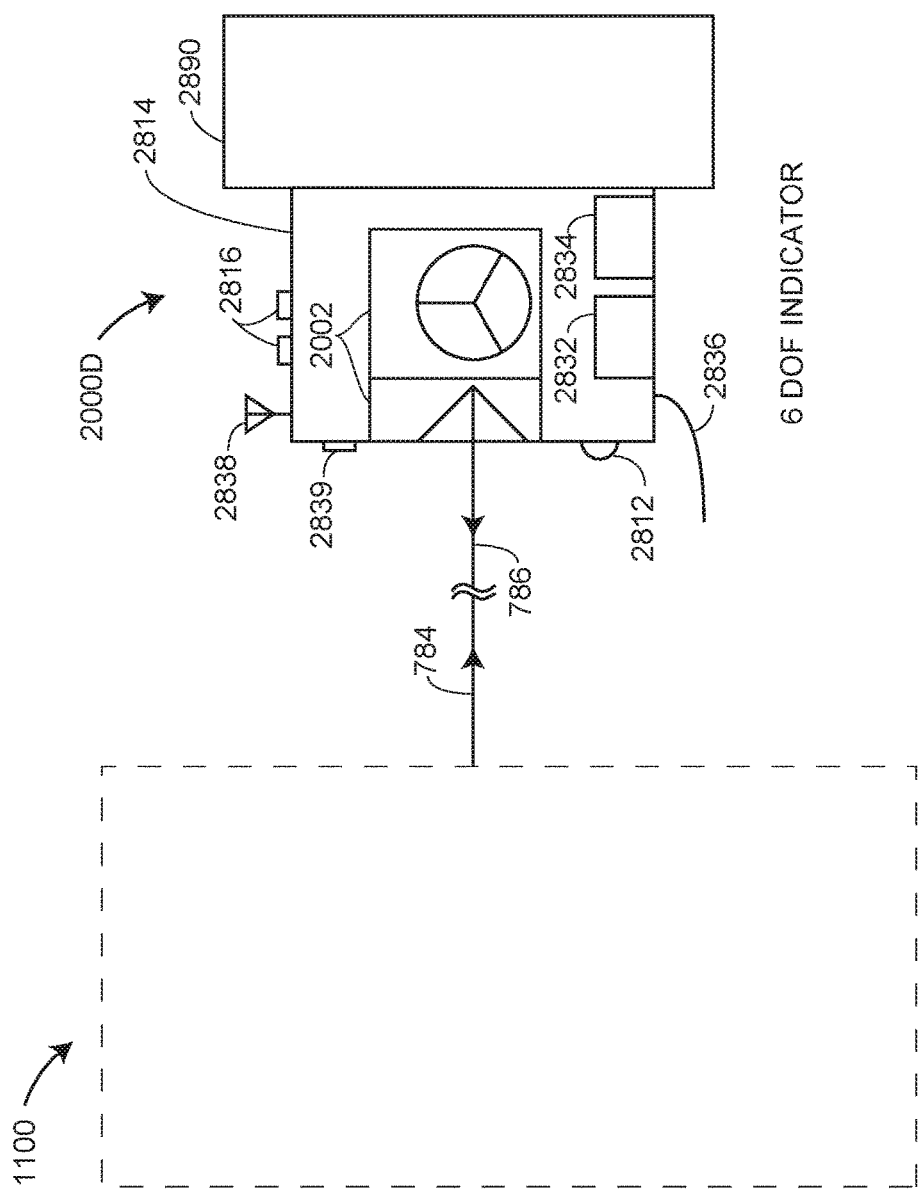
FIG. 15 is a schematic representation of a six-DOF indicator according to an embodiment.

FIG. 15 shows an embodiment of a six-DOF indicator 2000D used in conjunction with the six-DOF laser tracker 1100. The six-DOF indicator 2000D includes a body 2814, one or more six-DOF assemblies 2002, a mount 2890, an optional electrical cable 2836, an optional battery 2834, an interface component 2812, an identifier element 2839, actuator buttons 2816, an antenna 2838, and an electronics circuit board 2832. Each of the one or more six-DOF assemblies 2002 includes a retroreflector. The mount 2890 may be attached to a moving element, thereby enabling the laser tracker to measure the six degrees of moving element. The moving element may be a robotic end effector, a machine tool, or a tool on an assembly (e.g., an assembly line carriage).

Figure 16:
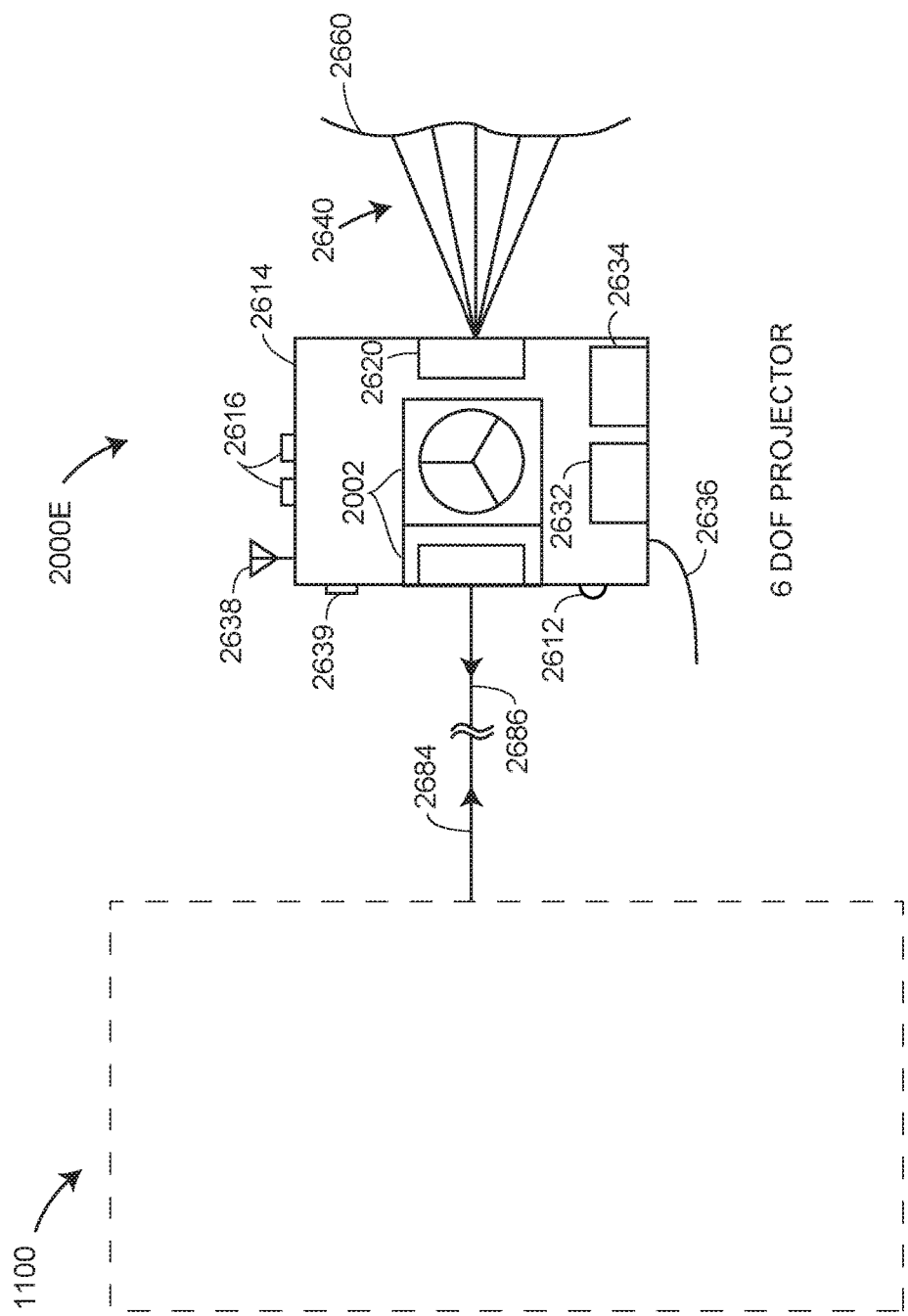
FIG. 16 is a schematic representation of a six-DOF projector according to an embodiment.

FIG. 16 shows an embodiment of a six-DOF projector 2000E used with a six-DOF laser tracker 1100. The six-DOF projector 2000E includes a body 2614, one or more six-DOF assemblies 2002, a projector 2620, an optional electrical cable 2636, an optional battery 2634, an interface component 2612, an identifier element 2639, actuator buttons 2616, an antenna 2638, and an electronics circuit board 2632. Each of the six-DOF assemblies 2002 includes a retroreflector. The descriptions for these elements are the same as discussed for corresponding elements described hereinabove and are not repeated. The six-DOF projector 2000E may include a light source, a light source and a steering mirror, a MEMS micromirror, a liquid crystal projector, or any other device capable of projecting a pattern of light onto a workpiece 2600. From the six degrees of freedom, the three dimensional coordinates of the projected pattern of light may be found in the tracker frame of reference, which in turn may be converted into the frame of reference of the workpiece through the measurement by the laser tracker of three points on the workpiece, for example.

With the projected pattern of light 2640 on the surface of the workpiece 2660 known in the frame of reference of the workpiece, a variety of useful capabilities can be obtained. As a first example, the projected pattern may indicate where an operator should drill holes or perform other operations to enable the affixing of components onto the workpiece 2660. For example, gauges may be attached to the cockpit of an aircraft. Such a method of in-situ assembly can be cost effective in many cases. As a second example, the projected pattern may indicate where material needs to be added to or removed from a tool through the use of contour patterns, color coded tolerance patterns, or other graphical means. An operator may use a tool to abrade unwanted material or use a filler material to fill in an area. Because the laser tracker or an external computer attached to the laser tracker may know the details of the CAD model, the six-DOF projector can provide a relatively fast and simple method for modifying a tool to meet CAD tolerances. Other assembly operations might include scribing, applying adhesive, applying a coating, applying a label, and cleaning. As a third example, the projected pattern may indicate hidden components. For example, tubing or electrical cables may be routed behind a surface and hidden from view. The location of these components may be projected onto the workpiece, thereby enabling the operator to avoid them in performing assembly or repair operations.

To project light from the projector scanner into the frame of reference of the workpiece, it the frame of reference of the workpiece may be determined in the frame of reference of the laser tracker. One way to do this is to measure three points on the surface of the workpiece with the laser tracker. Then a CAD model or previously measured data may be used to establish a relationship between a workpiece and a laser tracker.

When an operator performs assembly operations with the assistance of a six-DOF projector, a useful process is to mount the six-DOF projector on a stationary stand or mount, thereby enabling the operator to perform assembly operations with both hands free. A useful mode of the laser tracker and six-DOF projector is to have the six-DOF projector continue to project a pattern of light even after the laser tracker ceases to track the retroreflector on the six-DOF scanner. In this way, the operator may use the laser tracker to perform measurements, for example, with an SMR, a six-DOF probe, or a six-DOF scanner while the projector continues to display the pattern of light that indicates the assembly operations to be performed. In a similar manner, the tracker may be used to set up two or more scanner projectors that continue to project patterns after the tracker has stopped tracking the retroreflector on each scanner projector. Hence high levels of detail may be projected onto relatively large areas, enabling assistance to several operators simultaneously. It is also possible in a mode to enable the six-DOF scanner to project any of several alternative patterns, thereby enabling the operator to perform assembly operations is a prescribed sequence.

In addition to assisting with assembly operations, the projector scanner can also assist in carrying out inspection procedures. In some cases, an inspection procedure may call for an operator to perform a sequence of measurements in a particular order. The six-DOF scanner may point to the positions at which the operator is to make a measurement at each step. The six-DOF scanner may demarcate a region over which a measurement is to be made. For example, by drawing a box, the six-DOF scanner may indicate that the operator is to perform a scanning measurement over the region inside the box, perhaps to determine the flatness of the regions or maybe as part of a longer measurement sequence. Because the projector can continue the sequence of steps with the six-DOF retroreflector being tracked by the laser tracker, the operator may continue an inspection sequence using the tracker or using other tools. If the tracker is performing the measurements, it will know when measurements have been successfully completed and may move onto the next step. The projector scanner may also provide information to the operator in the form of written messages or audio messages. The operator may signal commands to the laser tracker using gestures that may be picked up by the tracker cameras or by other means.

The six-DOF projector may use patterns of light, perhaps applied dynamically, to convey information. For example, the six-DOF projector may use a back and forth motion to indicate a direction to which an SMR is to be moved. The six-DOF projector may draw other patterns to give messages that may be interpreted by an operator according to a set of rules, the rules which may be available to the user in written or displayed form.

The six-DOF projector may also be used to convey information to the user about the nature of an object under investigation. For example, if dimensional measurements have been performed, the six-DOF projector might project a color coded pattern indicating regions of error associated in the surface coordinates of the object under test. In one embodiment, the projector may display regions or values that are out of tolerance. It may, for example, highlight a region for which the surface profile is outside the tolerance. In another embodiment, the projector may draw a line to indicate a length measured between two points and then write a message on the part indicating the amount of error associated with that distance.

The six-DOF projector may also display information about measured characteristics besides dimensional characteristics, wherein the characteristics are tied to coordinate positions on the object. Such characteristics of an object under test may include temperature values, ultrasound values, microwave values, millimeter-wave values, X-ray values, radiological values, chemical sensing values, and many other types of values. Such object characteristics may be measured and matching to three-dimensional coordinates on an object using a six-DOF scanner, as discussed hereinafter. In an embodiment, characteristics of an object may be measured on the object using a separate measurement device, with the data correlated in some way to dimensional coordinates of the object surface with an object frame of reference. Then by matching the frame of reference of the object to the frame of reference of the laser tracker or the six-DOF projector, information about the object characteristics may be displayed on the object, for example, in graphical form. For example, temperature values of an object surface may be measured using a thermal array. Each of the temperatures may be represented by a color code projected onto the object surface.

A six-DOF projector may also project modeled data onto an object surface. For example, it might project the results of a thermal finite element analysis (FEA) onto the object surface and then allow the operator to select which of two displays—FEA or measured thermal data—is displayed at any one time. Because both sets of data are projected onto the object at the actual positions where the characteristic is found—for example, the positions at which particular temperatures have been measured or predicted to exist, the user is provided with a clear and immediate understanding of the physical effects affecting the object. The six-DOF projector may also be attached to a moveable carrier such as a robot or machine tool.

Figure 17:
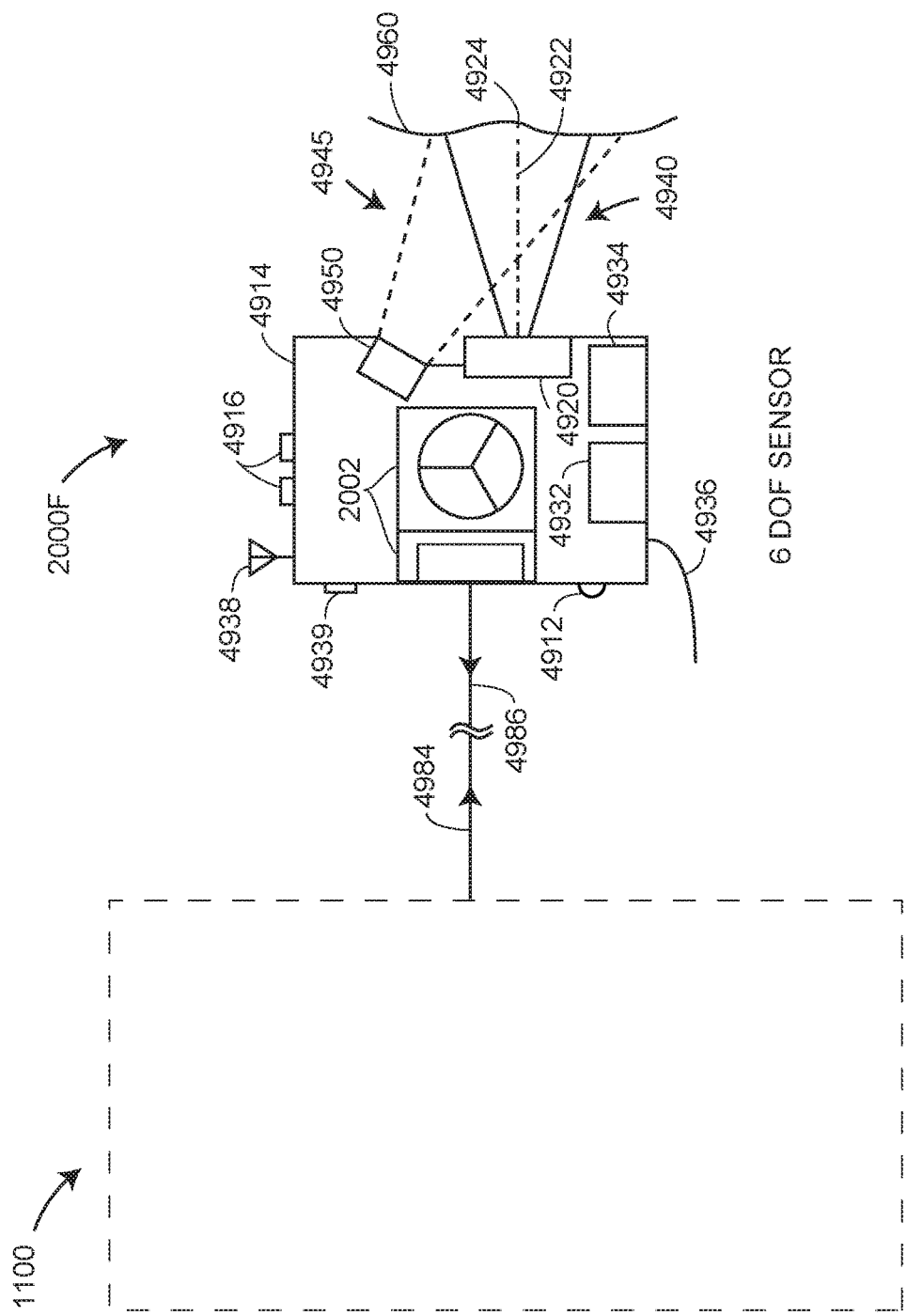
FIG. 17 is a schematic representation of a first type of six-DOF sensor according to an embodiment.

FIG. 17 shows an embodiment of a six-DOF sensor 2000F used in conjunction with a six-DOF laser tracker 1100. In an embodiment, the six-DOF sensor 2000F includes a body 4914, one or more six-DOF assemblies 2002, a sensor 4920, an optional source 4950, an optional electrical cable 4936, an optional battery 4934, an interface component 4912, an identifier element 4939, actuator buttons 4916, an antenna 4938, and an electronics circuit board 4932. The descriptions for these elements are the same as discussed for corresponding elements described herein above and are not repeated. A plurality of six-DOF assemblies 2002, each including a retroreflector, may be used to enable the laser tracker 1100 to track the six-DOF sensor from a variety of directions, thereby giving greater flexibility in the directions to which an object may be sensed by the six-DOF sensor 2000F.

The sensor 2000F may be of a variety of types. For example, it may respond to optical energy in the infrared region of the spectrum, the light having wavelengths from 0.7 to 20 micrometers, thereby enabling determination of a temperature of an object surface at a point 4924. The sensor 2000F is configured to collect infrared energy emitted by the object 4960 over a field of view 4940, which is generally centered about an axis 4922. The three-dimensional coordinates of the point on the object surface corresponding to the measured surface temperature may be found by projecting the axis 4922 onto the object 4960 and finding the point of intersection 4924. To determine the point of intersection, the relationship between the object frame of reference and the device (tracker) frame of reference needs to be known. In an embodiment, the relationship between the object frame of reference and the six-DOF sensor frame of reference may be known since the relationship between the tracker frame of reference and the sensor frame of reference is already known. In another embodiment, the relationship between the object frame of reference and the six-DOF sensor frame of reference may be known since the relationship between the tracker frame of reference and the six-DOF sensor is already known from measurements performed by the tracker on the six-DOF sensor. One way to determine the relationship between the object frame of reference and the tracker frame of reference is to measure the three-dimensional coordinates of three points on the surface of the object. By having information about the object in relation to the three measured points, all points on the surface of the object will be known. Information on the object in relation to the three measured points may be obtained, for example, from CAD drawings or from previous measurements made by any type of coordinate measurement device.

Besides measuring emitted infrared energy, the electromagnetic spectrum may be measured (sensed) over a wide range of wavelengths, or equivalently frequencies. For example, electromagnetic energy may be in the optical region and may include visible, ultraviolet, infrared, and terahertz regions. Some characteristics, such as the thermal energy emitted by the object according to the temperature of the object, are inherent in the properties of the object and do not require external illumination. Other characteristics, such as the color of an object, depend on background illumination and the sensed results may change according to the characteristics of the illumination, for example, in the amount of optical power available in each of the wavelengths of the illumination. Measured optical characteristics may include optical power received by an optical detector, and may integrate the energy a variety of wavelengths to produce an electrical response according to the responsivity of the optical detector at each wavelength.

In some embodiments, the illumination may be intentionally applied to the object by a source 4950. If an experiment is being carried out in which it is desired that the applied illumination be distinguished from the background illumination, the applied light may be modulated, for example, by a sine wave or a square wave. A lock-in amplifier or similar method can then be used in conjunction with the optical detector in the sensor 4920 to extract just the applied light.

Other examples of the sensing of electromagnetic radiation by the sensor 4940 include the sensing of X-rays at wavelengths shorter than those present in ultraviolet light and the sensing of millimeter-wave, microwaves, RF wave, and so forth are examples of wavelengths longer than those present in terahertz waves and other optical waves. X-rays may be used to penetrate materials to obtain information about interior characteristics of object, for example, the presence of defects or the presence of more than one type of material. The source 4950 may be used to emit X-rays to illuminate the object 4960. By moving the six-DOF sensor 2000F and observing the presence of a defect or material interface from a plurality of views, it is possible to determine the three-dimensional coordinates of the defect or material interface within the material. Furthermore, if a sensor 2000F is combined with a projector such as the projector 2720 in FIG. 16, a pattern may be projected onto an object surface that indicates where repair work needs to be carried out to repair the defect.

In an embodiment, the source 4950 provides electromagnetic energy in the electrical region of the spectrum—millimeter-wave, microwave, or RF wave. The waves from the source illuminate the object 4960, and the reflected or scattered waves are picked up by the sensor 4920. In an embodiment, the electrical waves are used to penetrate behind walls or other objects. For example, such a device might be used to detect the presence of RFID tags. In this way, the six-DOF sensor 2000F may be used to determine the position of RFID tags located throughout a factory. Other objects besides RFID tags may also be located. For example, a source of RF waves or microwaves such as a welding apparatus emitting high levels of broadband electromagnetic energy that is interfering with computers or other electrical devices may be located using a six-DOF scanner.

In an embodiment, the source 4950 provides ultrasonic waves and the sensor 4920 is an ultrasonic sensor. Ultrasonic sensors may have an advantage over optical sensors when sensing clear objects, liquid levels, or highly reflective or metallic surfaces. In a medical context, ultrasonic sensors may be used to localize the position of viewed features in relation to a patient's body. The sensor 4920 may be a chemical sensor configured to detect trace chemical constituents and provide a chemical signature for the detected chemical constituents. The sensor 4920 may be configured to sense the presence of radioactive decay, thereby indicating whether an object poses a risk for human exposure. The sensor 4920 may be configured to measure surface texture such as surface roughness, waviness, and lay. The sensor may be a profilometer, an interferometer, a confocal microscope, a capacitance meter, or similar device. A six-DOF scanner may also be used for measure surface texture. Other object characteristics can be measured using other types of sensors not mentioned hereinabove.

Figure 18:
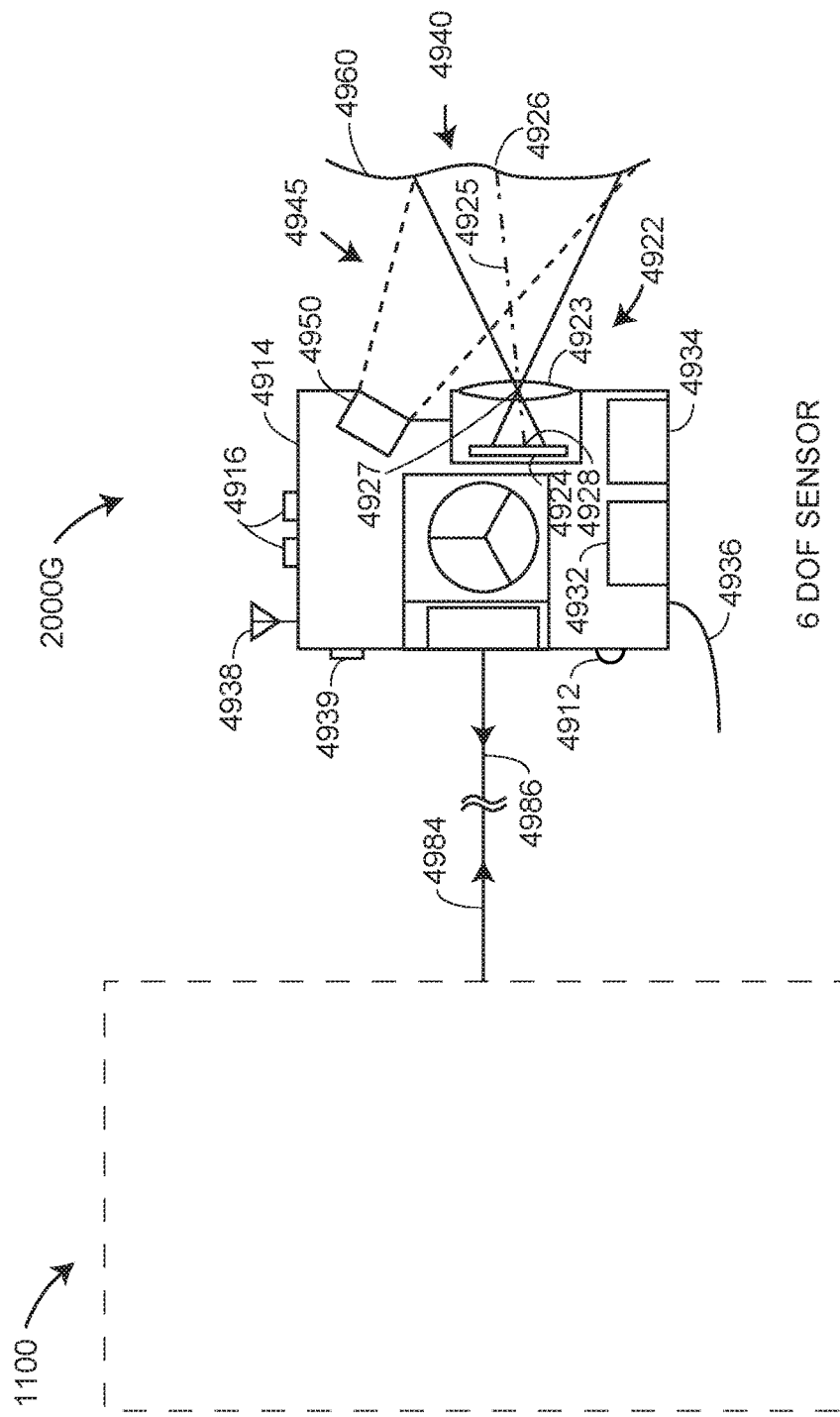
FIG. 18 is a schematic representation of a second type of six-DOF sensor according to an embodiment.

FIG. 18 shows an embodiment of a six-DOF sensor 2000G that is like the six-DOF sensor 2000F of FIG. 17 except that the sensor 4922 of the six-DOF sensor 2000G includes a lens 4923 and a photosensitive array 4924. An emitted or reflected ray of energy 4925 from within a field of view 4940 of the six-DOF sensor arises at a point 4926 on the object surface 4960, passes through a perspective center 4927 of sensor lens 4923 to arrive at a point 4928 on the photosensitive array 4924. A source 4950 may illuminate a region of the object surface 4960, thereby producing a response on the photosensitive array. Each point is associated with three-dimensional coordinates of the sensed characteristic on the object surface, each three-dimensional point determined by the three orientational degrees of freedom, the three translational degrees of freedom, the geometry of the camera and projector within the sensor assembly, and the position on the photosensitive array corresponding to the point on the object surface. An example of sensor 4922 is a thermal array sensor that responds by providing a temperature at a variety of pixels, each characteristic sensor value associated with a three-dimensional surface coordinate.

Figure 19B:
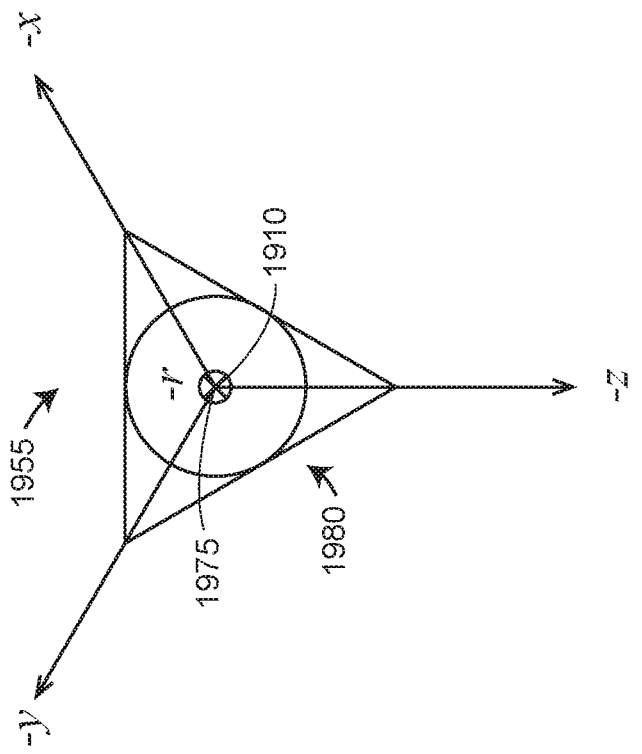
FIG. 19A and FIG. 19B illustrate the geometry of a glass cube-corner retroreflector.
Figure 19A:
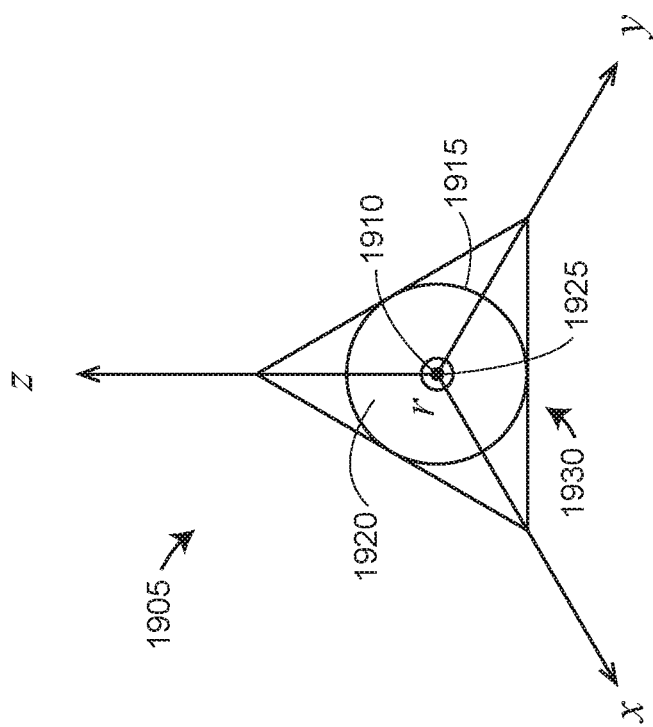

FIG. 19A shows a cube-corner retroreflector in a 3D Cartesian frame of reference. A first octant 1905 of a 3D Cartesian frame of reference extends from the origin 1910 in the positive x, y, z directions. The three planes x-y, y-z, and z-x are mutually perpendicular and serve as sides of the cube-corner retroreflector. The sides extending from the vertex (origin) 1910 are of equal length, forming glass cube-corner prism. The fourth face of the cube corner, which is not in contact with the vertex 1910, is the front face 1920. A vector r 1925 extending in a perpendicular direction from the vertex to the front surface of the prism is symmetric with respect to the axes x, y, z. In most cases, such prisms are formed into a cylindrical shape 1915 by grinding away a portion of the glass to produce cylindrical glass cube-corner prism 1930.

FIG. 19B shows the octant 1955 directly opposite the octant 1905 of FIG. 19A. The octant 1955 occupies a volume extending from the origin 1910 in the −x, −y, −z directions. A cylindrical cube-corner prism 1980 is formed in the same manner as the prism 1930 in FIG. 19A and sits directly opposite the cube-corner prism 1930. A vector −r 1975 extending in a perpendicular from the vertex to the front surface of the prism 1980 is symmetric with respect to the axes −x, −y, −z.

Figures 20A, 20B:
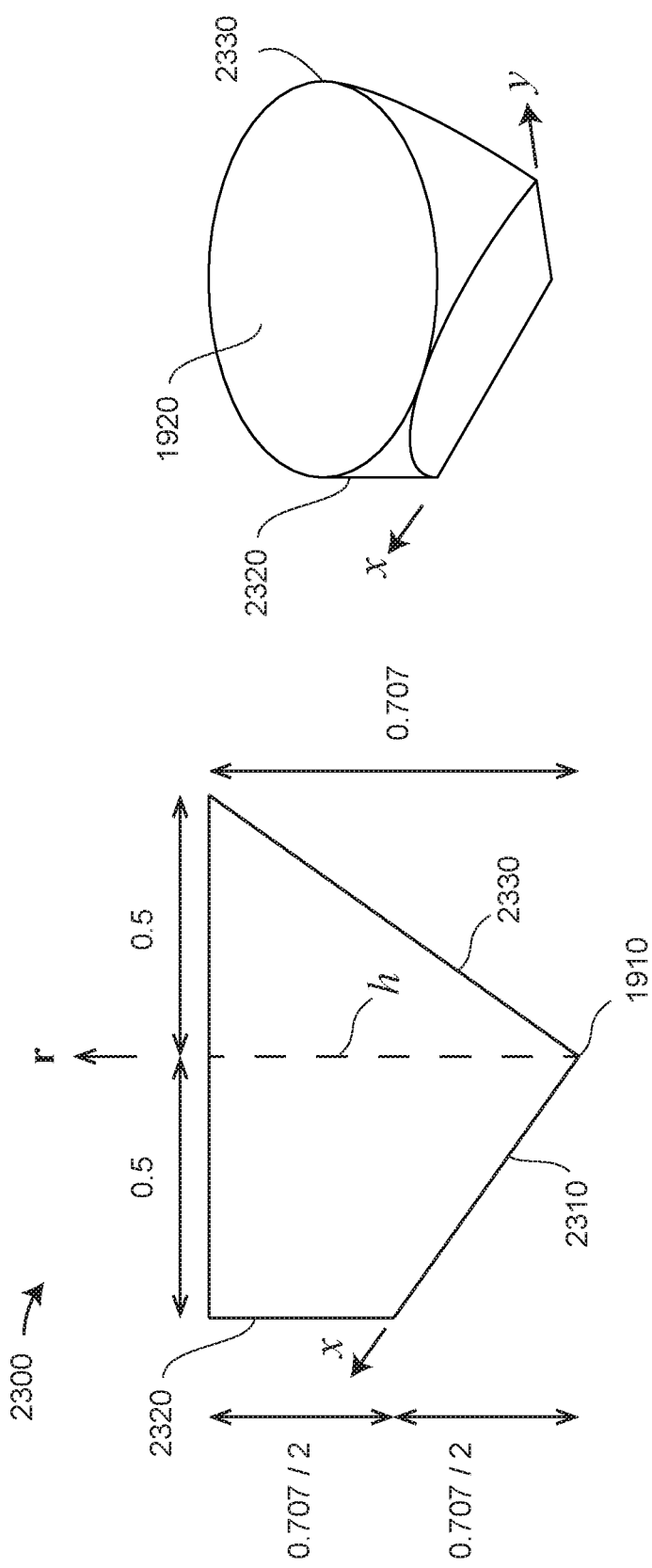
FIG. 20A and FIG. 20B are a cross-section of the glass cube corner and a perspective view of the glass cube corner, respectively.

FIG. 20A shows a slice taken through the x-r plane of FIG. 19A. The diameter of the cylinder 1915 is taken, for scaling purposes, to be 1. A perpendicular drawn from the vertex 1910 to the front face 1920 has an altitude h equal to 0.707. The altitude falls directly in the center of the cylinder. The grinding away of the glass in the prism goes half way down the cylinder at the x axis to a height of 0.707/2. The ground away portion is marked 2320. The portion of the x axis on the prism is the intersection line segment 2310. As can be seen from FIG. 19A, the line 2330 goes through the x-r plane and is opposite the x axis. The line 2330 bisects they and z axes on the y-z plane and, if the prism is not ground into the cylindrical shape, the line 2330 extends all the way to the front face 1920. The grinding of a cube corner into a cylindrical shape produces the scalloped effect of the prism in FIG. 20B.

In a cube-corner retroreflector, light that enters the front face of the prism reflects off three different reflector surfaces before exiting the front face of the prism, thereafter traveling in a direction opposite that of the incoming light. A method from geometrical optics that may be used to analyze the reflection of light off a single surface is shown in FIG. 21. An incident ray of light 2420 strikes a reflecting surface 2410 and reflects at an angle in a ray 2430. It can be shown that this reflection is equivalent to the light continuing to travel straight through the reflective surface 2410 as long as a reflection of the light 2440 is performed afterwards to obtain the actual reflected light 2430.

Figure 22:
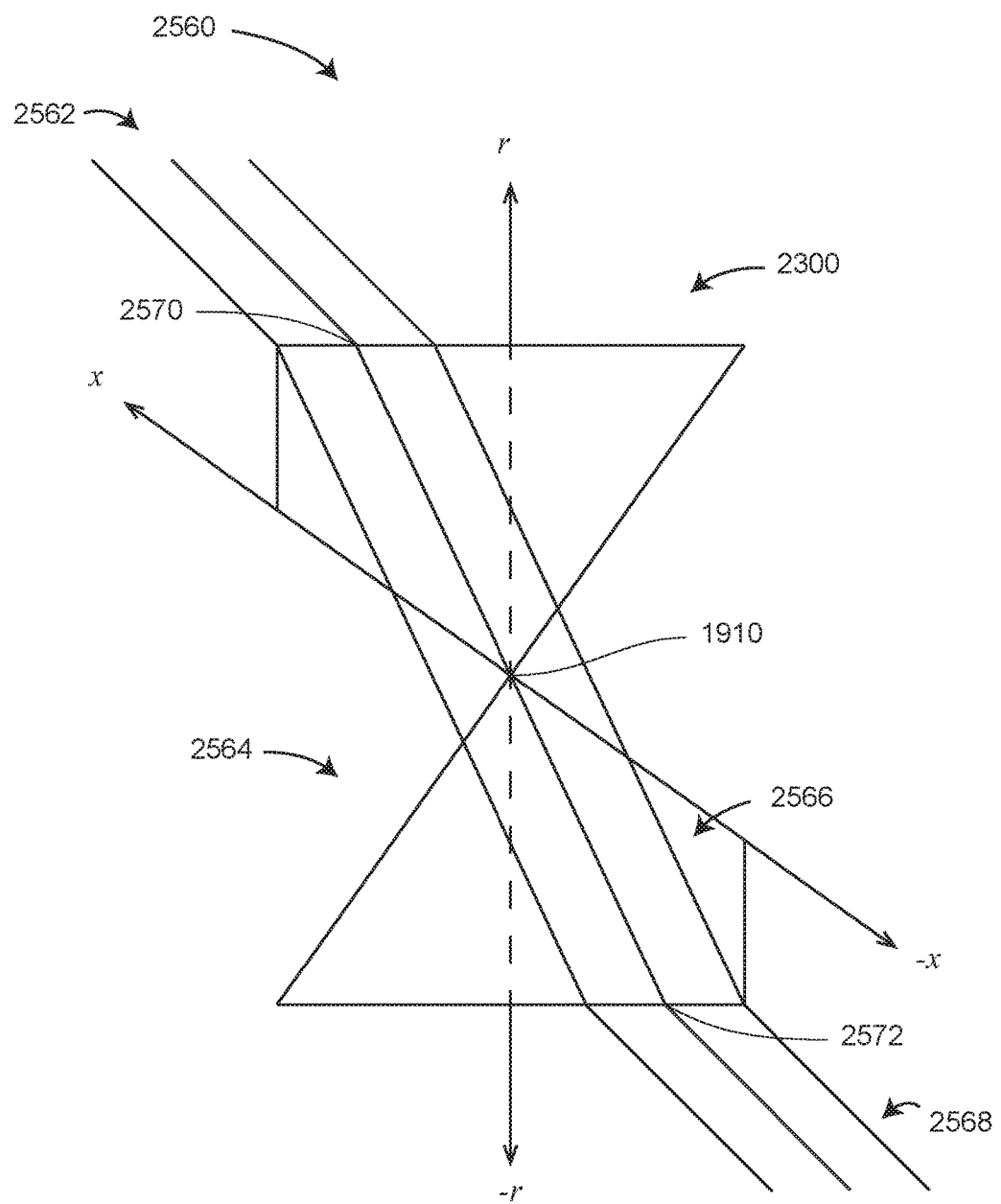
FIG. 22 is a cross sectional view of light passing through glass cube-corner cross sections in two opposing octants.

FIG. 22 shows a cross-section 2560 of the glass prisms 1930, 1980 in the quadrants 1905, 1955 in FIGS. 19A, 19B. The cross section is taken through the axes x, x, r, −r. Light 2562 enters the front face of the cube-corner prism 2300. For the purposes of mathematical modeling, light 2566 continues through a second cube-corner prism 2564 and exits the front face as light 2568. The light 2562 that enters the front face of the prism 2300 at the surface point 2570 passes through the vertex 1910 and exits the front face of the prism 2564 at the point 2572. The points 2570 and 2572 are the same distance from the center of the front faces through which they pass. Only those rays of light that pass through the front face of the prisms 2300 and 2564 may be seen by the camera.

Figure 23:
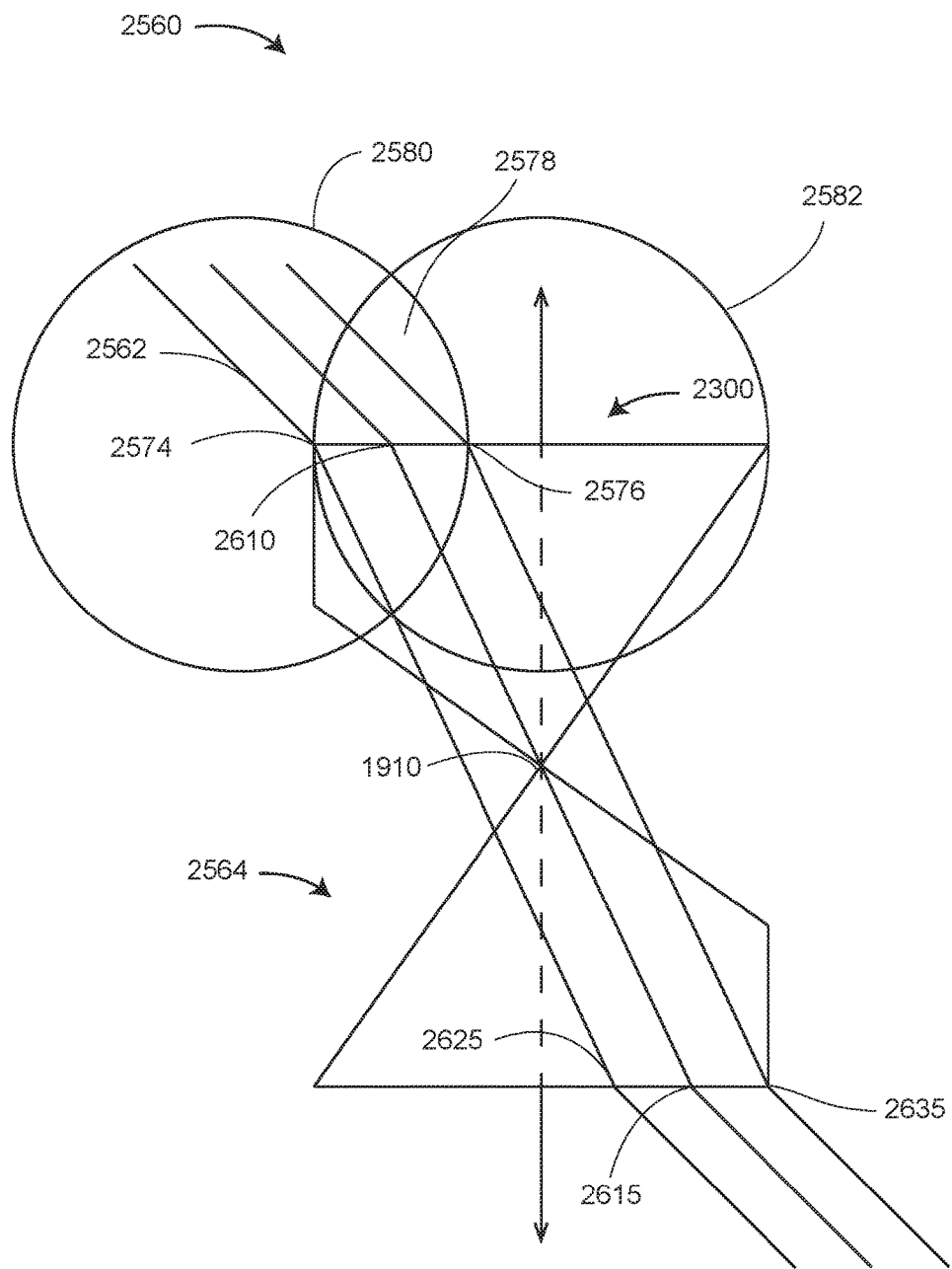
FIG. 23 is a diagram showing how a top view of front faces in two opposing octants indicates a reflected pattern.

In FIG. 23, the circle 2582 represents a top view of the cube corner prism 2300. The curved left edge of the front surface of this prism is illuminated by the light 2562. The light that illuminates the rightmost part of the prism 2300 is lost because it does not pass through the front face of the prism 2564. For example, the ray of light 2574 on the edge of the front face of the prism 2300 passes through a central region of the front face of the prism 2564 and hence represents a ray that will be reflected. The reflected ray, represented the point 2576 on the front face of prism 2300, lies on opposite side of the point 2610. The distance from the point 2574 to the point 2625 is equal to the distance from the point 2610 to the point 2615. The situation is similar for the ray passing through the point 2576, which passes the edge of the front face of the prism 2564 at the point 2635.

The resulting region of cube-corner illumination, which will be viewed by an observed or a camera as a bright region, is the eye-shaped region 2578. The front face of the prism 2300 is an illuminated circle viewed at an angle by an observer. It can be shown that a tilted circle is an ellipse. Hence an observer or a camera aligned with the direction of the light 2562 will see the front face of the prism 2300 as an ellipse. The front face of the prism 2564 is represented by the circle 2580, which when viewed by an observer at an angle, appears as an ellipse. The point 2610 is in the center of the "eye" shaped region that encompasses the overlap of the circles 2580 and 2582. When viewed from an angle, the two segments at the periphery of the eye-shaped region are elliptical segments rather than circular segments.

Figure 24:
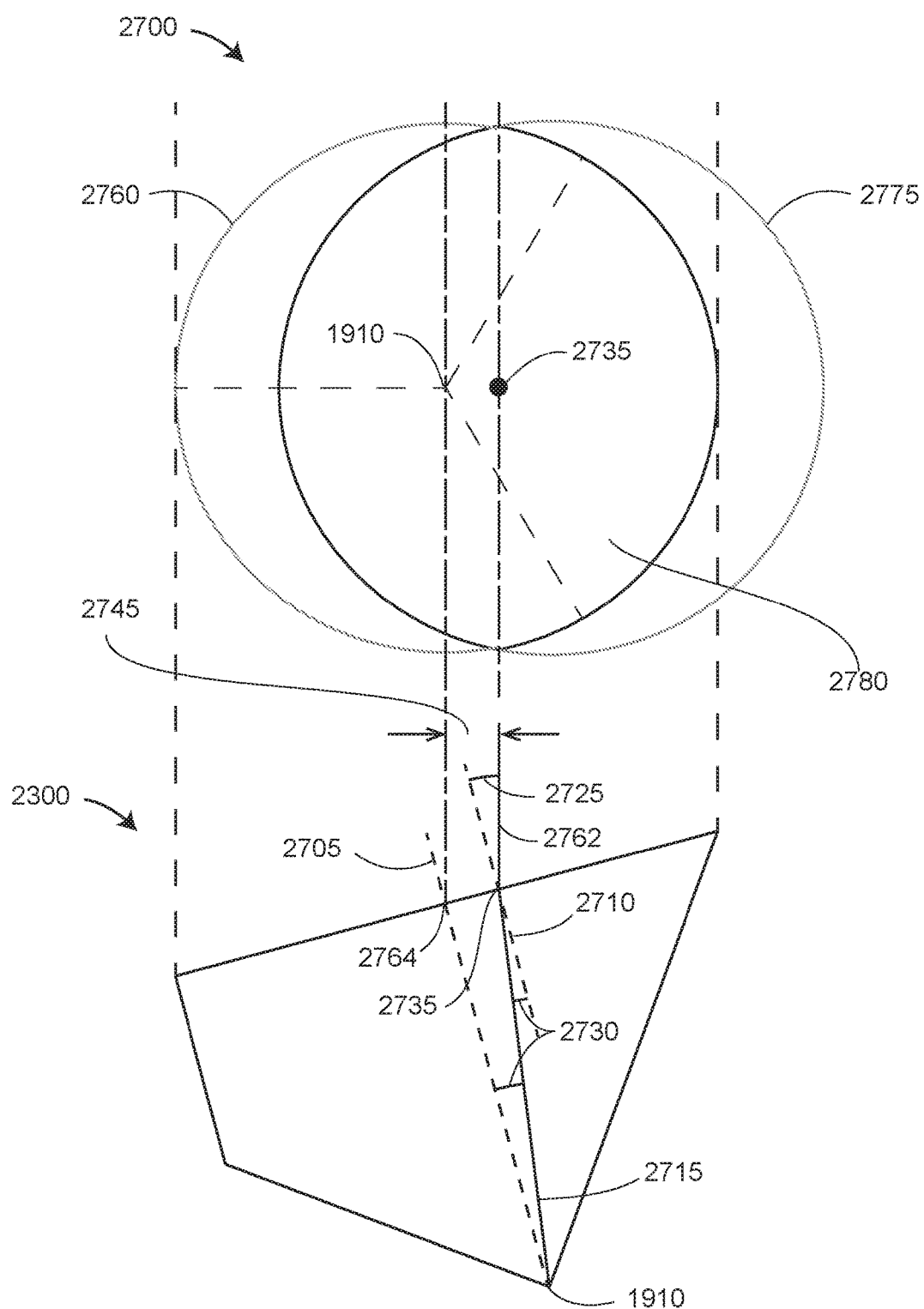
FIG. 24 illustrate the effect of tilting a cube-corner retroreflector.

The upper portion of FIG. 24 shows an ellipse 2760 corresponding to the view of the front surface of the prism 2300 that will be seen by an observer for the prism 2300 tilted at an angle. A cross-sectional side view of the tilted prism in the lower portion of FIG. 24. The ray of light 2762 enters the prism at a point 2735 on the front face. The ray of light 2762 has an angle of incidence 2725, which is taken with respect to a normal 2710 to the front surface. Entering the glass, the refracted ray of light 2715 bends toward the normal to an angle 2730. The angle of bending of the light may be determined using Snell's Law, which in one form states that for a glass having an index of refraction n and an angle of incidence a, the angle of refraction b is equal to b=arcsin(sin(a)/n). In this instance, the angle of incidence is a=15 degrees. If the index of refraction of the glass is n=1.78, the angle of refraction is b=8.4 degrees. Because of refraction, the ray of light that intersects the vertex 1910 crosses the front face of prism 2300 at the point 2735, referred to as the central intersection point. The dashed lines in the ellipse 2760 represent the lines of intersection of the reflector planes as projected perpendicular to the front face. These lines converge at the center 2764 of the front face.

The change from a circle to an ellipse in the top view of FIG. 24 is small and perhaps difficult to detect by eye. However, the change in the position of the center 2764 of the front face relative to the central intersection point 2735 is much larger and may be easily seen by eye. This size of the ellipse along the direction of its minor axis changes from the diameter value by only 1−cos(15°)=0.034, or about 3% of the diameter. In contrast, for an altitude h and diameter D, the central intersection point moves by an amount equal to h sin(15°)=0.707D sin(15°)=0.18D, or about 18 percent of the diameter. The separation parameter 2745 is defined as the distance from the center 2764 of the front face to the central intersection point 2735.

Figure 25:
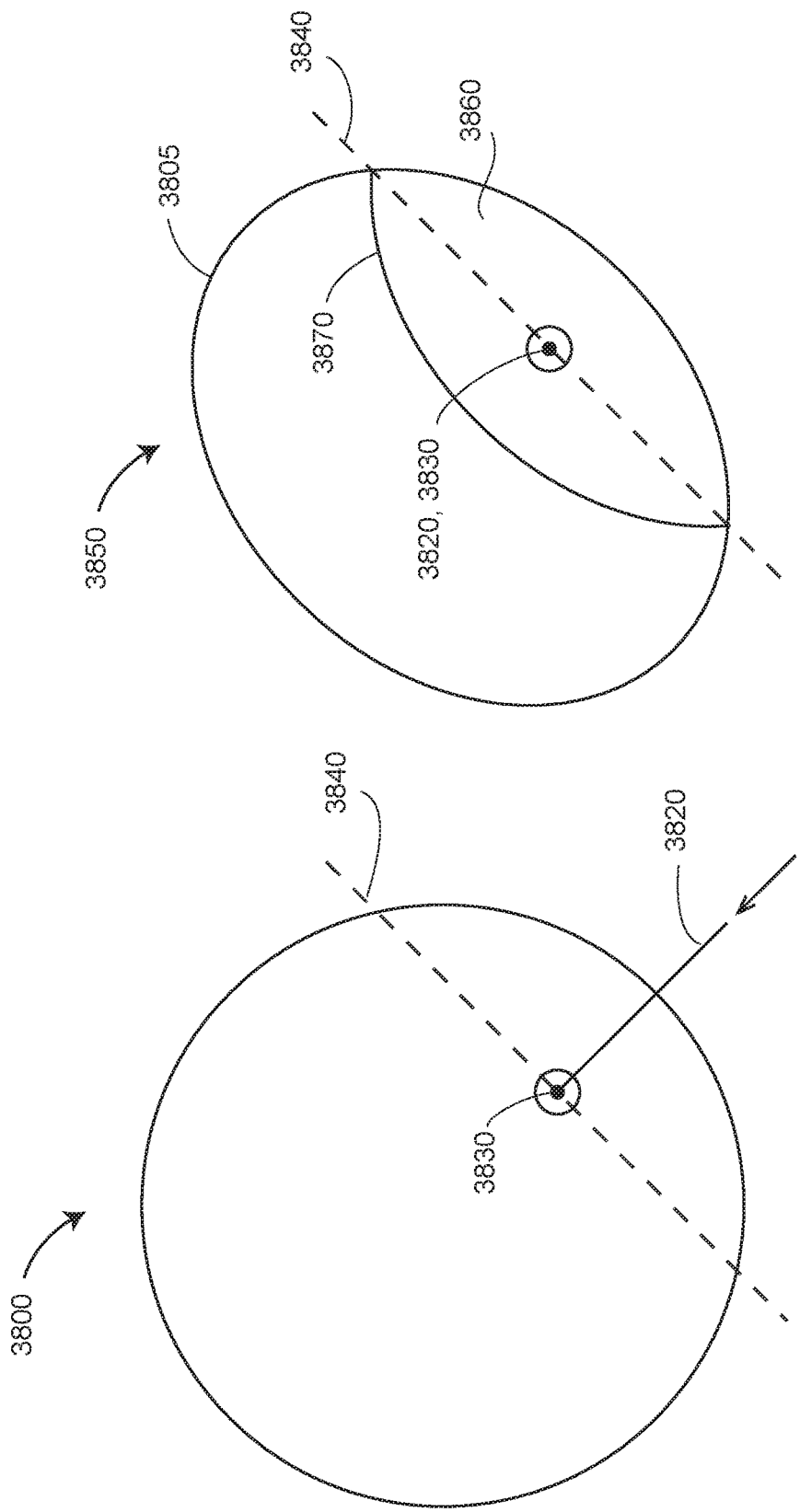
FIG. 25A and FIG. 25B show a ring placed around the periphery of a cube-corner prism and the appearance of the ring when the retroreflector is tilted, respectively.

FIGS. 25A and 25B show a beam of light 3820, for example from a laser tracker, intersecting the front face of a cube corner retroreflector at an intersection point 3830. FIG. 25A shows the appearance 3800 of the front face from a face-on view. FIG. 25B shows the shape 3850 of the front face as viewed from the source of the light 3820. From this view, the front face has an elliptical shape 3805. The portion of the ellipse that appears illuminated to an observer is the eye region 3860, which is bounded by two elliptical segments, one segment being 3870 and the other segment being a portion of the ellipse 3805. The two elliptical segments an axis of symmetry 3840, which is referred to as the fold axis. The fold axis 3840 is perpendicular to the direction of the light 3820 and includes the intersection point 3830.

The elliptical edges of an illuminated cube-corner retroreflector are always present in any camera image as long as the front face is fully illuminated and the camera field of view is large enough. One way to describe the amount and direction of tilt is using a fold angle and a tilt angle. Here, the fold angle is defined as an angle of the fold axis and the tilt angle is the amount of rotation of the retroreflector about the fold axis. In the example of FIG. 25B, the fold angle is 45 degrees and the tilt angle is 40 degrees.

Figure 26:
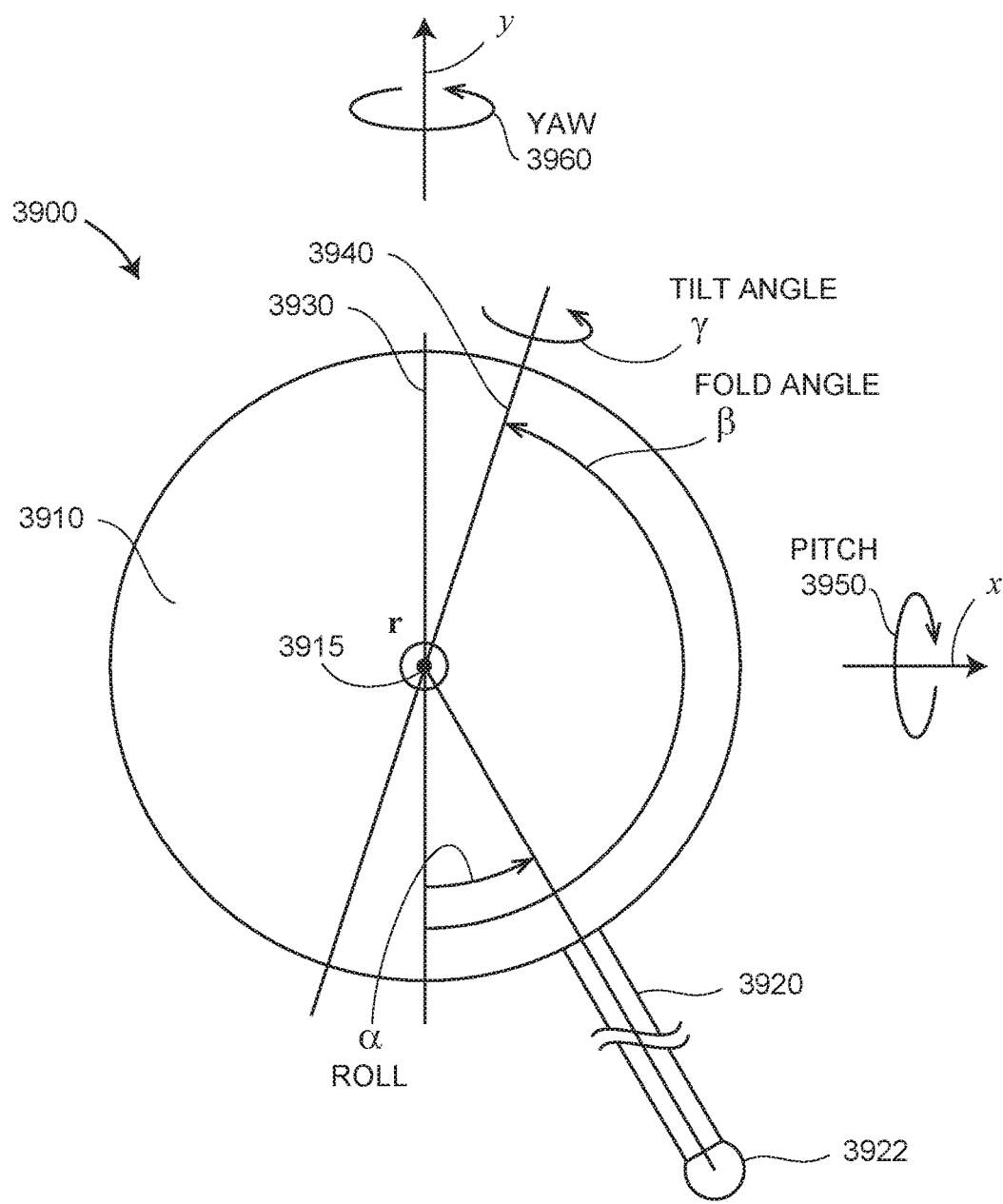
FIG. 26 illustrates the meaning of the term roll angle and illustrates two alternative ways of describing the other two orientational degrees of freedom: pitch/yaw angles and fold/tilt angles.

Another way to describe the amount and direction of tilt of the front face is in terms of a pitch and yaw angle. As illustrated by FIG. 26, the pitch and yaw angles are defined in terms of x and y axes of a specified coordinate system (i.e., frame of reference). The pitch angle is an angle of rotation 3950 about an x axis, and the yaw angle is an angle of rotation 3960 about a y axis. Because rigid body rotation is not commutative, it is necessary to state whether the pitch rotation is occurs before or after the yaw rotation. The fold axis 3940 is an axis about which the front face 3910 is tilted. The fold angle β is given with respect to a reference axis 3930. The tilt angle γ is an amount of rotation of the front face 3910 about the fold axis 3940. The vector r, taken from FIGS. 19A and 20A is perpendicular to the front face and is distinct from the intersection point 3830 of FIGS. 25A and 25B since the definitions described by FIG. 26 is independent of whether the retroreflector 3900 is illuminated or not.

The pitch and yaw angles or the fold and tilt angles are sufficient to fully describe the amount and direction of tilt of the front face, but they do not describe the point of attachment of a probe stylus 3920 and probing element 3922 to the retroreflector 3900. Such a point of attachment may be described by a roll angle α. This roll angle is given with respect to a reference axis, which in FIG. 26 is the axis 3930, but may be any axis, including an axis different than the one used to define the fold angle. Note that the eye pattern 3860 of FIG. 25B is determined entirely by the fold and tilt angles or, equivalently, by the pitch and yaw angles. The eye pattern 3860 is independent of the roll angle.

Other angular descriptions may replace pitch/yaw angles or fold/tilt angles. One example is the use of direction cosines. Let a beam of light from a laser tracker be along a z axis and the zenith axis along an x axis. Let they axis be perpendicular to the x and z axes. In an embodiment, the direction cosines are three values obtained by taking the cosine of the angle of the x, y, z axes of the laser tracker in relation to r vector of the cube corner prism. However, if the three direction cosines are a, b, c, it can be shown that $a^2+b^2+c^2=1$, so that only two of the three direction cosines are independent.

Other mathematical descriptors that may be used as alternatives to pitch/yaw/roll angles or fold/tilt/roll angles include quaternions and Euler angles. Many other mathematical descriptors may be used to represent the three orientational degrees of freedom.

In the remainder of the present application, the term pitch/yaw is used to represent any descriptor that describes the direction and amount of tilt a retroreflector, including fold/tilt or other similar descriptors.

To determine three orientational degrees of freedom, it is frequently useful to determine one of the orientational degrees of freedom—namely, the roll angle—separately from the two additional orientational degrees of freedom—namely, pitch/yaw angles (or equivalent). The apparatus and methods for measuring roll angle separately from pitch/yaw angles are described herein.

Figure 27:
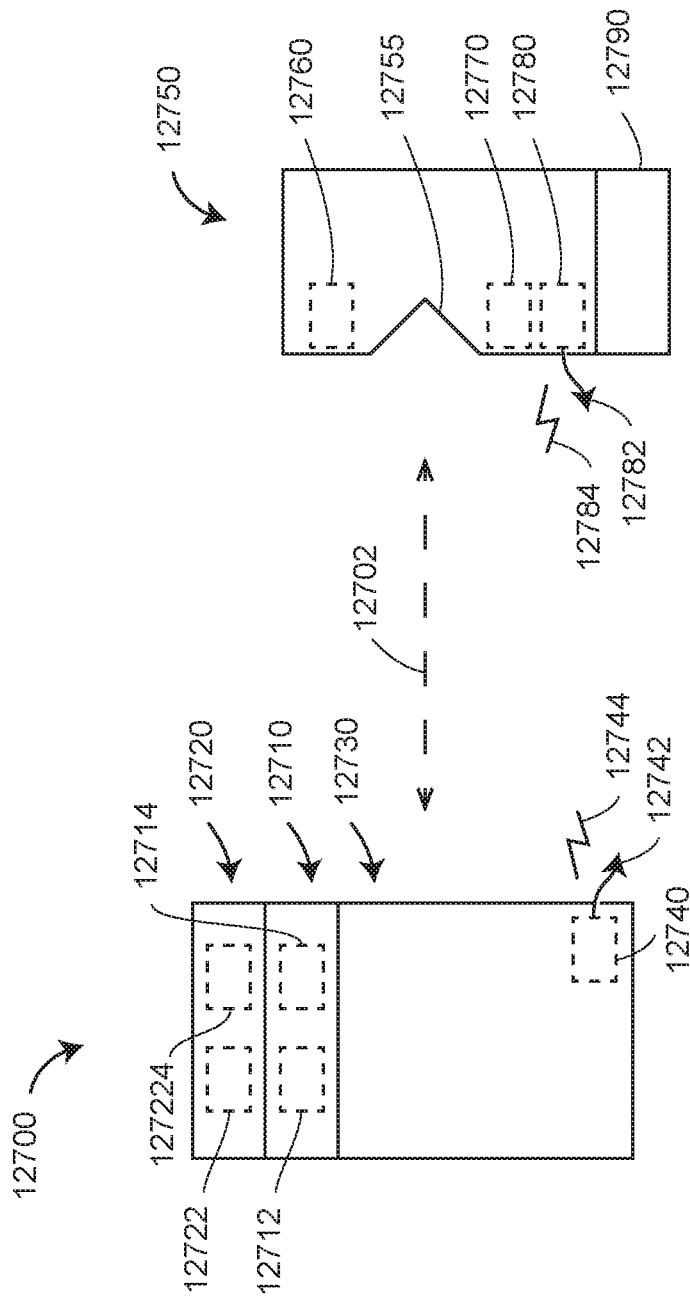
FIG. 27 illustrates a laser tracker and target cooperating to determine six degrees of freedom of the target by performing separate measurements of the roll angle and the pitch/yaw angles according to an embodiment.

FIG. 27 illustrates a method of separately measuring roll angle and pitch/yaw angles (or equivalent). A device 12700 is configured to send one or more beams of light 12702 to a probe 12750. In an embodiment, the probe 12750 includes a retroreflector 12755 that returns the beam of light to the probe 12750. In an embodiment, the device 12700 is a laser tracker that measures a distance and two angles to the retroreflector 12755, enabling a processor 12740 to determine three translational degrees of freedom, which might be, for example, coordinates in a Cartesian (rectangular) or spherical coordinate system. In an embodiment, the device 12700 provides components 12710 that include a roll conditioner 12712 and roll analyzer 12714. The roll conditioner generates or conditions light emitted as a part of the light 12702 and received by probe components 12760. In an embodiment, a portion of the light received by components 12760 is returned in the beam of light 12702 and is received by the roll analyzer 12714 for determining the roll angle of the probe 12750. In other embodiments, the roll angle is determined without the use of a roll analyzer 12714.

In an embodiment, the device 12700 further provides pitch/yaw conditioner components 12720 that include a pitch/yaw conditioner 12722 and pitch/yaw analyzer 12724. The pitch/yaw conditioner generates or conditions light emitted as a part of the light 12702 and received by probe components 12770. In an embodiment, a portion of the light received by components 12770 is returned in the beam of light 12702 and is received by the pitch/yaw analyzer 12724 for determining the pitch/yaw angles (or equivalent) of the probe 12750. In other embodiments, the pitch/yaw angles are determined without the use of an pitch/yaw analyzer 12724. In an embodiment, pitch/yaw and roll conditioning is applied to a single beam of light that is combined into the beam of light 12702. In an embodiment, communication between the device 12700 and the probe 12750 takes place over wired channels 12742 or wireless channels 12744.

In an embodiment illustrated in FIG. 28A and FIG. 28B, a pitch/yaw analyzer is a pass-through retroreflector assembly 12800 that includes a retroreflector 12810 and a position detector 12820. In an embodiment, the retroreflector 12810 is a cube-corner retroreflector 12810 having a front face 12812, three mutually perpendicular reflecting surfaces 12814, and a truncated region 12816 near a virtual vertex 12818 of the retroreflector. A beam of light 12830 from a laser tracker or similar device intersects the front face of the retroreflector in a spot of light 12840. It refracts at the surface of the retroreflector and travels as a beam of light 12832 toward the virtual vertex 12818. In an embodiment, the beam of light 12830 continues to track the virtual vertex 12818 as the retroreflector assembly 12800 is moved. The beam of light 12832 refracts at the truncated region as the beam of light 12834 and intersects the position detector 12820 in the spot of light 12842. The position detector 12820 is configured to determine the position of the light 12834 on the surface of the position detector 12820. The light received by the position detector 12820 may be processed electrically according to methods described herein below and the pitch/yaw angle of the retroreflector 12810 determined by a processor based at least in part on the signal provided by the position detector 12820.

In an embodiment illustrated in FIG. 29A and FIG. 29B, a pitch/yaw analyzer is a retroreflector assembly 12900 that includes a retroreflector 12910 and one or more pitch/yaw sensors. In an embodiment, the retroreflector 12910 is a glass cube-corner prism having a front face 12912, three mutually perpendicular reflecting surfaces 12914, and a vertex 12918 at which the reflecting surfaces intersect. In an embodiment, there are three pitch/yaw sensors 12920A, 12920B, and 12920C. Each pitch/yaw sensor includes a position detector and an aperture. The pitch/yaw sensors 12920A, 12920B, 12920C include apertures 12950A, 12950B, 12950C, respectively, and position detectors 12922A, 12922B, 12922C, respectively. A beam of light from a laser tracker or similar device projects one or more beams of light onto the retroreflector 12910. In an embodiment, the one or more beams of light includes a relatively small beam of light 12930 centered on the front surface of the retroreflector 12910 and a relatively larger beam of light 12960, also centered on the retroreflector. In an embodiment, the beam of light 12930 that travels to the vertex 12918 and intersects the front face 12912 at the point 12934. For each of the three pitch/yaw sensors, a portion of light 12960 passes through an aperture before passing to the position detector. In the pitch/yaw sensor 12920A, a light portion 12962A passes through the aperture 12950A and strikes the position detector 12922A at position 12940A. In the pitch/yaw sensor 12920B, a light portion 12962B passes through the aperture 12950B and strikes the position detector 12922B at position 12940B. In the pitch/yaw sensor 12920C, a light portion 12962C passes through the aperture 12950C and strikes the position detector 12922C at position 12940C. The light received by the position detectors 12922A, 12922B, and 12922C may be processed electrically according to methods described herein below and the pitch/yaw angles of the assembly 12900 determined by a processor based at least in part on the signals provided by the position detectors 12922A, 12922B, and 12922C.

FIGS. 30A, 30B, and 30C show three common types of position detectors. Other types of position detectors may also be used. FIG. 30A is a drawing of a tetra-lateral position sensitive detector (PSD) 3000, which includes an active PIN diode detector region 3002 and four electrodes 3004, 3005, 3006, and 3007 arranged in a square outside the active area. The tetra-lateral PSD 3000 provides the ability to determine a position in two dimensions of a beam of light striking any position on the active region 3002. The overall power striking the active region 3002 is usually proportional to the sum of electrical currents received by the four electrodes 3004, 3005, 3006, and 3007. The position in x and y is found in terms of sums and differences in the currents received by the electrodes according to formulas provided by the manufacturer of the detector 3000. FIG. 30B is a drawing of a quadrant detector 3010, which is a detector that includes four separated detector regions 3012, 3013, 3014, and 3015. Such detectors provide a position of a beam intercepted by all four separated detector regions. Such detectors are usually less linear than tetra-lateral PSDs and less able to measure small spots of light. FIG. 30C is a two-dimensional photosensitive array 3020 that includes an array of individual detector elements (pixels) 3022. Examples of photosensitive arrays are charge-coupled devices (CCDs) and complimentary metal-oxide semiconductor (CMOS) devices.

A type of noise present in each of the types of position sensors of FIGS. 30A, 30B, and 30C is thermal noise. For a spot of light striking a position sensor, the thermal noise will depend on the resistance of the position sensor and the bandwidth of the measurement system. Considering only thermal noise, the signal-to-noise ratio of a uniform beam of light passing through an aperture will increase as the size of the aperture increases since a larger aperture increases the signal received by the position sensor. Another type of noise seen in factory environments is scintillation noise resulting from atmospheric turbulence. Scintillation noise is caused by atmospheric turbulence for the case in which the cell size is smaller than the aperture. A turbulent atmosphere can be modeled as a collection of cells of differing sizes, each cell having a different index of refraction. A beam of light propagating through a collection of cells will be bent in different directions as it travels. In consequence, the beam of light will be non-homogeneous when it arrives at the aperture. If cells in an environment are relatively small compared to an aperture, the optical power passing through aperture can be observed to vary significantly over time. If the cells are relatively large compared to an aperture, the fluctuations are greatly reduced. In a typical situation, fluctuations are seen to be relatively small for an aperture having a diameter of 0.5 mm and relatively large for an aperture having a diameter of 2.0 mm. However, the signal-to-noise ratio is reduced for the smaller aperture. For example, the signal-to-noise ratio is reduced by a factor of 16 by using an aperture of 0.5 mm rather than 2.0 mm.

A way to maintain relatively high signal-to-noise ratio while minimizing the fluctuations resulting from atmospheric turbulence is to use a relatively large aperture in combination with a lens. In an embodiment shown in FIG. 31A and FIG. 31B, a glass cube-corner prism 3100 includes a front face 3112, three reflecting surfaces 3114, and a truncated aperture 3116 as shown in FIG. 31A and FIG. 31B. A beam of light 3140 arrives at the front face 3112 as a spot 3152 that travels collimated in a bundle of rays 3142 and refracts to the bundle of rays 3144. A portion of the bundle of rays 3144 passes through the truncated aperture 3116, refracts again as the collimated bundle 3146 and is focused by the lens 3130 to the converging rays 3147 before creating the spot 3154 on a position sensor 3148. By making the spot 3154 smaller than the truncated aperture 3116, the fluctuations in optical power over the aperture are reduced on the surface of the position detector, thereby reducing the fluctuations in the calculated position of the beam on the position sensor 3100.

FIG. 32 shows an example of a lens 3230 that might be used with an aperture plate 3120 and a position detector 3220. FIG. 32 illustrates the path taken by three different beams 3240A, 3240B, and 3240C that may arrive at the aperture at three different angles: +45, 0, and −45 degrees. As illustrated in the figure, each of the three beams pass through the lens 3230 to form a different focused spot 3242A, 3242B, or 3242C, respectively.

When determining pitch/yaw angles using an apparatus having an aperture and position detector, results may be contaminated by background lights—for example, overhead lights or light coming through windows. Such background light may pass through an aperture and strike the position detector, thereby leading to an incorrect determination of pitch/yaw angle. One means of alleviating this issue is to modulate the emitted light at the laser tracker or similar device and demodulate the light at the probe. In the demodulation process, the background light may be discarded using methods that are now described.

Figure 33A:
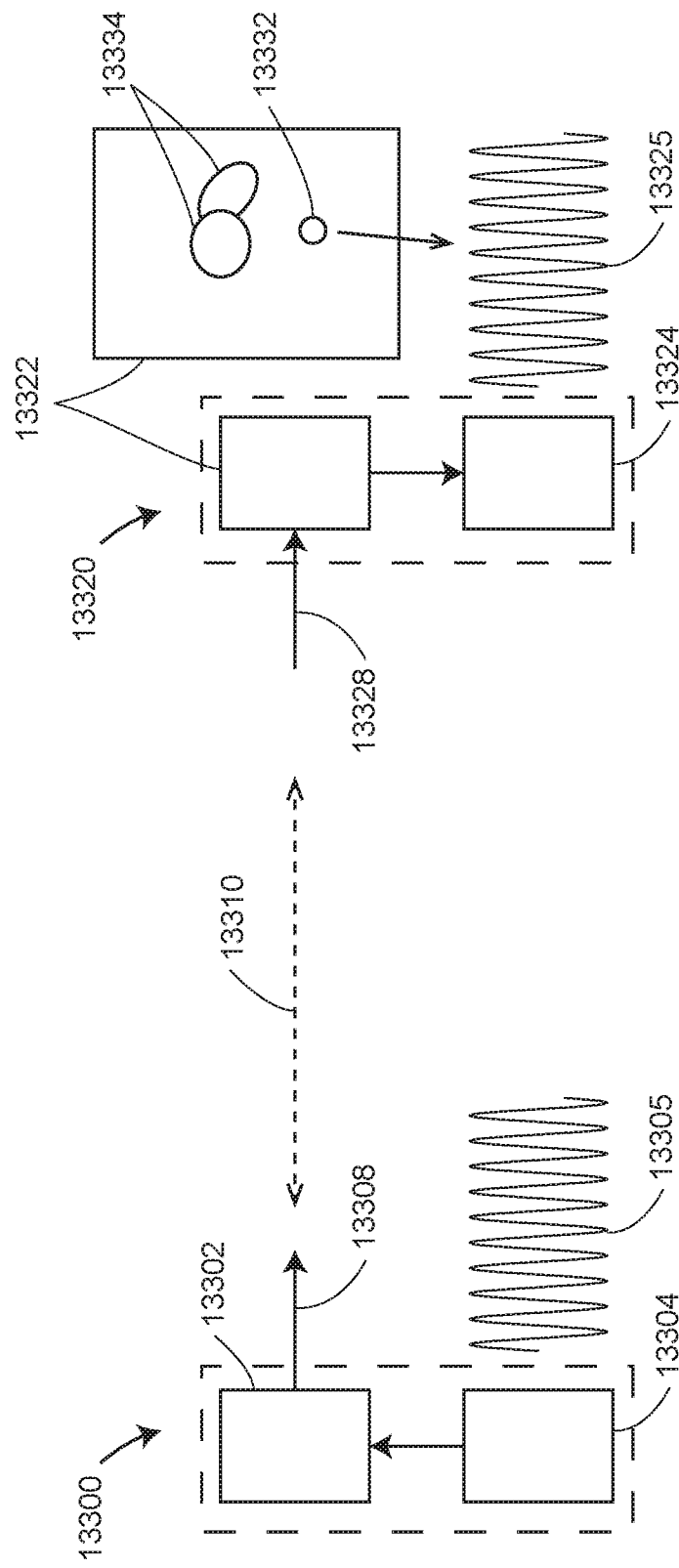
FIG. 33A and FIG. 33B are a schematic representation of a method of removing the influence of unwanted background light by modulating and demodulating light projected from the laser tracker according to an embodiment.

In an embodiment shown in FIG. 33A, a laser tracker or similar device 13300 includes a light source 13302 that emits a beam of light 13308. The light source is electrically modulated by a signal 13305, which in an embodiment is a sine wave but might be a square wave or other waveform. The light emitted by the light source 13302 is modulated at the same rate. In an embodiment, the modulation causes a modulation of the optical power of emitted by the light source 13302. The emitted beam of light may be combined with other light from the device 13300 in a beam 13310 that travels to the probe 13320. The probe includes a position detector (i.e., position sensor) that is an analog detector 13322 such as the tetra-lateral PSD 3000 or the quadrant detector 3010. The optical detector 13322 is configured to receive the light 13328 and convert it into an electrical signal, which it sends to an electrical circuit 13324. The electrical circuit 13324 extracts the modulated signal and rejects background noise such as unmodulated background light. Detector 13322 is a two-dimensional position detector that receives the desired signal 13332 and in addition unwanted background light 13334. The electrical circuit rejects the background light 13334 and uses the position of the transmitted light 13332 to determine the pitch/yaw angles of the probe. In an embodiment, the electrical circuit is configured to receive a signal 13325 having the same frequency as the electrical signal 13305. In an embodiment, a lock-in amplifier or alternative filtering method is used to extract the desired signal 13332 in the presence of background light. The frequency of modulation of the signals 13305 and 13325 may be any of a wide range of frequencies but, in an embodiment, is 10 kHz.

Figure 33B:
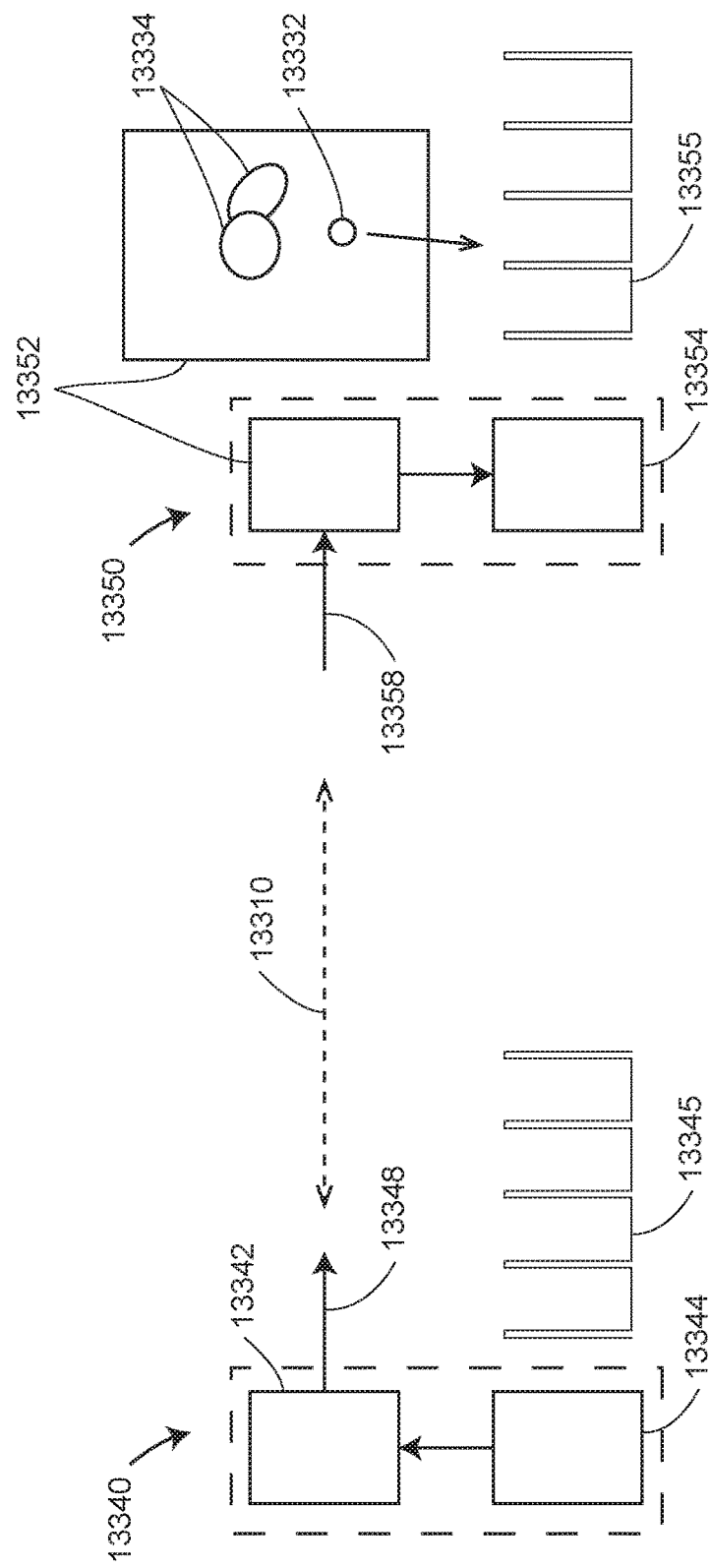

In an embodiment shown in FIG. 33B, a laser tracker or similar device 13340 includes a light source 13342 that emits a beam of light 13348. The light source is electrically modulated by a signal 13345 from an electrical circuit 13344. In an embodiment, the signal 13345 is a pulsed rectangular wave but might be a different waveform. The emitted beam of light may be combined with other light from the device 13340 in a beam 13310 that travels to the probe 13350. The probe includes a position detector 13352 that is a digital detector such as a CCD or CMOS array. The optical detector 13352 is configured to receive the light 13358 and convert it into an electrical signal, which it sends to an electrical circuit 13354. Element 13352 is a two-dimensional position detector that shows the presence of the desired signal emitted by the device 13300 and in addition unwanted background light 13334. The electrical circuit rejects the background light 13334 and uses the position of the transmitted light 13332 to determine the pitch/yaw angles of the probe. In an embodiment, the electrical circuit 13354 is configured to synchronize the electrical signal received from the position sensor 13352 with the modulated signal 13345 through the provided signal 13355. In this way, the influence of the background light 13334 is reduced in comparison to the transmitted light 13332.

The embodiments of FIGS. 28-33B have mainly concerned the measurement of a first two orientational degrees of freedom involving the direction and tilt of the retroreflector, which may be described by pitch and yaw angles, by fold and tilt angles, or by a variety of other angular measures. Attention is now turned to the measurement the third orientational degree of freedom, which is usually quantified by a roll angle.

Figure 34A:
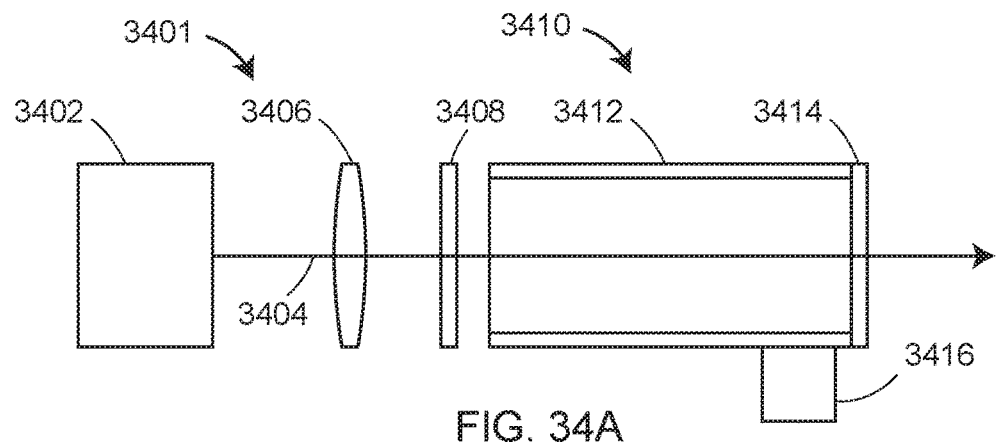
FIG. 34A is a schematic representation showing a method of producing rotating linearly polarized light by sending polarized light through a rotating half-wave plate according to an embodiment.
Figure 34B:
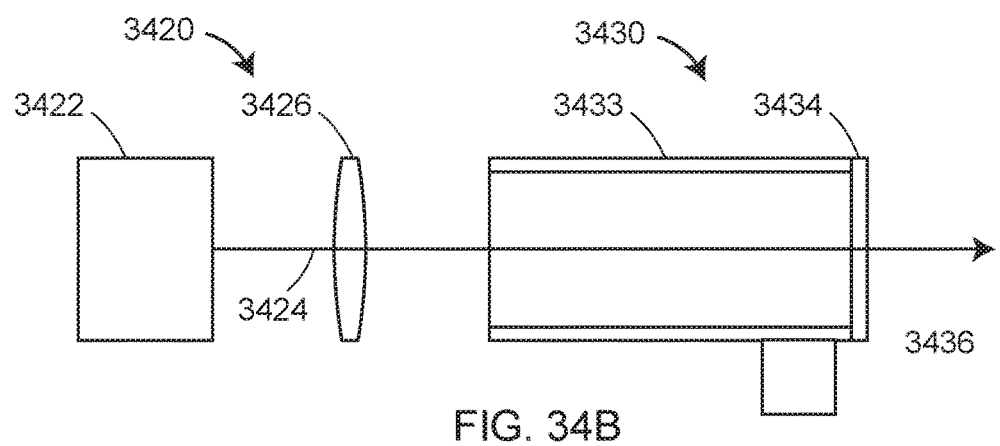
FIG. 34B is a schematic representation showing a method of producing rotating linearly polarized light by sending unpolarized (randomly polarized) light through a rotating polarizer according to an embodiment.

FIG. 34A and FIG. 34B describe apparatus for generating rotating linearly polarized light. Such an apparatus may be included in a laser tracker or similar device such as the device 12700 of FIG. 27. In FIG. 34A, an apparatus 3401 includes a source of light 3402, a lens 3406, a polarizer 3408, and a rotating half-wave retarder (i.e., half waveplate)

assembly 3410. In an embodiment, the light source 3402 may be an LED, a laser, or a superluminescent diode. If the light source is an LED, the light may be emitted into a multimode fiber butt coupled to the LED chip. The light source emits a beam of light 3404, which may be collimated by a lens 3406. The light passes through a polarizer 3408 that produces linearly polarized light. The linearly polarized light passes through a hollow shaft 3412 to which is attached a half waveplate 3414. The hollow shaft and half waveplate are turned by a motor 3416. The hollow shaft may be mounted on mechanical bearings. The linearly polarized light is sent through the rotating half waveplate 3414 to produce rotating linearly polarized light.

In an alternative embodiment shown in FIG. 34B, an apparatus 3420 includes a source of light 3422, a lens 3426, and a rotating polarizer assembly 3430. In an embodiment, the light source 3422 is generates randomly polarized light by coupling light from an LED into a multimode fiber polarization. In an embodiment, the light source 2422 sends the beam of light 3424 through a collimation lens 3426. The light passes through a hollow shaft 3433 to which is attached a linear polarizer 3434. The hollow shaft and linear polarizer are turned by a motor 3436. The hollow shaft may be mounted on mechanical bearings. The effect of sending randomly polarized light through a rotating polarizer is to produce rotating linearly polarized light.

Figure 35:
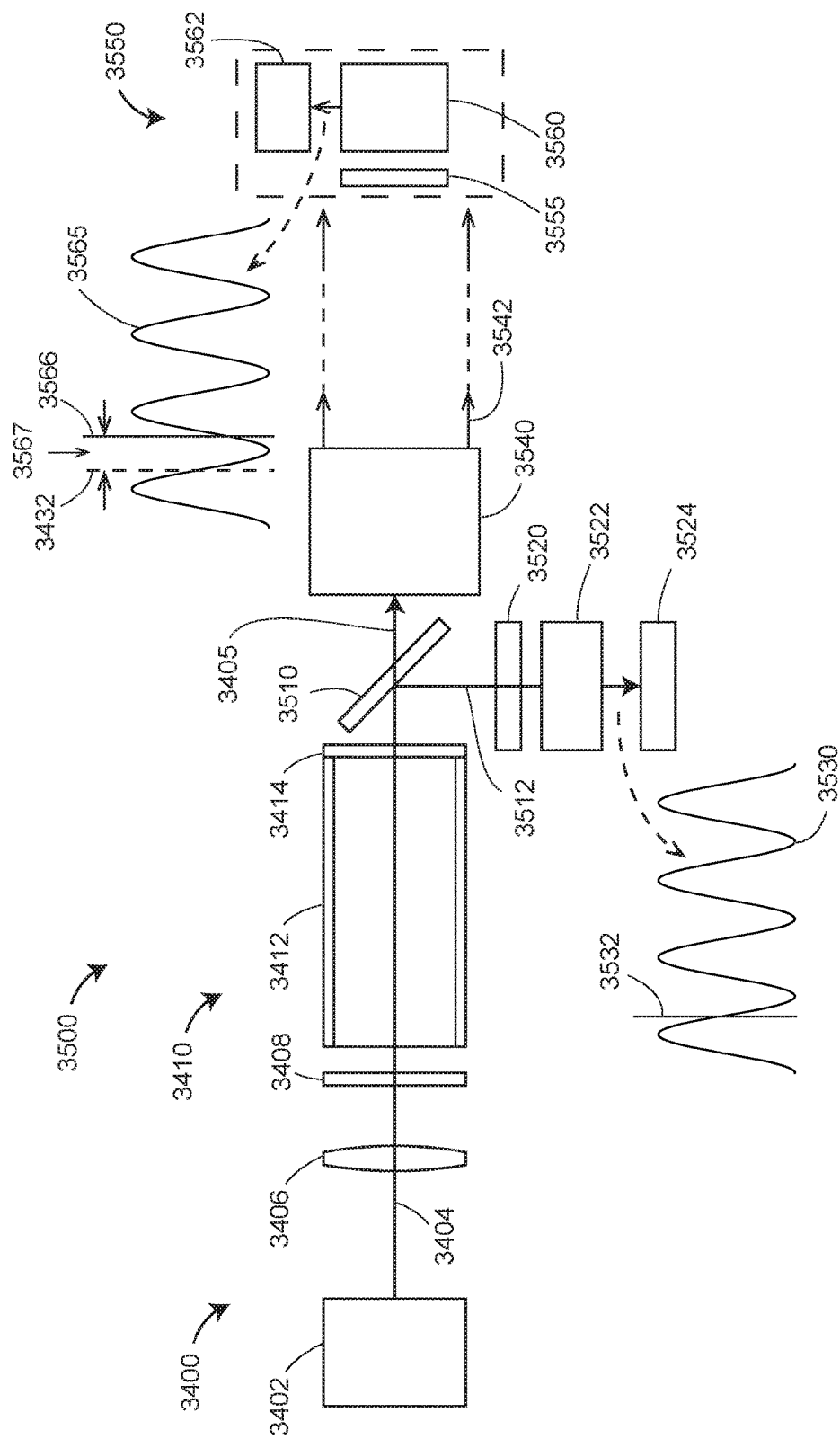
FIG. 35 is a schematic representation of a system that determines a reference phase of a rotating polarization in the laser tracker and a measurement phase of a rotating polarization in a probe according to an embodiment.

FIG. 35 is a schematic representation illustrating a system for measuring a roll angle of a probe through the use of a polarization-roll generator 3500 with a polarization-roll sensor 3550. The polarization-roll generator 3500 may be placed in a laser tracker or other device such as device 12700. The polarization-roll sensor 3550 may be placed in a six-DOF probe such as the probe 12750. In an embodiment, the polarization-roll generator 3500 combines the apparatus of FIG. 34A with a beam splitter 3510, a polarizer 3520, an optical detector 3522, an electrical circuit 3524, and a beam projector 3540. The polarization-roll sensor 3550 includes a polarizer 3555, an optical detector 3560, and an electrical circuit 3562. In an embodiment, the polarizer 3555 is a nanoparticle thin-film polarizer having a contrast ratio of better than 100,000 at acceptance angles of up to +/−20 degrees for wavelengths from 850 to 1600 nm. The polarization-roll generator 3500 and polarization-roll sensor 3550 cooperate to determine the roll angle of the probe. In other embodiments, the polarization-roll sensor uses the apparatus of FIG. 34B in place of the apparatus of FIG. 34A.

In an embodiment, the beam splitter 3510 sends a part 3512 of light having rotating linear polarization through the polarizer 3520 and into the optical detector 3522, which produces an electrical signal 3530 that varies sinusoidally with time. An electrical circuit 3524 measures a phase of the sinusoidal signal at an instant in time 3532. The phase of the signal 3530 at the time 3532 is referred to as the reference phase. A variety of methods may be used to measure the reference phase. For example, the sinusoidal signal may be sampled with an analog-to-digital converter (ADC) and the samples analyzed numerically to determine the phase using algorithms that are well known in the art. For example, in one method, two summations are formed. A first summation S is equal to the sum of product of the measured samples and the values of a sinusoidal function at the frequency to be extracted (the modulation frequency), where the summation is taken over an integral number of cycles of the modulation frequency. A second summation C is equal to the sum of product of the measured samples and the values of the cosinusoidal function at the frequency to be extracted (the modulation frequency), where the summation is taken over an integral number of cycles of the modulation frequency. The phase is found as the arc tangent of C/S.

In an embodiment, the beam of light 3542 sent out of the beam projector 3540 is relatively large, and in another embodiment, the beam of light is relatively small. Various methods of projecting and receiving the beam of light are discussed herein below. In an embodiment, the light 3542 passes through a polarizer 3555 and into an optical detector 3560 that produces an electrical waveform 3565. In an embodiment, an electrical circuit 3562 determines a phase of a sinusoidal signal 3565 at a time 3566. This determined phase is referred to as the measure phase. The measure phase may be determined by the ADC sampling method described above or by any of the other methods known in the art. The measure phase minus a reference phase, which is taken at a time 3432, is the phase difference. A time difference 3567 exists between measurements of the reference phase and the measure phase. A processor in the system is used to determine the roll angle of the polarization-roll sensor 3550 based at least in part on the determined phase difference. In an embodiment, the processor is included in the electrical circuit 3562. In an embodiment, the reference phase of the probe at the time 3432 is synchronized to the reference phase that occurs at the time 3532 in the polarization-roll generator 3500. This synchronization may be done, for example, through wired or wireless communication channels using coordinated timing signals. Other methods may also be used to obtain synchronization.

Figures 36, 36A:
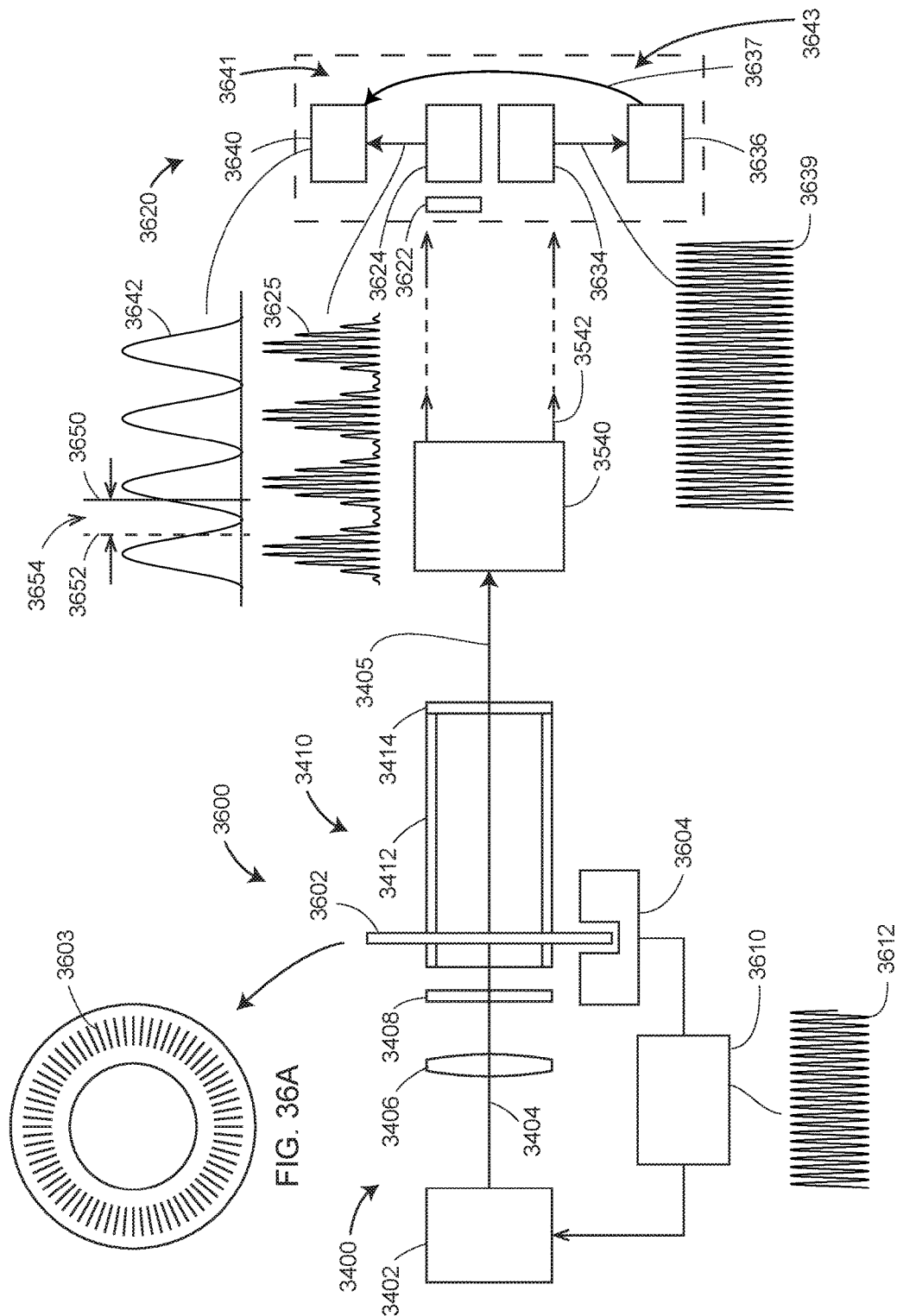
FIG. 36 is a schematic representation showing a method of determining phase by means of encoder synchronization and noise removal according to an embodiment.

A first potential limitation of the method of the apparatus of FIG. 35 is non-uniform angular rotation rate of the hollow shaft 3412. A second potential limitation is contamination of the optical signal at the detector 3560 by (ambient) background light. The apparatus of FIG. 36 overcomes these potential limitations. FIG. 36 shows an apparatus that measures roll angle of a probe by using a polarization-roll generator 3600 and a polarization-roll sensor 3620. The polarization-roll generator 3600 may be placed in a laser tracker or other device such as device 12700. The polarization-roll sensor 3620 may be placed in a six-DOF probe such as the probe 12750. In an embodiment, the polarization-roll generator 3600 combines the apparatus 3401 of FIG. 34A with a beam projector 3540, an angular encoder disk 3602, one or more read heads 3604, and an electrical circuit 3610. The encoder disk 3602 includes a plurality of markings 3603 that are read by the one or more read heads 3604 to determine the angle of rotation of the disk. The encoder disk is attached to the hollow shaft 3412 and rotates with it. One or more of the markings on the read head may be an index mark that provides the angular position of each mark in a frame of reference of the disk. The read head may send light through the marks or reflect light off the marks to detect the marks. The electrical circuit 3610 is configured to generate an electrical signal 3612 synchronized to the plurality of markings on the encoder disk 3602. In an embodiment, the generated signal is a sinusoidal signal 3612. Another type of signal 3612 that may be generated is a square wave or a pulsed wave, but any type of synchronized electrical signal may be provided by the electrical circuit 3610. The signal 3612 is sent to the light source 3402 to modulate the optical power of the beam of light 3404. The light may be generated by an LED, superluminescent diode, diode laser, or other light source. In an embodiment, the encoder disk 3602 includes 960 fine marks and one index mark. In an embodiment, the hollow shaft 3412 rotates at 30 cycles per second. For the configuration shown in FIG. 36, the linearly polarized light rotates at twice this rate, or 60 Hz. The frequency of the optical power passing through the polarizer 3622 is doubled again to produce an effective rotation rate of 120 Hz. In an embodiment, the electrical modulation 3612 provided by the electrical circuit 3610 to the light source 3402 is tied to the rotation of the encoder in such a way that each polarization cycle always includes the same number of fast modulation cycles—in this case, one rotation of the half waveplate 3414 for each passing of 16 fine marks on the encoder disk 3602.

The polarization-roll sensor 3620 includes a first detector channel 3641 and a second detector channel 3643. The first detector channel 3641 includes a polarizer 3622, a first optical detector 3624, and a first electrical circuit 3640. The second detector channel 3643 includes a second optical detector 3634 and a second electrical circuit 3636. The first electrical signal 3625 from the first electrical circuit 3640 has a relatively slow modulation resulting from the rotating linearly polarized light being converted into optical power variations by the polarizer 3622. The first electrical signal 3625 is further modulated at a relatively fast rate by the signal 3612. For the case of there being 16 cycles of optical power for each single rotation of the half waveplate 3414, there will be half this number of cycles, or 8 cycles, in each cycle of detected optical power by the optical detector 3522, as shown in the resulting waveform, which contains 8 cycles of sinusoidally varying optical power for each main power cycle, as shown in the exemplary electrical waveform 3625.

The second optical detector 3634 receives an optical signal that includes only the modulation from the signal 3612. The second electrical circuit 3636 receives the electrical signal 3639 from which it extracts the desired signal 3642. Because the light from the polarization-roll generator 3600 is modulated by the electrical circuit 3610 and the background (ambient) light is not, the electrical waveform may be used to remove the effects of background light by providing a synchronization signal to assist in demodulation of the received electrical waveform 2525 to obtain the waveform 3654. The unwanted signals from background light may be eliminated by an electrical filtering process, for example, by using a lock-in amplifier. Many types of lock-in amplifiers are possible including analog and digital lock-in amplifiers. Other filtering techniques may also be used. One way to remove the relatively high speed modulation in the signal 3625 from the relatively lower speed modulation in the signal 3642 is to directly sample and fit the lower speed signal so as to correctly account for nonuniformities in the rotation rate of the rotating shaft 3412. A reference phase 2652 is compared to a measure phase 2650 to determine an angle of rotation of the polarization-roll sensor 3620 relative to the polarization-roll generator 3600. As explained herein above, the reference phase and measure phase may be calculated using any of the methods known in the art, for example, the arc tangent method described herein above.

For all of the polarization-roll methods described herein above and herein below, an additional effect may be considered. When light strikes a glass surface, which might for example be a glass surface of a polarizer, an optical detector, a glass retroreflector, or a cube beam splitter, the light splits into s and p polarization components according to the tilt of the surface relative to the incoming beam of light. Each of the s and p polarization components has a different transmittance through the glass surface that may be calculated using Fresnel equations, as is well known in the art. According to the Fresnel equations, the amount of transmittance through a glass surface for s and p polarization depends on the angle of incidence of the light on the glass surface and on the index of refraction of the glass. If the surface of the glass is uncoated, the effect of passing on linearly polarized light through a glass surface is to slightly change the direction of polarization of the linearly polarized light. The effect of such a change in polarization on the calculated roll angle can be accounted for by first determining the pitch and yaw (or equivalent) angles of tilt target assembly and then using these values to correct for the change in the polarization state. To facilitate such a correction, compensation procedures may be carried out at the factory to determine how the linear polarization state changes with the pitch and yaw (or equivalent) angles of the target assembly.

Figure 37:
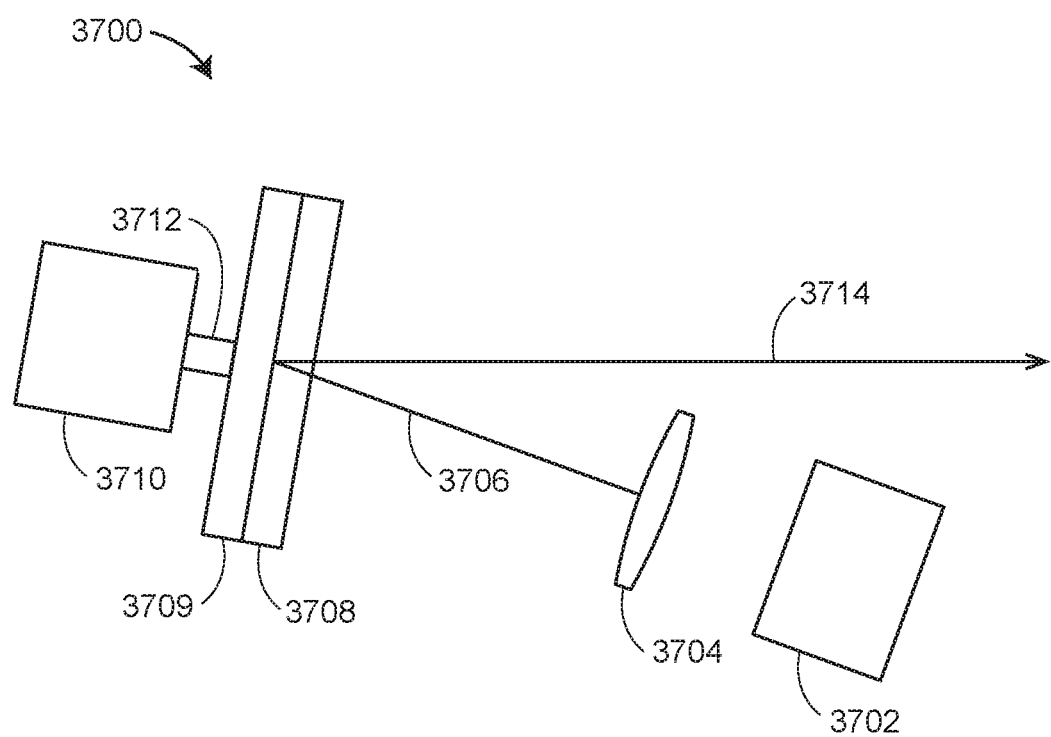
FIG. 37 is a schematic representation of a light directly projected onto a polarizer or quarter wave plate rotated by a motor according to an embodiment.

FIG. 37 shows an apparatus 3720 that provides an alternative method for generating rotating linearly polarized light. A light source 3702 sends light 3706 through a lens 3704 to an optical element 3708 that is mounted on a mirror 3709 rotated by a shaft 3712 of a motor 3710. The optical element 3708 may be a linear polarizer or a quarter waveplate. If the optical element is a linear polarizer, the light provided by the light source 3702 needs to have a random (and rapidly changing polarization). This type of light may be obtained in some cases from a multi-mode fiber butt coupled to an LED. In this case, the light double passes the linear polarizer and emerges as linear polarized light that rotates as the polarizer rotates. If the optical element is a quarter waveplate, the light provided by the light source 3702 needs to be linearly polarized. Such light may be obtained in some cases from polarized light source or from a polarization maintaining fiber attached to a light source. In other cases, such linearly polarized light may be obtained by sending the light through a linear polarizer, for example, following the lens 3704. The light 3706 strikes the optical element 3708 at an angle of incidence, which is the angle between normal vector of the element optical element 3708 and the direction of the light. The light 3706 reflects off the mirror in a beam 3714 at an angle equal to the angle of incidence to produce the beam 3714.

Figure 38:
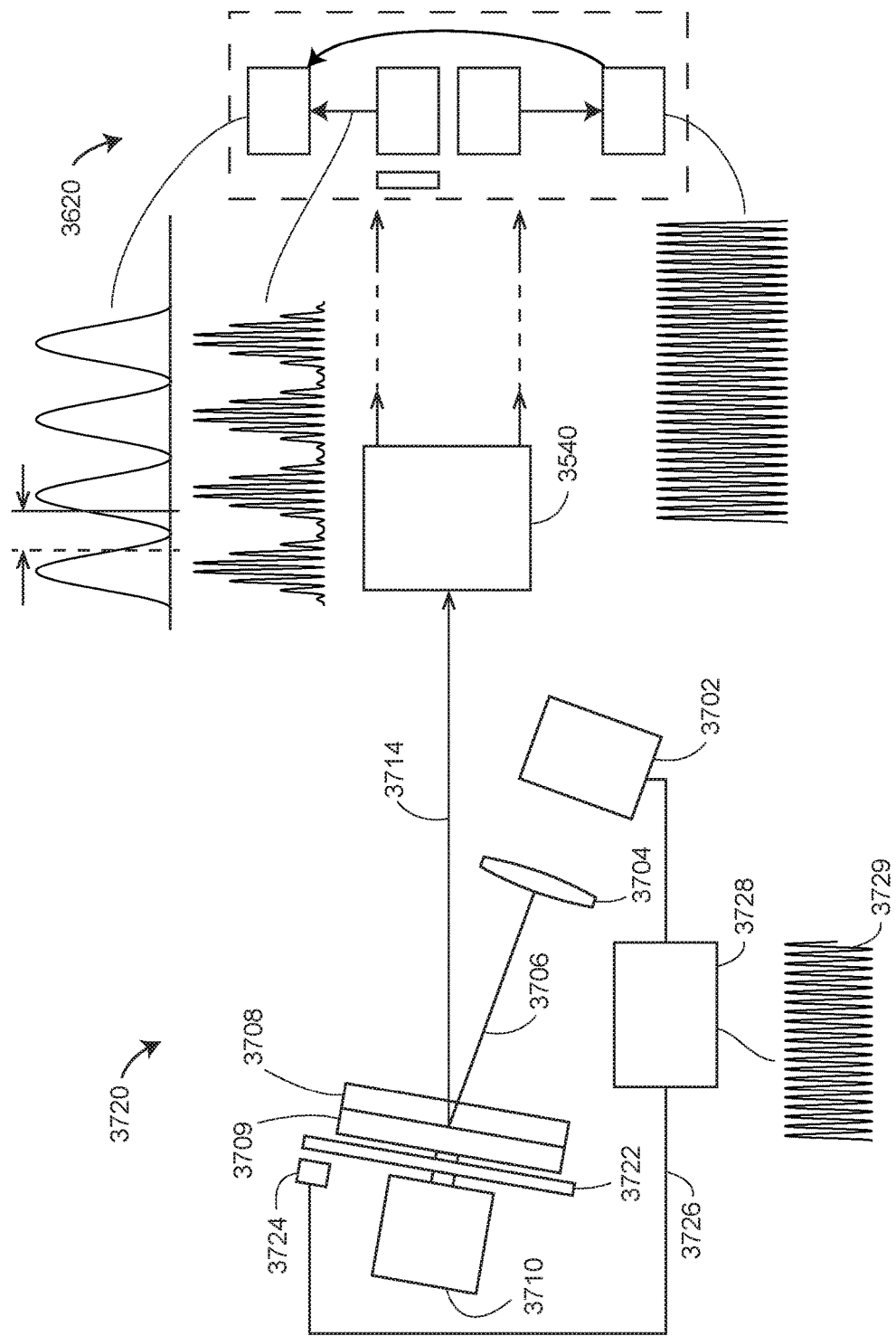
FIG. 38 is a schematic representation showing the locking an optical modulation signal to a rotating disk to improve accuracy and remove noise according to an embodiment.

The embodiment illustrated in FIG. 38 adds elements to the apparatus illustrated in FIG. 37 to overcome the two potential limitations described earlier—non-uniform rotation rate and contamination from background light. The polarization-roll generator 3720 adds to the elements 3700 of FIG. 37 an encoder disk 3722, one or more read heads 3724, and an electrical circuit 3728. Electrical signals from marks on the encoder disk are sent over line 3726 to the electrical circuit, resulting in a signal 3729 that is sent to the light source 3702 to provide modulation to the signal sent from the projector 3540 to the polarization-roll sensor 3620. The operation of the polarization roll sensor 3620 has already been discussed herein above in reference to FIG. 36.

Figure 39:
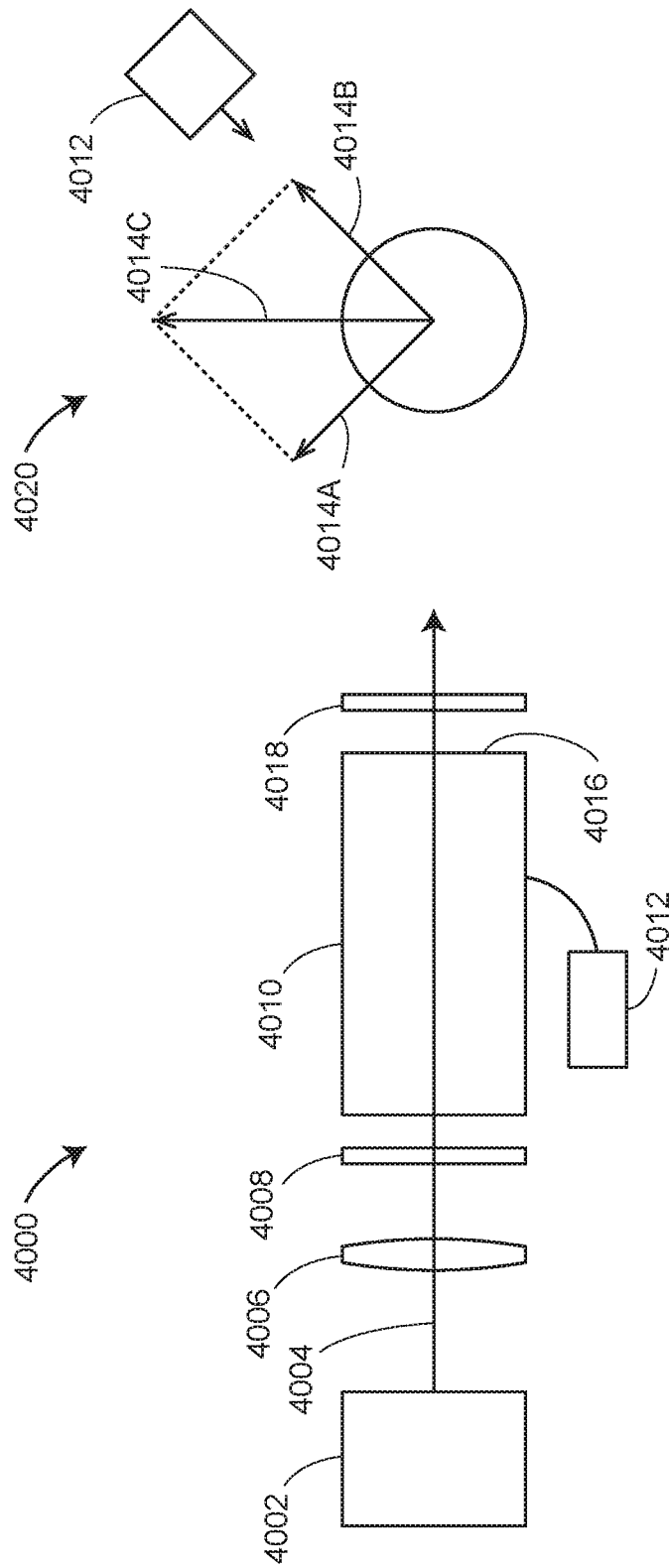
FIG. 39A and FIG. 39B are schematic representations of an electrooptic modulator configured to produce rotating linearly polarized light according to an embodiment.

FIGS. 39A and 39B are schematic representations of a polarization-roll generator 4000 that replaces mechanically rotating elements described herein above with an electro-optic (EO) modulator configured to produce rotating linearly polarized light. Light source 4002 sends light 4004 through a collimating lens 4006 and a linear polarizer. FIG. 39B is a schematic representation 2000 of the crystal axes of the crystal in the EO modulator. Light passes into the EO modulator 4010, which includes an electro-optic crystal having each of two mutually perpendicular crystal axes 4014A and 4014B, each oriented at 45 degrees with respect to the direction of polarization of the incoming light 4014C. An electrical circuit 4012 applies an electrical signal to the first axis 4014B to produce a change in refractive index along that axis. As a result of this action, the light along the first axis 4014B is delayed or advanced relative to the other axis. In this manner, the polarization of the light passing through the EO modulator may be varied over all possible states of elliptical polarization from linear vertical to circular to linear horizontal and to all elliptical polarization states in between. A quarter waveplate 4018 is placed at the output of the EO modulator with the axis of the quarter waveplate 4018 placed along the direction of incoming light 4014C of the initial polarization of the light. When no electrical signal is applied to the EO modulator by the electrical circuit 4012, the light retains its linearly polarized state. As sinusoidally modulated light is applied by the EO modulator, the polarization changes to an elliptical state according to the level of the peak voltage applied. As the elliptical polarized light passes through the quarter waveplate 4018 is changes to a linear state. By increasing or decreasing the amplitude of the sinusoidally modulated electrical signal from the electrical circuit 4012, the linearly polarized light leaving the quarter waveplate 4018 can be made to rotate.

Figure 40:
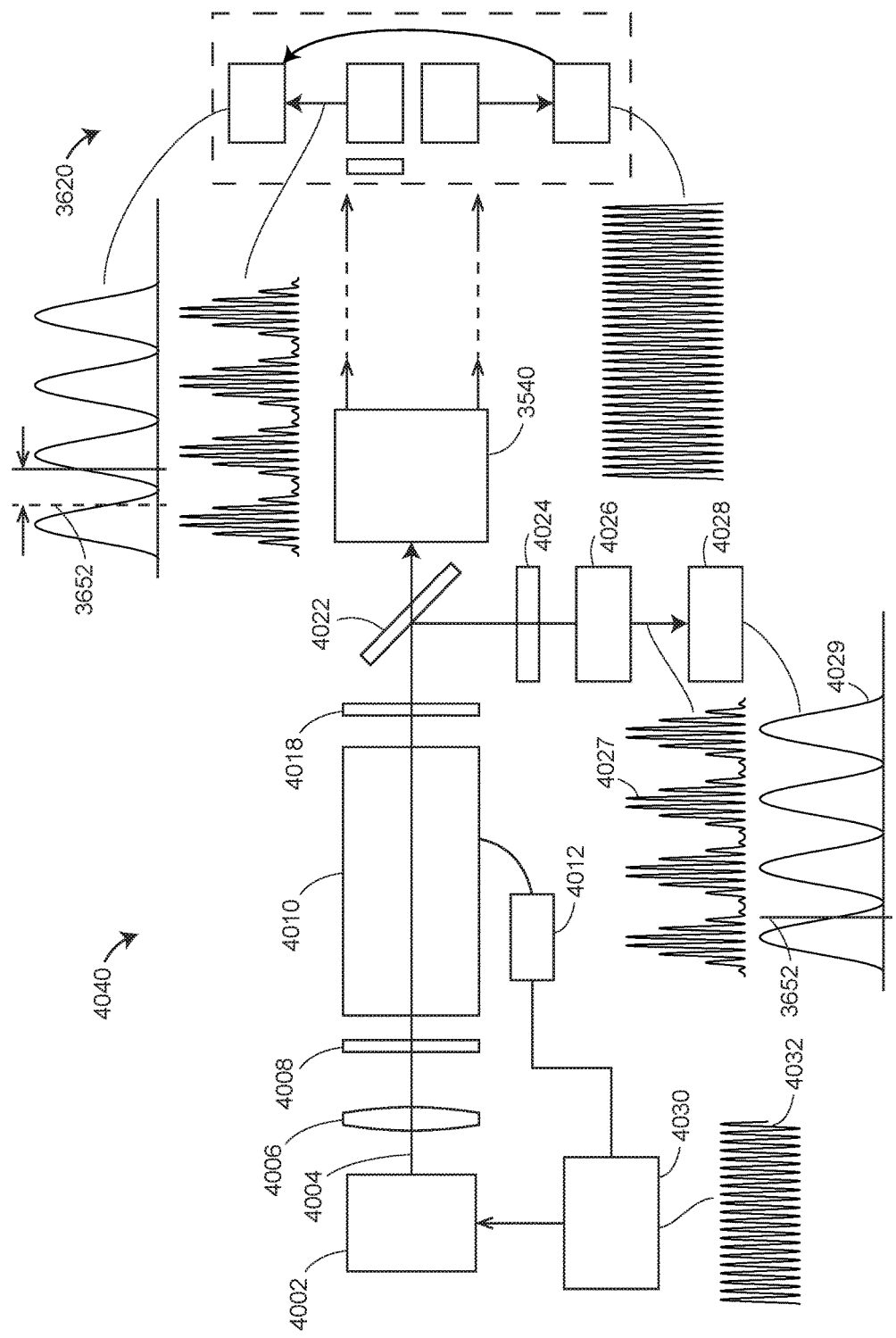
FIG. 40 is a schematic representation of a system that applies synchronous modulation and demodulation to rotating polarized light according to an embodiment.

In FIG. 40, a polarization-roll generator 4040 has the elements of the polarization-roll generator 4000 of FIG. 39A and in addition includes a beam splitter 4022, a polarizer 4024, an optical detector 4026, an electrical circuit 4028, and an electrical circuit 4030. The electrical circuit 4030 applies a first electrical signal to the electrical circuit 4012 and a second electrical faster signal to modulate the optical power emitted by the light source 4002. In an embodiment, the electrical circuit 4012 applies a 1 kHz sinusoidal signal to the EO modulator, and the electrical circuit 4030 produces a synchronized electrical signal at 16 kHz. The signal 4027 received by the optical detector 4026 includes a relatively fast modulation within a more slowly modulated signal 4029. The electrical circuit 4028 extracts the signal 4029 with the slower modulation and measures a phase 3652 at an instant in time. It sends this phase measurement to the polarization-roll sensor 3620 in FIG. 40. The polarization-roll sensor works as described herein above with respect to FIG. 36.

In an embodiment illustrated in FIGS. 41A and 41B, a roll analyzer is a pass-through retroreflector assembly 4100 that includes a retroreflector 4110, a polarizer 4134, and a detector 4120. The general appearance of the roll analyzer 4100 is similar to that of the pass-through retroreflector assembly or pitch/yaw sensor 12800 of FIGS. 28A, 28B, but the roll analyzer 4100 is intended to measure roll, while the pass-through retroreflector assembly or pitch/yaw analyzer 12800 is intended to measure pitch and yaw. In an embodiment, the roll analyzer 4100 cooperates with a polarization-roll generator such as one of the polarization-roll generators illustrated in FIGS. 34A, 34B, 35, 36, 37, 38, 39, 40. In general, it is not necessary that the detector 4120 be a position detector; a detector capable of measuring optical power but without the capability of measuring position is suitable. However, the use of a position detector may be advantageous in determining the roll angle as the position of the spot of light on the detector 4120 may be used to determine the pitch and yaw angles, which in turn may be used to determine the p- and s-polarization components of the light passing through the roll analyzer 4100. This may be advantageous as the amount of transmittance of light through glass surfaces may be different for s and p polarizations. The use of a position detector as the detector 4120 may also enable the roll analyzer 4100 to be used as a combination pitch/yaw sensor and polarization-roll sensor.

In an embodiment, the retroreflector 4110 is a cube-corner retroreflector 4110 having a front face 4112, three mutually perpendicular reflecting surfaces 4114, and a truncated region 4116 near a virtual vertex 4118 of the retroreflector. A beam of light 4130 from a laser tracker or similar device intersects the front face 4112 of the retroreflector in a spot of light 4140. It refracts at the surface of the retroreflector and travels as a beam of light 4132 toward the virtual vertex 4118. In an embodiment, the beam of light 4130 continues to track the virtual vertex 4118 as the roll analyzer 4100 is moved. The beam of light 4132 refracts at the truncated region as the beam 4132 and intersects the detector 4120 in the spot of light 4142. The method for determining the roll angle according to a sequence of optical powers has already been discussed herein above.

In an embodiment illustrated in FIG. 42A and FIG. 42B, a roll analyzer is a retroreflector assembly 4200 that includes a retroreflector 4210 and one or more polarization-roll sensors. In an embodiment, the retroreflector 4210 is a glass cube-corner prism having a front face 4212, three mutually perpendicular reflecting surfaces 4214, and a vertex 4218 at which the reflecting surfaces intersect. In an embodiment, there are three polarization-roll sensors 4220A, 4220B, and 4220C. Each polarization-roll sensor includes a position detector, a polarizer, and an aperture. The polarization-roll 4220A, 4220B, 4220C include apertures 4250A, 4250B, 4250C, respectively, polarizers 4221A, 4221B, 4221C, respectively, and position detectors 4222A, 4222B, 4222C, respectively. A beam of light from a laser tracker or similar device such as the device 12700 of FIG. 27 projects one or more beams of light onto the roll analyzer 4210. In an embodiment, the one or more beams of light includes a relatively small beam of light 4230 centered on the front surface of the retroreflector 4210 and a relatively large beam of light 4260, also centered on the point of intersection 4234 of the light into the retroreflector. In an embodiment, the beam of light 4230 that travels to the vertex 4218 and intersects the front face 4212 at the point 4234. For each of the three polarization-roll sensors, a portion of light 4260 passes through an aperture before passing through a polarizer and into a position detector. In the polarization-roll sensor 4220A, a light portion 4262A passes through the aperture 4250A and polarizer 4221A before striking the position detector 4222A at position 4240A. In the polarization-roll sensor 4220B, a light portion 4262B passes through the aperture 4250B and polarizer 4221B before striking the position detector 4222B at position 4940B. In the polarization-roll sensor 4920C, a light portion 4962C passes through the aperture 4950C and polarizer 4221C before striking the position detector 4922C at position 4240C. The light received by the position detectors 4222A, 4222B, and 4222C may be processed electrically according to methods described herein below and the roll angle of the assembly 4200 determined by a processor based at least in part on the signals provided by the position detectors 4222A, 4222B, and 4222C.

Figures 43A, 43B, 43C:
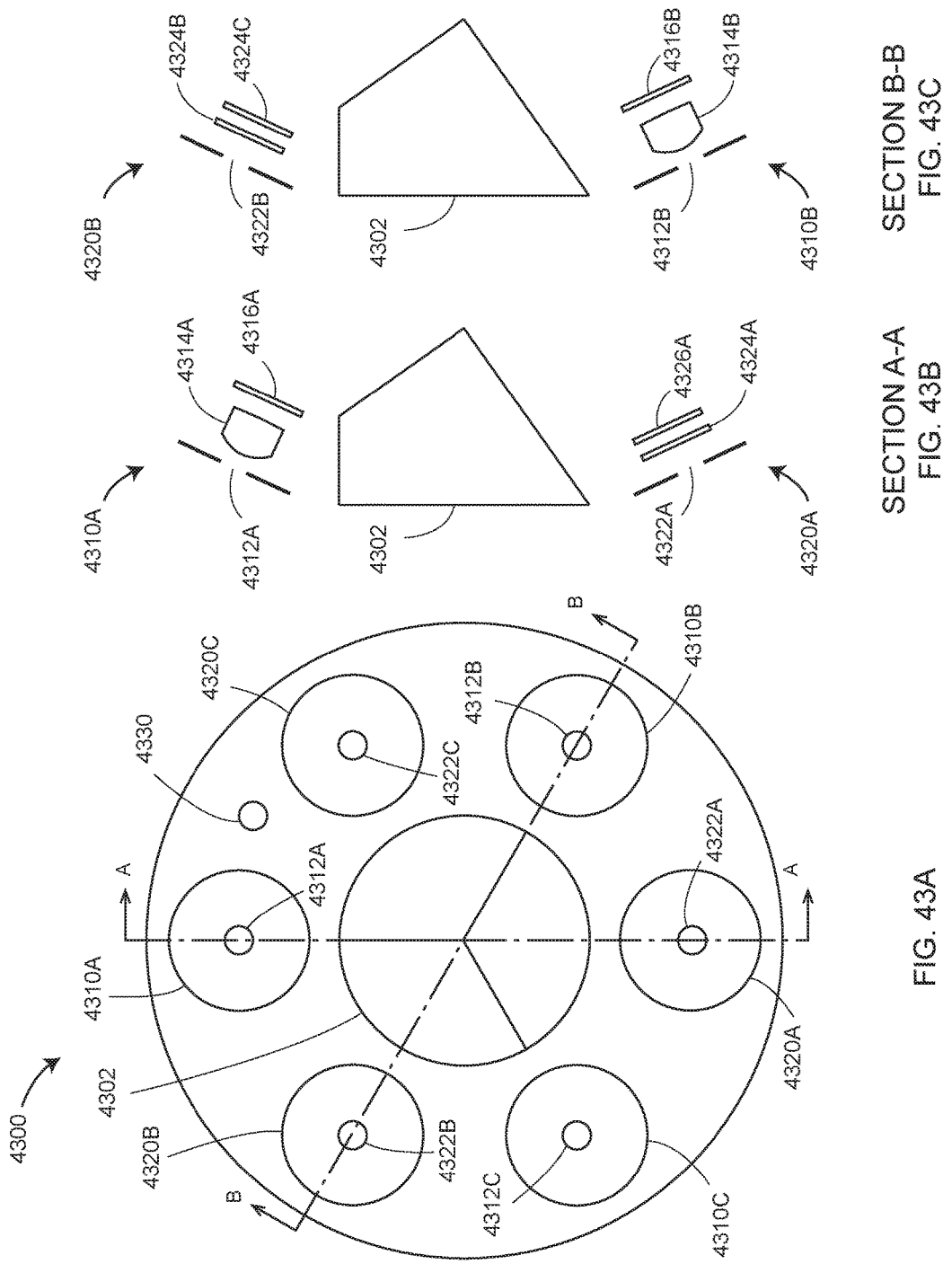
FIG. 43A is a schematic representation of a retroreflector surrounded by three roll sensors, three polarization sensors, and a modulation detector according to an embodiment.
FIG. 43B and FIG. 43C are cross-sectional schematic representations of the apparatus of FIG. 43A having tilted pitch/yaw and polarization roll sensors, respectively, according to an embodiment.

FIG. 43A is a schematic representation of a six-DOF assembly 4300 that includes a retroreflector 4302, three pitch/yaw sensors 4310A, 4310B, 4310C, three polarization-roll sensors 4320A, 4320B, 4320C, and an optical detector 4330. FIG. 43B and FIG. 43C are cross-section A-A and cross-section B-B, respectively. In an embodiment, pitch/yaw sensors 4310A, 4310B, 4310C include apertures 4312A, 4312B, 4312C, respectively, lenses 4314A, 4314B, 4314C, respectively, and position detectors 4316A, 4316B, 4316C, respectively. In an embodiment, polarization-roll sensors 4320A, 4320B, 4320C include apertures 4322A, 4322B, 4322C, respectively, polarizers 4324A, 4324B, 4324C, respectively, and optical detectors 4326A, 4326B, 4326C, respectively. Optical detector 4330 measures the optical power of the light received from the laser tracker or other device.

In an embodiment, the optical detector 4330 provides the function of the optical detector 3634 in FIG. 36. In this way, it eliminates the need to provide the detector 3634 in each of the three polarization-roll sensors 4320A, 4320B, and 4320C. Similarly the optical detector 4330 may provide an electrical signal corresponding to the total optical power to the electrical circuit 13324 in FIG. 33A. For the case in which the position detectors 4316A, 4316B, and 4316C are tetra-lateral PSDs, the total optical power may be found by adding the electrical signals from each of the four legs of the PSD. Similarly, it is possible using other position sensors, such as the positions sensors of FIGS. 30B and 30C to determine the optical power. However, it is simpler to use the electrical signal received from a single optical detector 4330 to extract the modulation signal corresponding to the optical power variations in the emitted light.

Figure 43D:
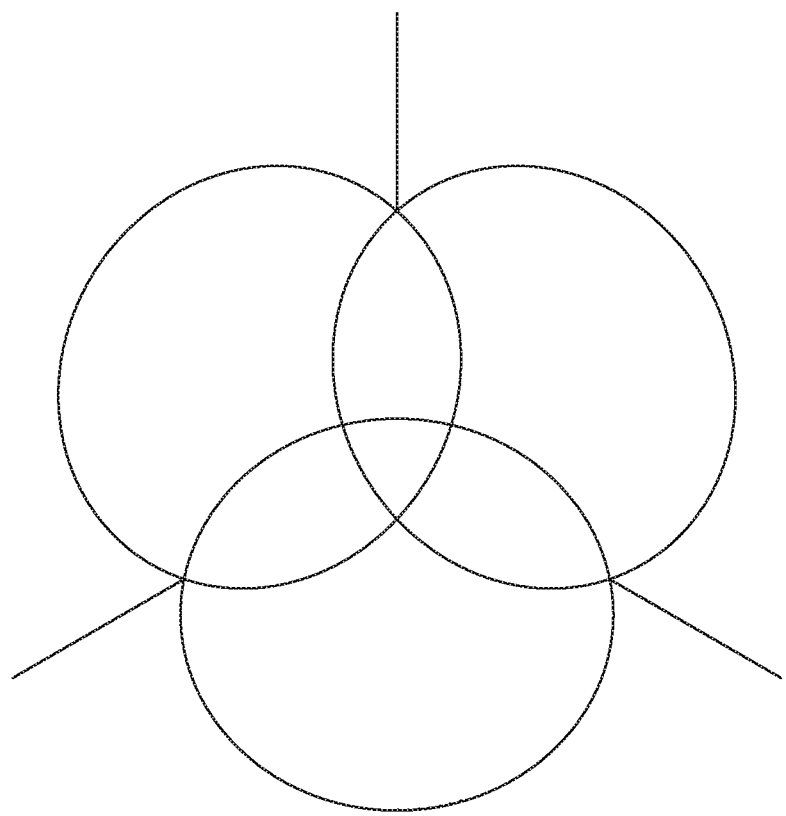
FIG. 43D shows overlap among the angular coverage of three tilted sensors according to an embodiment.

In an embodiment illustrated in FIG. 43B and FIG. 43C, the front side of each of the sensor assemblies, 4310A-C and 4320A-C, is tilted away from the retroreflector 4302. In an embodiment shown in FIG. 43B and FIG. 43C, the angle of tilt away from the retroreflector is 25 degrees. To understand the advantage provided by tilting the sensor assemblies away from the retroreflector, note that in FIGS. 31A, 31B, 41A, and 41B, the beam from the laser tracker or other device strikes the front surface of the retroreflector off the center of the retroreflector, with the position of the center on the retroreflector moved in the direction of the beam of light. Note also in these figures that the light strikes the optical detector 3148 in FIGS. 31A, 31B and the detector 4120 in FIGS. 41A, 41B off center in the direction opposite that at which the light strikes the front surface of the retroreflector. By tilting the sensor assemblies, 4310A-C and 4320A-C, away from the retroreflector by 25 degrees, when the light strikes the retroreflector at an angle of incidence of 25 degrees, the sensor assembly nearest the direction of the light is at normal incidence to the received light. This is also the condition at which this same sensor assembly receives a relatively large amount of light since the beam is shifted in the direction of the sensor assembly. By tilting each of the sensor assemblies away from the retroreflector 4302 by 25 degrees, that sensor assembly may cover a retroreflector tilt of 0 to 50 degrees for a sensor assembly having a field of view of +/−30 degrees. For the case of a pitch/yaw assembly that uses a lens, as in FIG. 32, a relaxation in the required field of view simplifies the design and improves performance. For the case of a polarization-roll assembly, a relaxation in the required field of view improves the contrast ratio, resulting in better performance. That a field of view of +/−30 degrees is adequate to provide coverage for tilt angles of 0 to 50 degrees is illustrated in FIG. 43D, which is a graph showing the angular coverage in the x, y, and z directions for sensor assemblies tilted at 25 degrees and having fields of view of +/−30 degrees. The overlap of the three angular regions indicates that all angles up to +/−50 degrees are covered for any orientation of the assembly 4300.

FIG. 44 illustrates an assembly 4400 that includes three sensors 4406A, 4406B, 4406C, which may be either polarization-roll sensors or pitch/yaw sensors as described herein above. The sensors 4406A, 4406B, 4406C surround a retroreflector 4407 having a region 4408 that includes a truncated portion of the glass cube corner and in addition has elements needed to obtain polarization-roll sensors such as 4320A, 4320B, 4320C or pitch/yaw sensors such as 4310A, 4310B, 4310C as described herein above. In an embodiment, the region 4408 is designed so as to complement the three sensors 4406A, 4406B, and 4406C, thereby providing the assembly 4400 with the ability to be used in determining all six degrees-of-freedom.

Figure 45B:
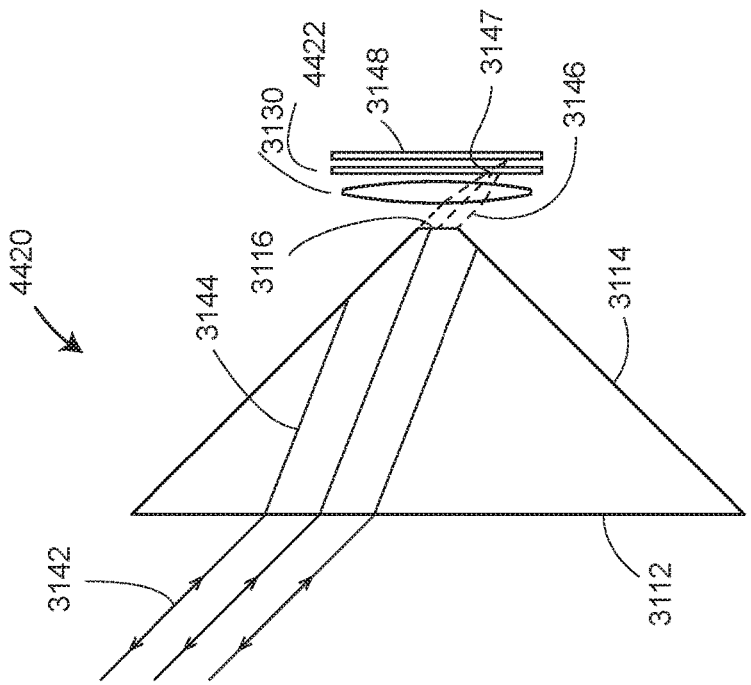
FIG. 45A and FIG. 45B illustrates a retroreflector assembly configured to pass light to a single position sensor configured to determine roll using polarization-roll detection and pitch/yaw using position on the position sensor according to an embodiment.
Figure 45A:
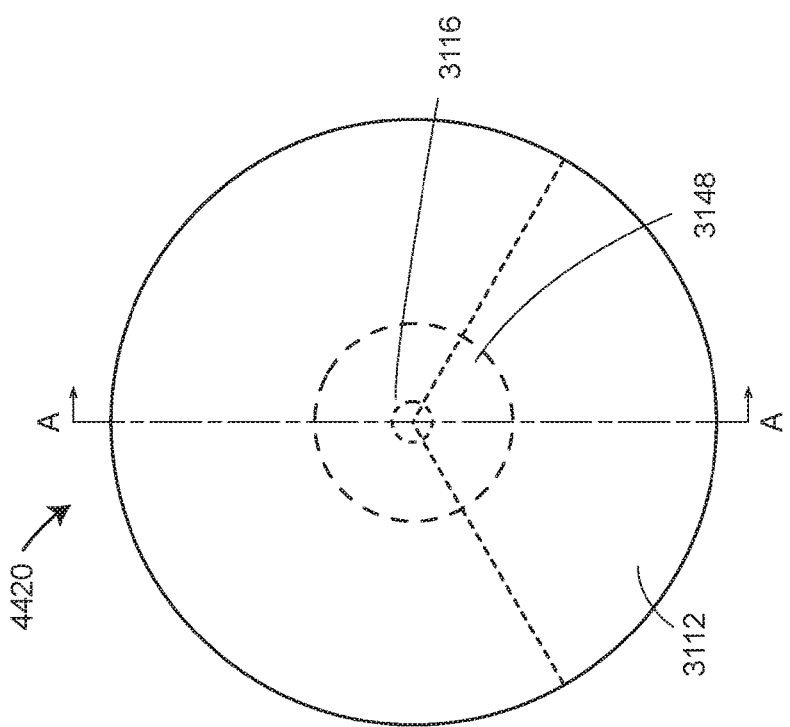

FIG. 45A and FIG. 45B show front and cross-sectional views, respectively, of a retroreflector assembly 4420 configured to measure pitch/yaw or roll or both. Light from an external device such as a laser tracker travels in a light bundle 3142 and refracts at the front face 3112 in a light bundle 3144 before passing through the truncated aperture 3116. The light 3146 passing through the truncated aperture 3116 passes through lens 3130 and optionally through polarizer 4422 before being focused in converging rays 3147 onto optical detector 3148, which may be a position sensor.

Figure 46:
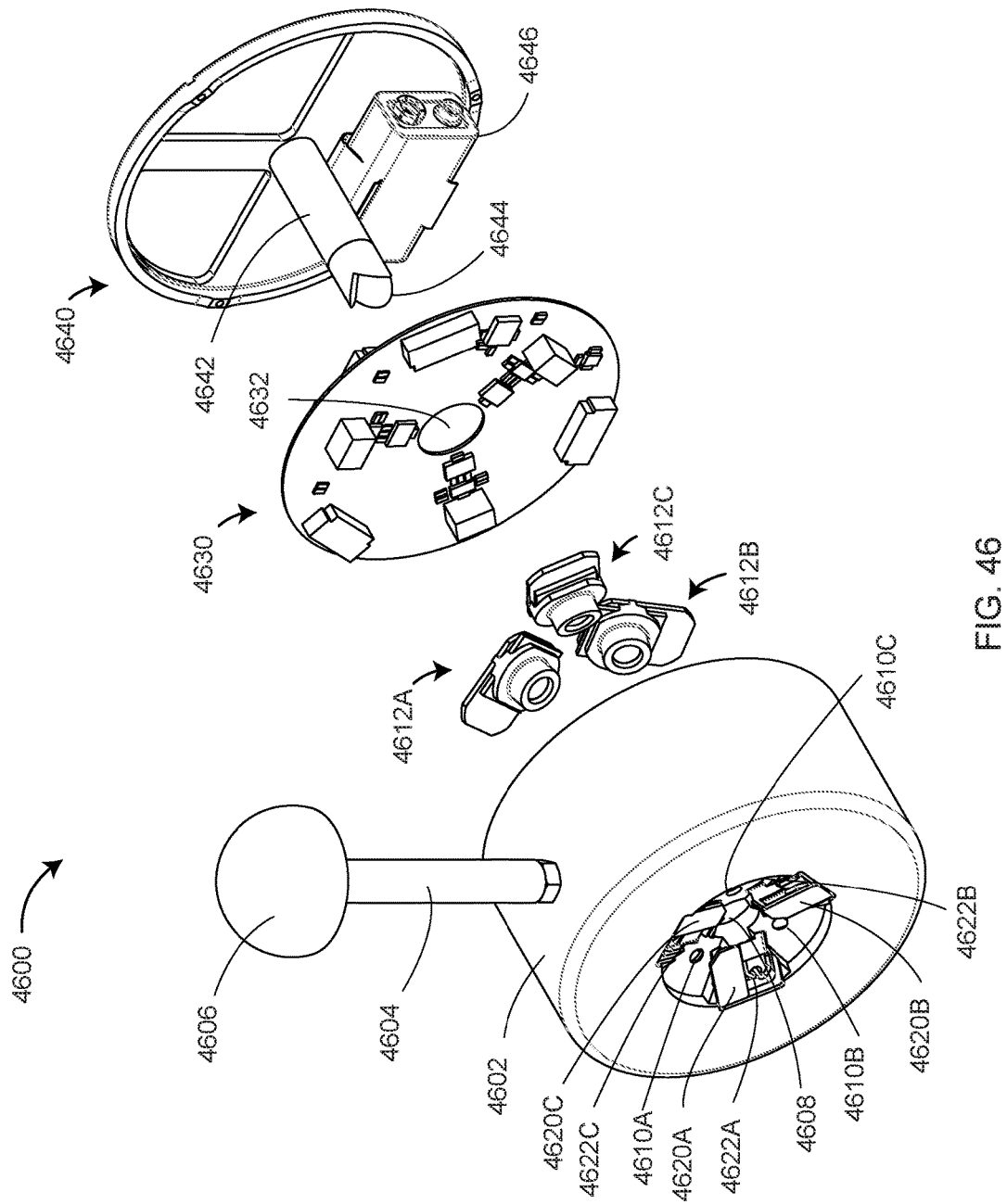
FIG. 46 is an exploded, orthographic view of a six-DOF tactile probe according to an embodiment.

FIG. 46 is an exploded view of a tactile six-DOF probe 4600 according to an embodiment. A probe tip 4606 having a spherical surface is attached to a stylus shaft 4604, which is affixed to a front housing 4602. At the center of the front face of the front housing 4602 is a circular opening 4608 sized to accept a retroreflector 4644. In an embodiment, the retroreflector is a hollow-core (air) cube corner retroreflector 4644. In an embodiment, the retroreflector 4644 is a glass prism having three mutually perpendicular reflecting surfaces. The front housing includes three apertures 4610A, 4610B, 4610C that transmit received light to pitch/yaw assemblies 4612A, 4612B, 4612C, respectively, each pitch/yaw assembly including a lens and a position detector. The front housing also includes three polarizers 4620A, 4620B, and 4620C that are above optical detectors (not visible), the polarizers sitting next to reference detectors 4622A, 4622B, and 4622C, respectively. The polarizers, detectors (not visible), and reference detectors, along with associated electronics, comprise the polarization-roll sensors. An electronics board 4630 is provided to support the pitch/yaw sensors and polarization-roll sensors. A circular hole 4632 at the center of the electronics board 4630 is sized to pass the retroreflector 4644 and shaft 4642 on the back-plate assembly 4640. A battery 4646 may also be provided.

In other embodiments, the probe tip 4606 and stylus shaft 4604 are replaced with other measurement devices or accessories such as a triangulation scanner, an indicator, a sensor, or a projector. These devices and accessories were discussed herein above with reference to FIGS. 12-18. In some embodiments, a plurality of six-DOF orientation sensors capable of measuring three orientational degrees of freedom (i.e., pitch, yaw, and roll) are mounted together on a probe to enable rapid measurement of the probe from a variety of different directions with the measurement devices or accessories likewise oriented in a variety of different directions. In other embodiments, a six-DOF orientation sensor, such as the sensor represented by the front housing 4602, are attached to the measurement devices or accessories with one or more rotation joints that have an angular encoder or other angle measuring device. With this approach, the operator steers the retroreflector to point at the beam of light from the laser tracker or other device and with the rotation joints adjusts the position and orientation of the measurement device or accessory as needed.

Figure 47:
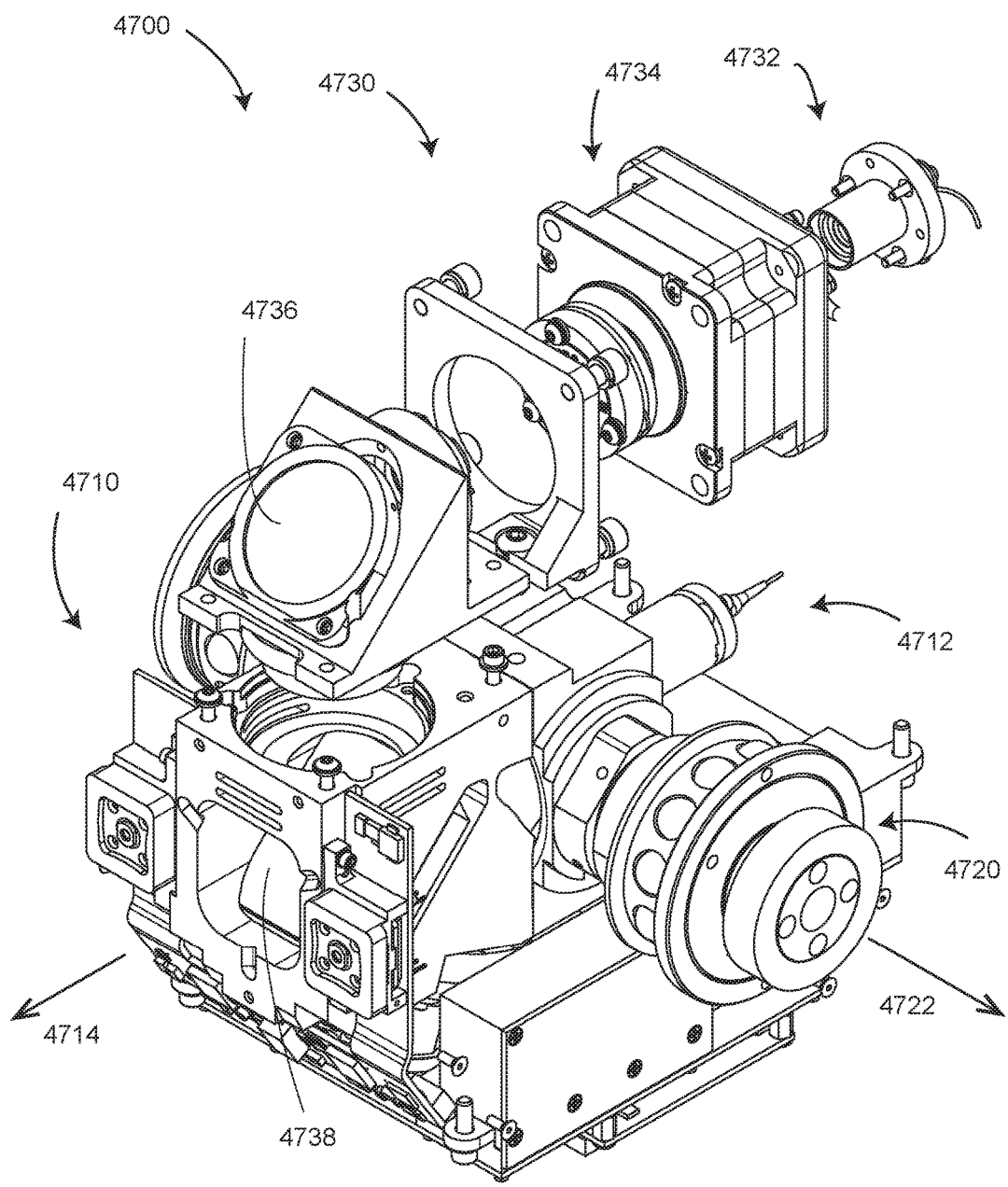
FIG. 47 is an exploded, orthographic view of components internal to a six-DOF laser tracker according to an embodiment.

FIG. 47 is an exploded view of a payload assembly 4700 of a laser tracker according to an embodiment. The payload assembly 4700 is similar to the payload assembly 15 of FIG. 1. The payload assembly 4700 includes a main optics path 4710 having a light source 4712 that produces a beam of light included in the launch beam 4714. The launch beam 4714 may be used to track a retroreflector target and measure the distance and two angles to the target. The launch beam 4714 is directed by steering a motorized shaft 4720 about a zenith axis 4722, which is equivalent to the zenith axis 18 of FIG. 1. The payload assembly is also steered about an azimuth axis, which is not shown in FIG. 47 but is similarly arranged as the azimuth axis 20 illustrated in FIG. 1. In an embodiment, the payload assembly 4700 also includes a secondary optics path 4730 that includes a light source 4732 that sends light through a polarization-roll generator 4734, which generates rotating polarized light using a rotating motor or an EO modulator, for example, as described herein above. In an embodiment, the light with the rotating linear polarization is used for the pitch/yaw sensor as well as the polarization-roll sensor. The light passes through beam expander lens elements to produce a collimated beam of light that, in an embodiment, has a diameter of 31 mm. The beam is folded down by mirror 4736 and reflected off a beam splitter 4738. This light is combined with the beam from the light source 4712 to form a single composite launch beam 4714 from co-propagating beams of light. A top view of the payload assembly 4700 is shown in FIG. 48A. A cross-section along A-A is shown in FIG. 48B. This cross-sectional view shows more clearly the lens elements in the secondary path, including lenses 4740, 4742, 4744, and 4746.

A potential problem that may be encountered when using curved lens elements to expand a beam is that the polarization state of the beam may change slightly over the diameter of the beam. The reason for this is that, at each curved point on surface, a ray of light may be divided into s and p polarization states relative to the curved surface. These s and p polarization states may each encounter a slightly different phase shift and attenuation in passing through the surface. The result of this effect is that a curved surface tends to change linearly polarized light into elliptically polarized light, with the state of polarization changing with the distance from the beam center.

Figure 49A:
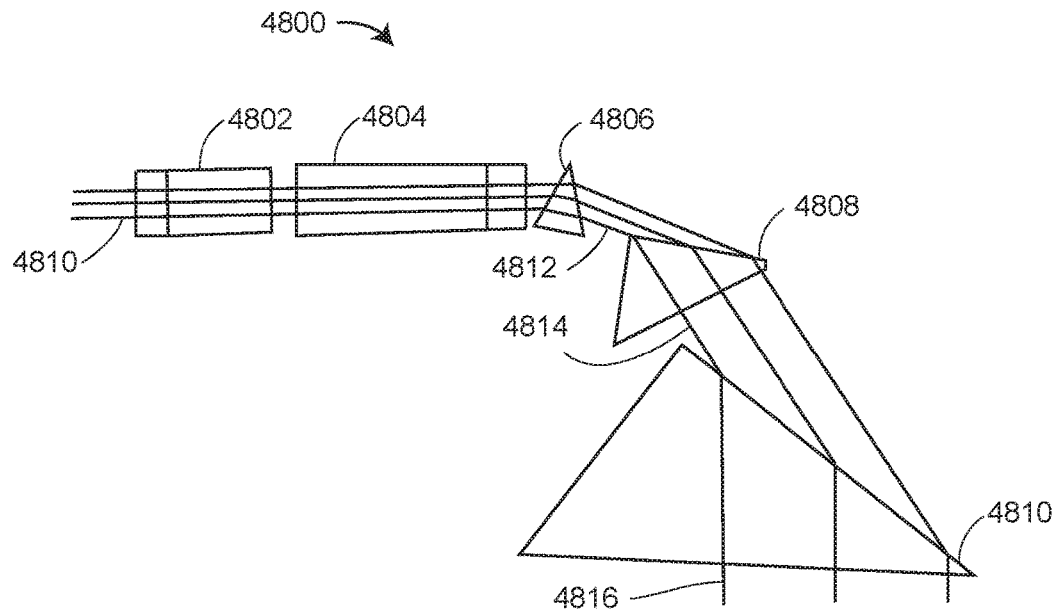
FIG. 49A and FIG. 49B are top and side views, respectively, of schematic representations of anamorphic prisms included in components internal to a six-DOF laser tracker according to an embodiment.
Figure 49B:
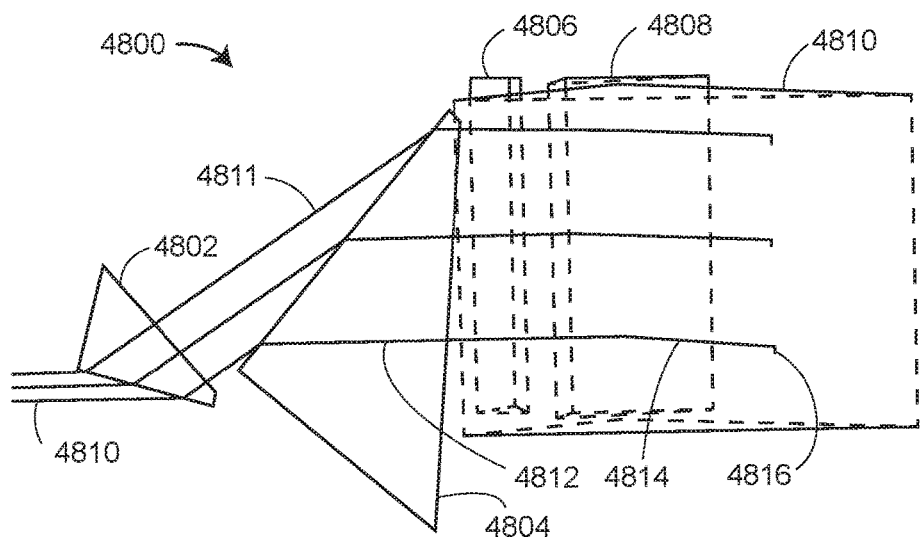

One means for addressing this issue is to obtain beam expansion using anamorphic prisms rather than curved lens elements such as the lens elements 4740, 4742, 4744, and 4746. FIG. 49A and FIG. 49B show side and top views, respectively, of a collection of anamorphic prisms that produce the same expansion of the beam as the curved lens elements of FIG. 48B without affecting the linear polarization state of the beam of light generated in the secondary optics path. FIG. 49A and FIG. 49B show four anamorphic prisms, 4802, 4804, 4808, 4810, and one turning prism 4806. FIG. 49A shows how the anamorphic prisms 4808 and 4810 expand the incoming beam of light 4612 in one dimension, which is apparent in the side view. The beam of light 4612 strikes the first surface of the anamorphic prism 4808 obliquely. If the angle of incidence of the beam 4612 is θ, the size of the beam on the first surface of the prism (as seen in the side view) is increased over the beam diameter by a factor of 1/cos(θ). By configuring the prism so that the second surface is perpendicular to the refracted beam of light in the prism 4808, the full size of the expanded beam is retained as it exits the prism 4808. Hence the beam 4814 is larger than the beam 4812 (in the side view). The beam 4814 is similarly expanded to the beam 4816 by the anamorphic prism 4810. In a similar manner, the anamorphic prisms 4802 and 4802 expand the size of the beam in the top view. The beam 4810 is smaller than the beam 4811, which is smaller than the beam 4812. The prism 4808 does not change the size of the beam but steers it in a desired direction.

Another means for addressing the issue with variation in polarization state over the beam width is to use only the center part of a larger beam for the polarization-roll sensor. This method is possible with the arrangements illustrated in FIGS. 41A, 41B, 44, 45A, and FIG. 45B. For the case of the FIG. 45A and FIG. 45B, the beam generated by the secondary path may be relatively small—such as, approximately the same size as the beam produced in the primary path. In this case, it may be possible in some embodiments to eliminate the secondary beam altogether and to use a beam having rotating linear polarization for tracking and measuring the three translation degrees of freedom as well as determining the three orientational degrees of freedom of the six-DOF probe.

Figure 50A:
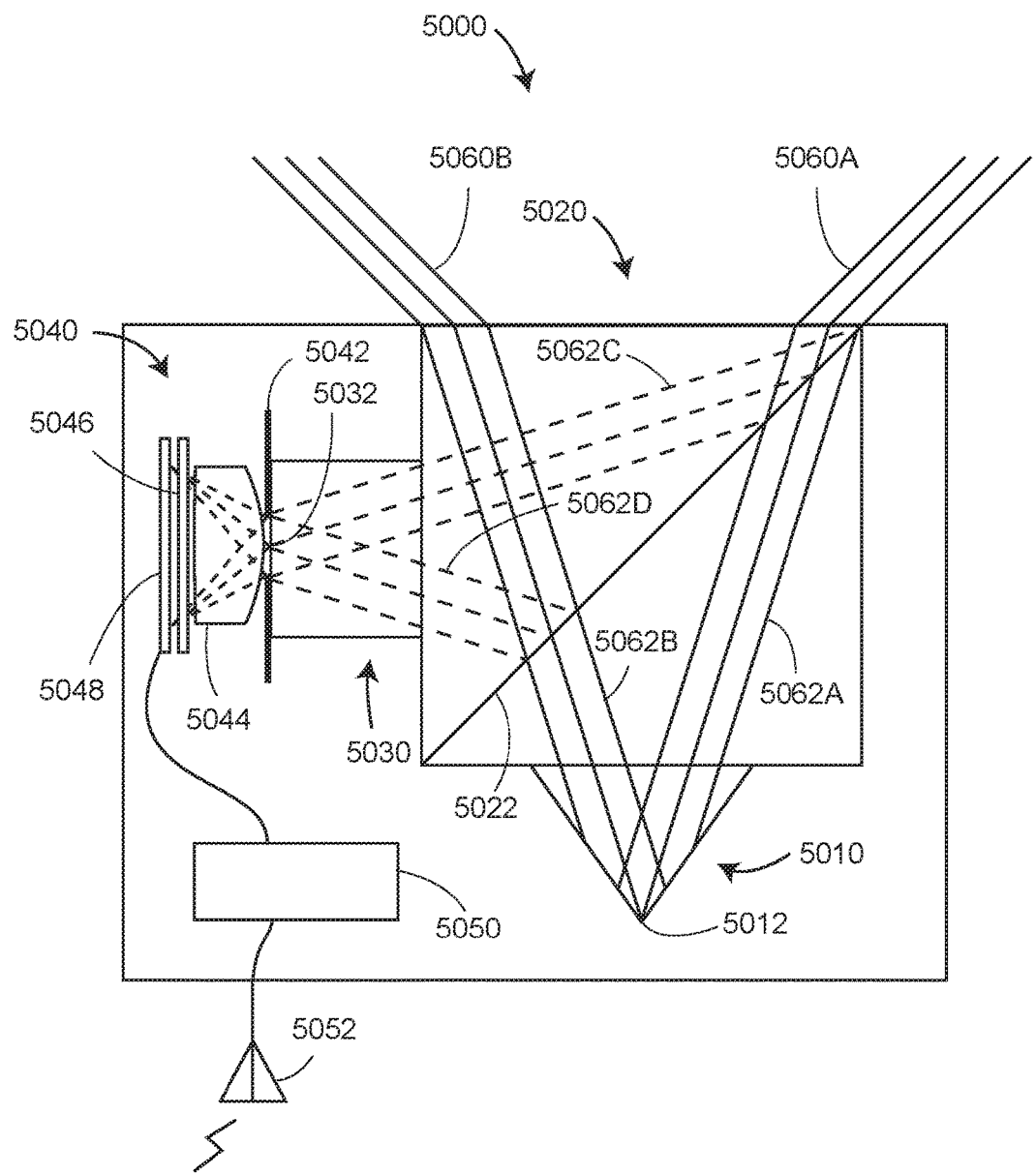
FIGS. 50A, 50B, and 50C are schematic representations of a six-DOF retroreflector assembly that combines a cube beam splitter with a cube-corner retroreflector made of high-index glass to measure roll and pitch/yaw angles according to an embodiment.
Figure 50B:
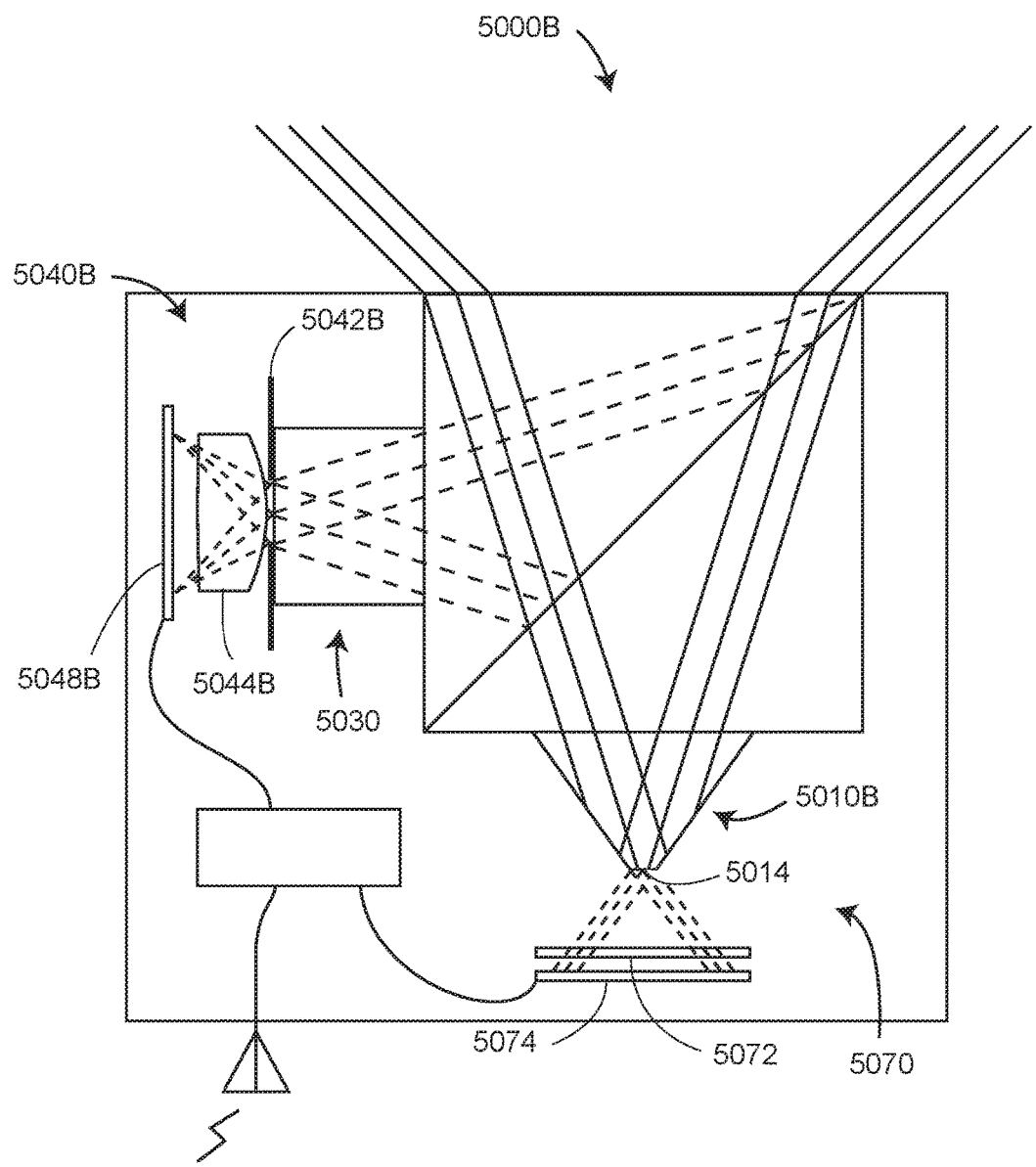
Figure 50C:
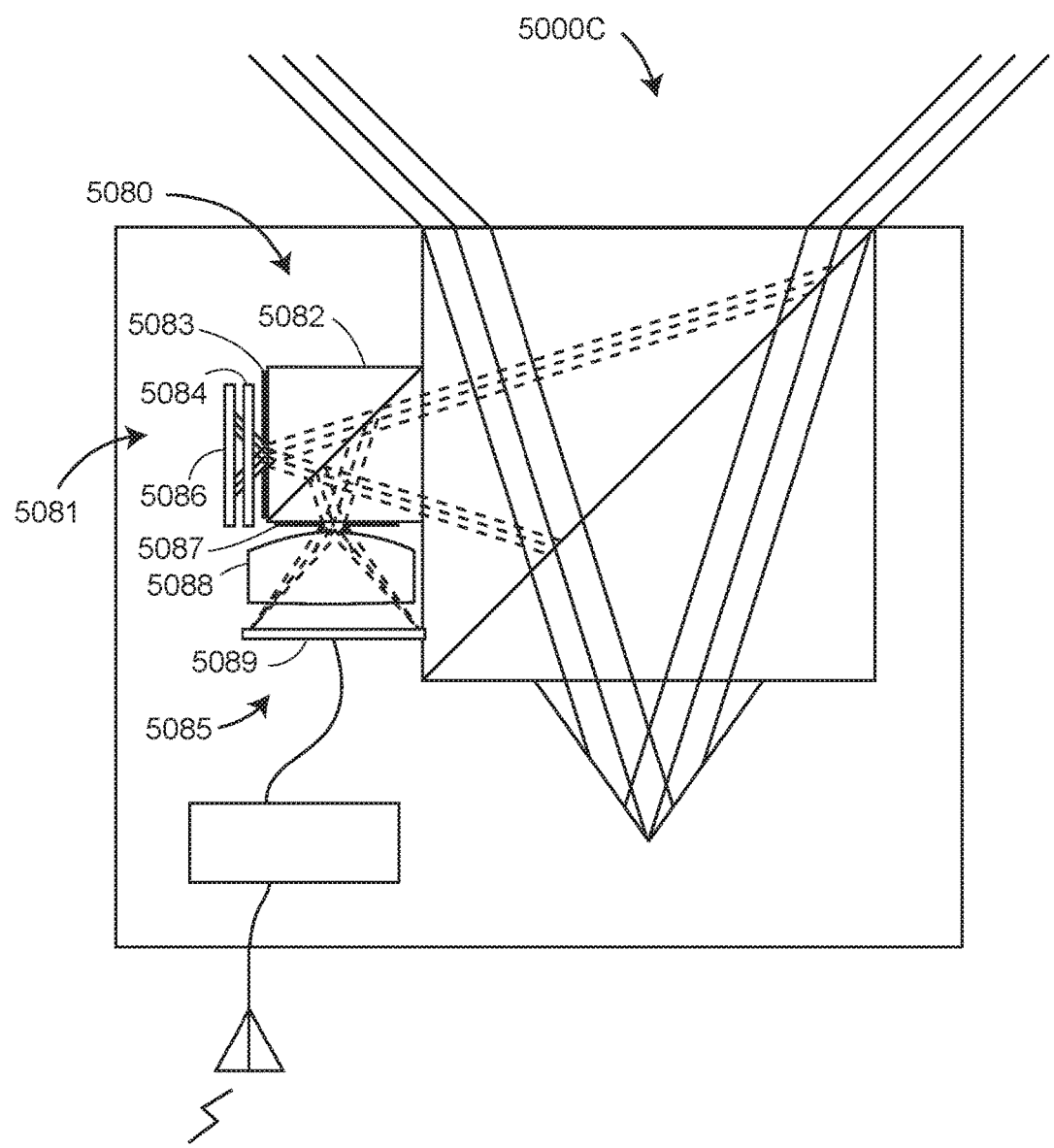

Another embodiment is now described for enabling the use of a small beam from a laser tracker or similar device for determining the six degrees of freedom of a retroreflector target. Types of apparatus supporting a small beam from the laser tracker or other device are shown in FIG. 50A, FIG. 50B, and FIG. 50C. In each embodiment, a beam splitter is placed over a cube-corner prism. In an embodiment shown in FIG. 50A, FIG. 50B, and FIG. 50C, the cube-corner retroreflector prism and the beam splitter are made of a high index of refraction transparent material, which may be an amorphous glass or a crystalline material. In an embodiment, the material is clear grade polycrystalline zinc sulfide (ZnS) having an index of refraction of 2.35 at a wavelength of 633 nm. In FIG. 50A, the orientational sensor includes a ZnS cube corner retroreflector prism 5010 attached to a ZnS beam splitter 5020. On the side of the beam splitter that projects reflected light, a spacer element 5030 of ZnS is attached. A combination sensor 5040 that includes a functionality of a polarization-roll sensor and pitch/yaw sensor is obtained by placing an aperture 5042, lens 5044, polarizer 5046, and position sensor 5048 as shown in FIG. 50A. The point 5032 is a virtual image of the cube-corner vertex 5012 of FIG. 50A. The light from a laser tracker follow (tracks) the virtual image point 5032 in the same way it follows (tracks) the vertex of the cube-corner retroreflector. The behavior of the combination sensor 5040 is therefore similar to the sensor described with respect to FIG. 45A and FIG. 45B except that the truncated aperture 3116 in the cube-corner retroreflector is replaced with the aperture in element 5042.

FIG. 50B illustrates an alternative embodiment in which a polarization-roll sensor 5070 is placed in a position to capture light transmitted directly through the truncated vertex 5014. Other elements in the polarization-roll sensor 5070 include the polarizer 5072 and the optical detector 5074. The pitch/yaw sensor in FIG. 50B receives light through the pitch/yaw sensor 504B, which is the same as the sensor of FIG. 5040A except that the polarizer has been removed.

FIG. 50C shows another embodiment, in which the material block 5030 is replaced with a cube beam splitter 5082 that sends part of the light to a polarization-roll sensor 5081 and another part of the light to a pitch yaw sensor 5085. In this configuration, the polarization roll sensor 5081 includes an aperture 5083, polarizer 5084, and optical detector 5086. The pitch/yaw sensor 5085 includes an aperture 5087, lens 5088, and position detector 5089.

Figure 51:
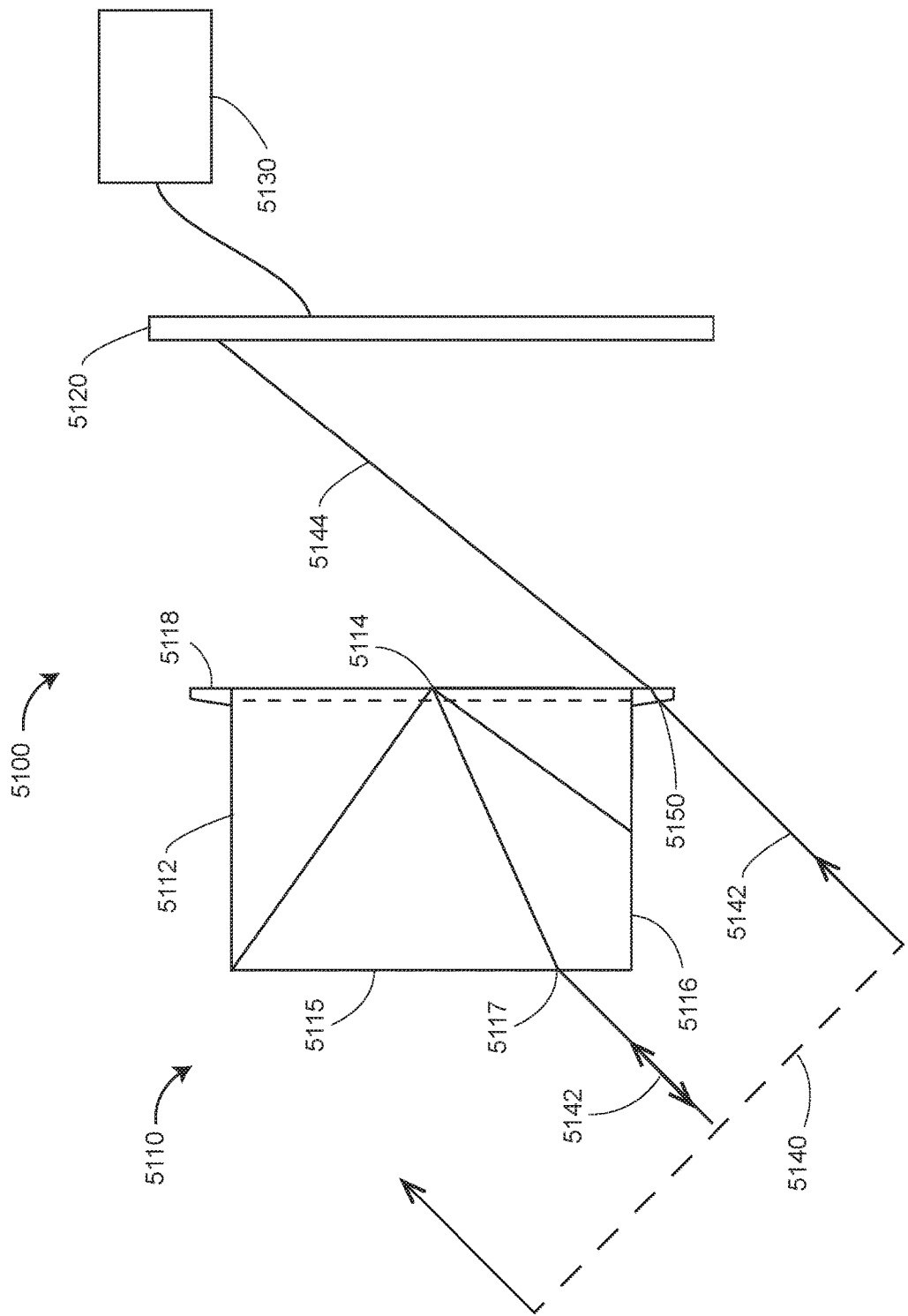
FIG. 51 is a cross-sectional view of a schematic representation of an assembly that includes a retroreflector surrounded by a lens ring that projects light onto a position sensor according to an embodiment.

FIG. 51 shows another pitch/yaw sensor 5100 for determining the pitch and yaw angles (or equivalent) of a retroreflector 5112. In an embodiment, the pitch/yaw sensor includes a retroreflector assembly 5110, position sensor 5120, and electrical circuit 5130. The retroreflector assembly 5110 includes a cube-corner retroreflector 5112 and a lens ring 5118. In an embodiment, the cube-corner retroreflector is a glass prism having a vertex 5114 and cylindrically ground sides 5113, with the prism assembly mounted in a cylindrical can 5116. The lens ring 5118 is a lens that has a central region removed so as to fit around the back side of the can 5116. A beam of light 5140 illuminates the retroreflector assembly 5110. One ray 5142 from the beam of light 5140 refracts at the front surface 5115 of the retroreflector 5112 and travels toward the vertex 5114. If the light 5140 comes from a laser tracker or other device having a tracking system, the beam of light 5140 is centered on the ray 5142. For a tilted retroreflector, the intersection point 5117 tends to move away from the center of the front surface 5115 in the direction of the nearest retroreflector edge, as illustrated in FIG. 51. A collection of rays 5142 from the beam of light 5140 illuminates the side of the lens ring 5118. Points along illuminated portions of the lens ring refract the light into rays 5144, which travels to position sensor 5120. In an embodiment, the lens ring 5118 is darkened except in a transparent ring near positions 5150 around the periphery of the lens ring. The position sensor may be a photosensitive array such as a CMOS or CCD array, or it may be an analog position sensor such as a tetra-lateral PSD.

Figure 52:
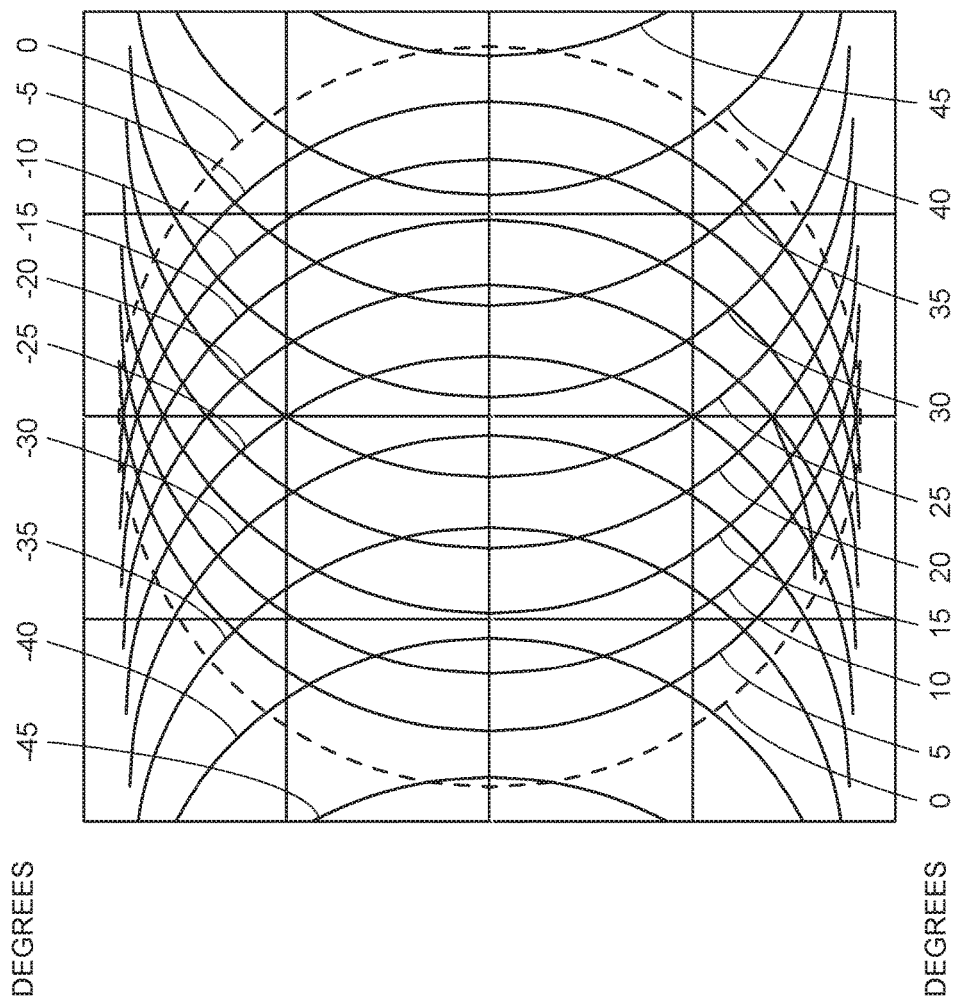
FIG. 52 shows the pattern formed on the sensor for the assembly of FIG. 51 tilted to different angles according to an embodiment.

In an embodiment, the diameter of the retroreflector prism 5112 and surrounding can 5116 is 8 mm, the lens ring is obtained from a plano-convex lens made from borosilicate crown glass (such as N-BK7 manufactured by Schott North America, Inc. of Elmsford, N.Y.) having a radius of curvature of 40 mm, and the position sensor is an array having 2048×2048 pixels, each 5 pixel being 5 micrometers on a side (such as that manufactured by CMOSIS America, LLC of Raleigh, N.C. for example). The pattern formed on the photosensitive array 5120 for this embodiment is shown in FIG. 52 for different angles of rotation about a given axis (e.g., pitch axis or yaw axis). Different angles of rotation are marked along the top of the graph for negative rotations and along the bottom axis for positive rotations. For the beam 5140 striking the retroreflector front surface 5115 at normal incidence, the pattern is circle, indicated in FIG. 52 by a dashed line. For the case in which there is a combination of pitch rotation and yaw rotation, the pattern of FIG. 52 is rotated at an angle. In an embodiment, the observed image pattern is fit to the possible curves such as those of FIG. 52 to determine the pitch/yaw angles (or equivalent). In an embodiment, the method of pulsing the source of light is used, as discussed herein above with reference to FIG. 33B. In another embodiment, the position sensor is a tetra-lateral PSD. The PSD provides the centroid of the light, which is used to determine the pitch/yaw angles. The methods of background light reduction described herein above in reference to FIG. 33A may be used in this case.

Figures 54A, 54B:
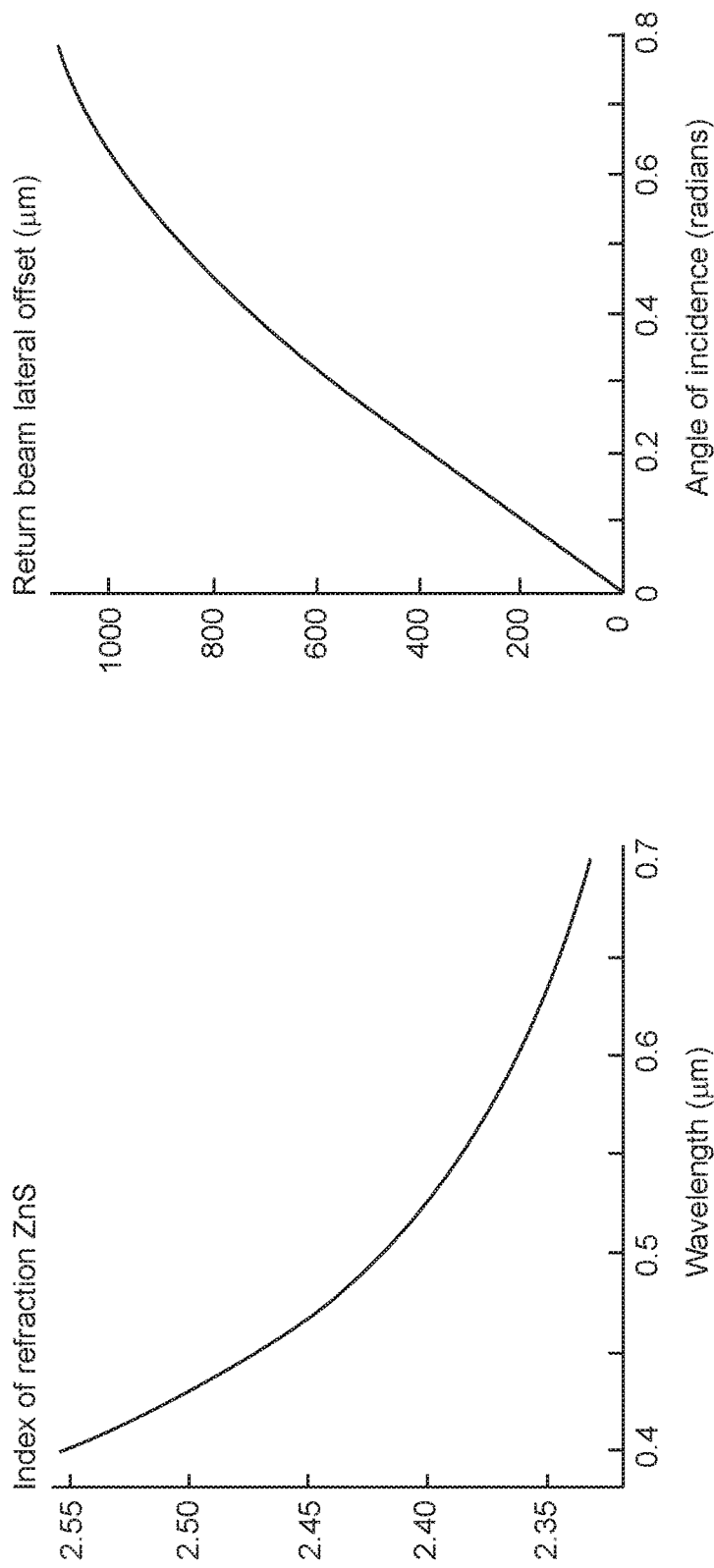
FIG. 54A is a graph of the index of refraction of zinc sulfide as a function of wavelength.
FIG. 54B is a graph of lateral separation of the return beams of two different wavelengths of light for zinc sulfide material according to an embodiment.

FIG. 53A and FIG. 53B show another method for determining pitch/yaw (or equivalent) angles based on dispersion of glass. FIG. 53A shows a cross section of a cube-corner retroreflector prism 5300 having a front face 5302 and a vertex 5304. A beam of light 5310 is launched from a laser tracker or other device. The beam 5310 includes two wavelengths of light: a blue wavelength and a red wavelength. Over the path from the laser tracker to the retroreflector 5300, the two wavelengths of light are co-propagating and collinear. The laser tracker tracks on the red beam by keeping the red beam centered on the vertex 5304. FIG. 54A shows a graphical plot of the index of refraction of a clear ZnS polycrystalline material. The index of refraction for blue light at 405 nm is 2.55. The index of refraction for red light at 637 nm is 2.36. The greater index of blue light in ZnS causes the blue beam to bend inward toward the normal. FIG. 53A shows that the red beam travels to the vertex and returns from the retroreflector as beam 5310. The blue beam reflects to the left of the vertex and returns on the right of the vertex, exiting the retroreflector surface 5302 closer to the center of the front face 5302. The total distance traveled by the beams of red and blue light as they enter the retroreflector, reflect of three perpendicular surfaces and exit the retroreflector is twice the distance from the center of the front face 5302 to the vertex. The path traveled by the blue and red light is modeled mathematically following two oppositely directed retroreflectors, as discussed herein above with reference to FIGS. 21-23. The exit position of the blue beam 5312B and the red beam 5310B on the bottom surface of the reversed retroreflector 5320 can be used to obtain the positions of the beams 5310, 5312 from the front face 5302 of the retroreflector 5300.

Figure 55:
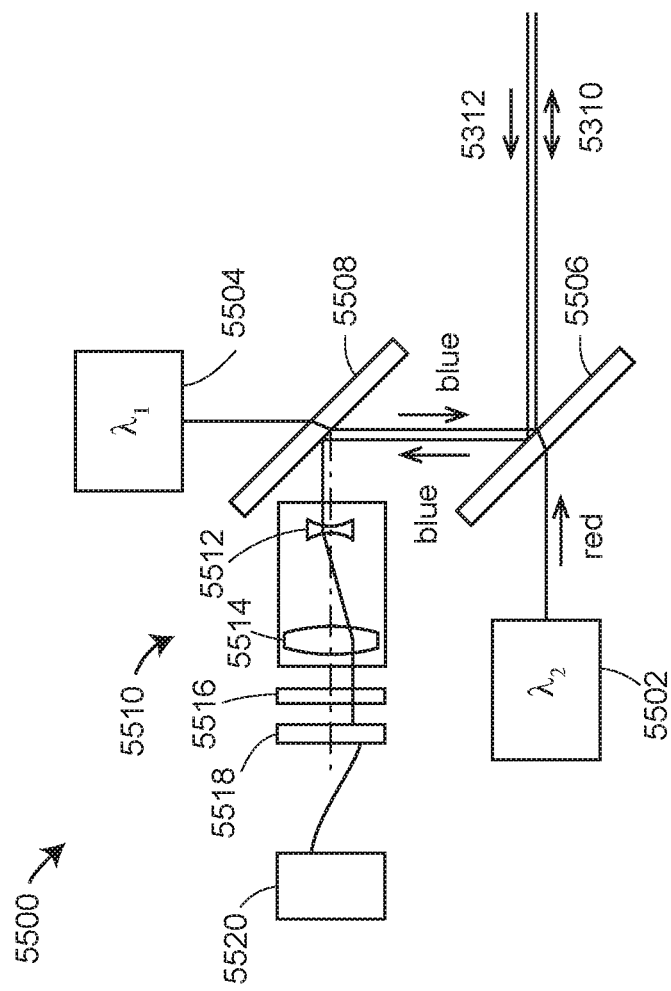
FIG. 55 is an assembly within a six-DOF laser tracker for measuring lateral separation of the return beams according to an embodiment.

FIG. 55 shows how the red and blue light is generated and evaluated in a laser tracker or other device. A first beam of red light having a wavelength of $\lambda_2$ is generated by light source 5502. A second beam of blue light having a wavelength of $\lambda_1$ is generated by light source 5504. The red and blue lights and combined by dichroic beam splitter 5506 and travel outward from the laser tracker or similar device on beam 5310. For the retroreflector beam, a red light is returned on beam 5310 and a blue light is returned on beam 5312. The red light is tracked by the position detector and hence is kept fixed in place. The return blue light reflects off the dichroic beam splitter 5506, reflects partially off beam splitter 5508, travels through beam expander 5510, passes through polarizer 5516, and into the position detector 5518. An electrical circuit 5520 processes the received data to determine the tilt (pitch/yaw angles or similar) of the retroreflector target.

In an embodiment, the beam expander includes a negative lens and a positive lens that together provide a magnification of 3. The amount of displacement on the position detector 5518 of this beam is shown as a function of pitch/yaw angle in FIG. 54B. For this situation with a one-inch ZnS retroreflector, the pitch/yaw angle produces a displacement on the position detector of around 250 micrometers, which occurs at the maximum angle of incidence of +/−45 degrees.

Figure 56:
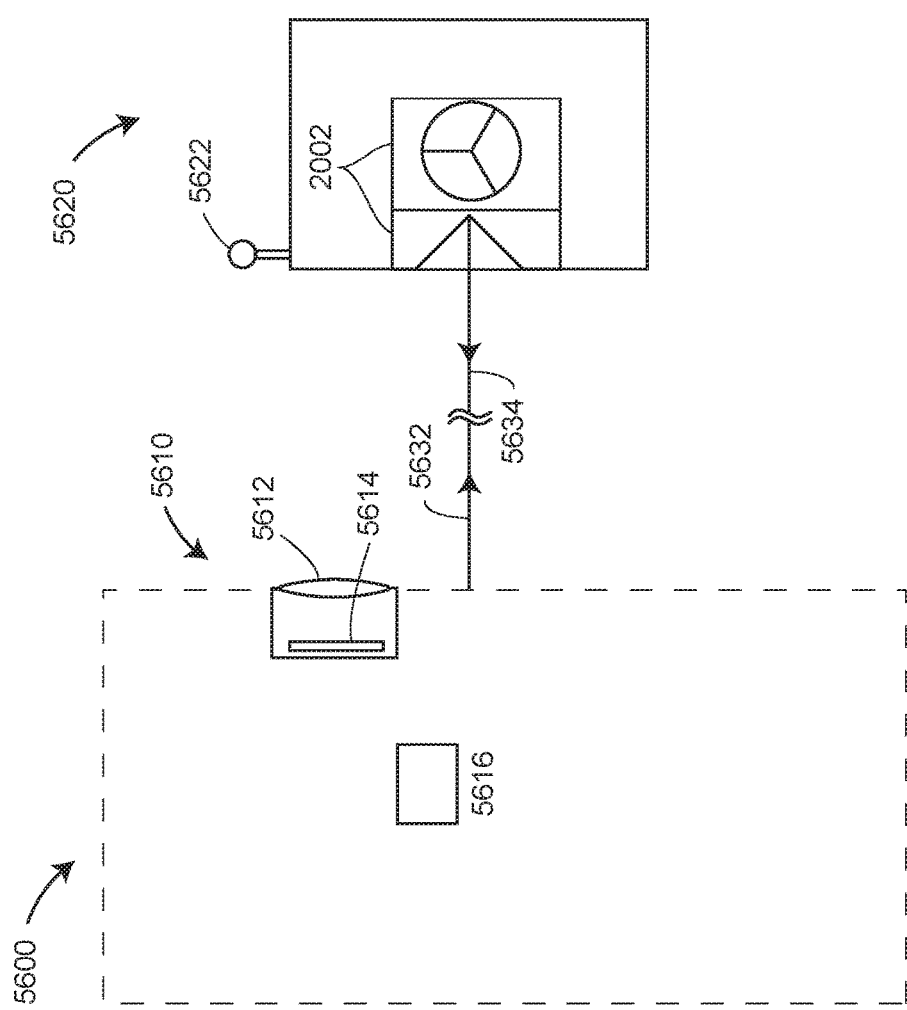
FIG. 56 illustrates a method for imaging a light source to determine roll angle when combined with information provided by a pitch/yaw sensor according to an embodiment.

FIG. 56 shows a laser tracker or similar device 5600 that sends a beam of light 5632 to a retroreflector target included in a sensor 2002 that is a part of a target assembly 5620. The retroreflector returns the beam of light to the device 5610 as a beam 5634. In an embodiment, the device 5610 is a camera. In an embodiment, the one or more sensors 2002 measure the pitch/yaw angles. The target assembly further includes one or more light sources 5622 attached to the target assembly 5620. An image of the light source 5622 is obtained by the camera 5610, which includes a lens 5612 and a photosensitive array 5614. A processor 5616, which may be included in the device 5600 or in an external computer, determines the roll angle of the target assembly 5620 relative to the frame of reference of the device 5600 based on the pitch/yaw angles (or equivalent) measured by sensors 2002 and on the roll angle determined based at least in part on the image obtained on the photosensitive array 5614.

Figure 57:
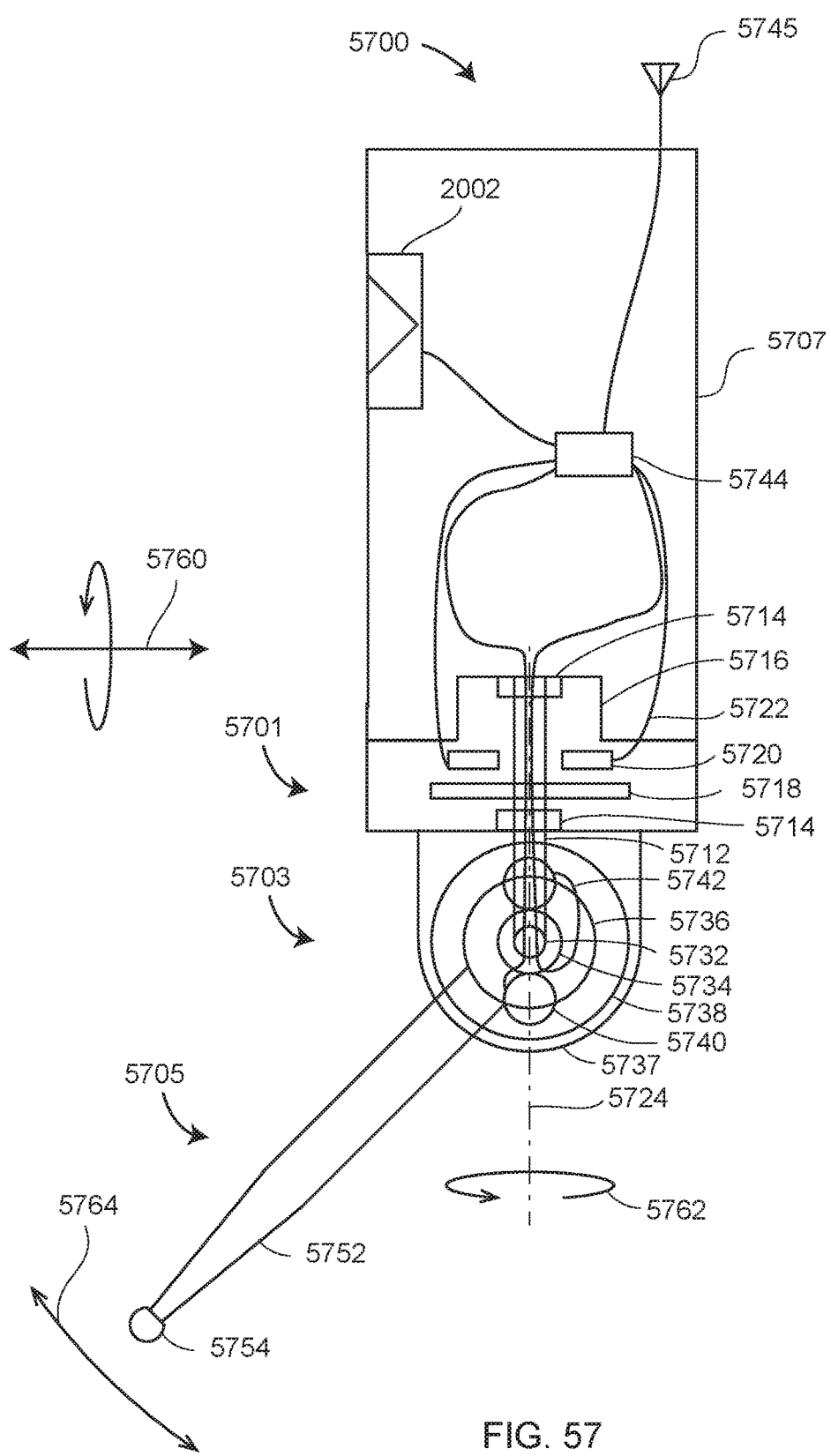
FIG. 57 illustrates a method of using a single six-DOF sensor assembly in combination with a tactile probe attached to the assembly with two rotating mechanisms and angular encoders according to an embodiment.

FIG. 57 is a schematic representation of a six-DOF tactile probe 5700. It includes a six-DOF assembly 2002 having a retroreflector that receives light from and returns light to a laser tracker or other device. It also includes a processor 5744 and an antenna 5745. In addition, in an embodiment, it includes a first encoder assembly 5701, a second encoder assembly 5703, and a tactile probe assembly 5705. In an embodiment, the first encoder assembly 5701 includes an axle 5712, two bearings 5714, a mounting block 5716, an encoder disk 5718, one or more read heads 5720, and electrical wires 5722 running from the read heads to the processor 5744. In an embodiment, axle 5712 turns on bearings 5714, which are seated within mounting block 5716. The encoder disk 5718 is fixedly attached to axle 5712, and read heads 5720 are fixedly attached to the mounting block 5716. The encoder disk 5718 rotates about the axis 5724. The electrical signals from the read heads 5720 are sent over wires 5722 to processor 5744, which evaluates the signals to determine the angle of rotation of the encoder disk 5718 and axle 5712 about the axis 5724.

In an embodiment, the second encoder assembly includes an axle 5732, two bearings 5734, an inner mounting block 5736, an outer mounting block 5037, an encoder disk 5738, one or more read heads 5740, and electrical wires 5742 running from the read heads to the processor 5744. The axle 5732 turns on bearings 5734, which are seated within inner mounting block 5736, which is affixed to outer mounting block 5737. The encoder disk 5738 is fixedly attached to axle 5732, and read heads 5740 are fixedly attached to the mounting block 5736. In an embodiment, the electrical signals from the read heads 5740 are sent over wires 5742 through hollow axle 5712 to processor 5744, which evaluates the signals to determine the angle of rotation of the encoder disk 5738 and axle 5732.

In an embodiment, the tactile probe assembly 5705 includes a probe shaft 5752 and a probe tip 5754. The probe shaft 5752 is attached to inner mounting structure/inner mounting block 5736. The processor 5744 or one of the processors in the tracker is configured to determine 3D coordinates of the center of the probe tip 5754 based on the three translational degrees of freedom measured by the laser tracker 10 or similar device and by the three orientational degrees of freedom measured by the six-DOF probe 5700.

In an embodiment, a laser tracker 10 may steer a beam of light out of the tracker about the zenith axis 18 with a resulting angle relative to a horizontal plane of approximately −52 degrees to +78 degrees. The retroreflector in the six-DOF assembly 2002 may be pointed in the direction of a laser beam emitted by the laser tracker. Furthermore, the six-DOF tactile probe 5700 may be rotated to any angle about the axis 5760. In other words, the probe tip 5754 may be rotated about the axis 5760 to point below, above, or to the side of the body 5707. The additional degree of rotational freedom 5762 provided by the first encoder assembly 5701 permits the probe to be rotated to the front, back, or side of the body 5707 relative to the retroreflector in the six-DOF assembly 2002. The additional degree of rotational freedom 5764 provided by the second encoder assembly 5703 permits the probe to be rotated in an arc forward, down, or backwards.

Figure 58:
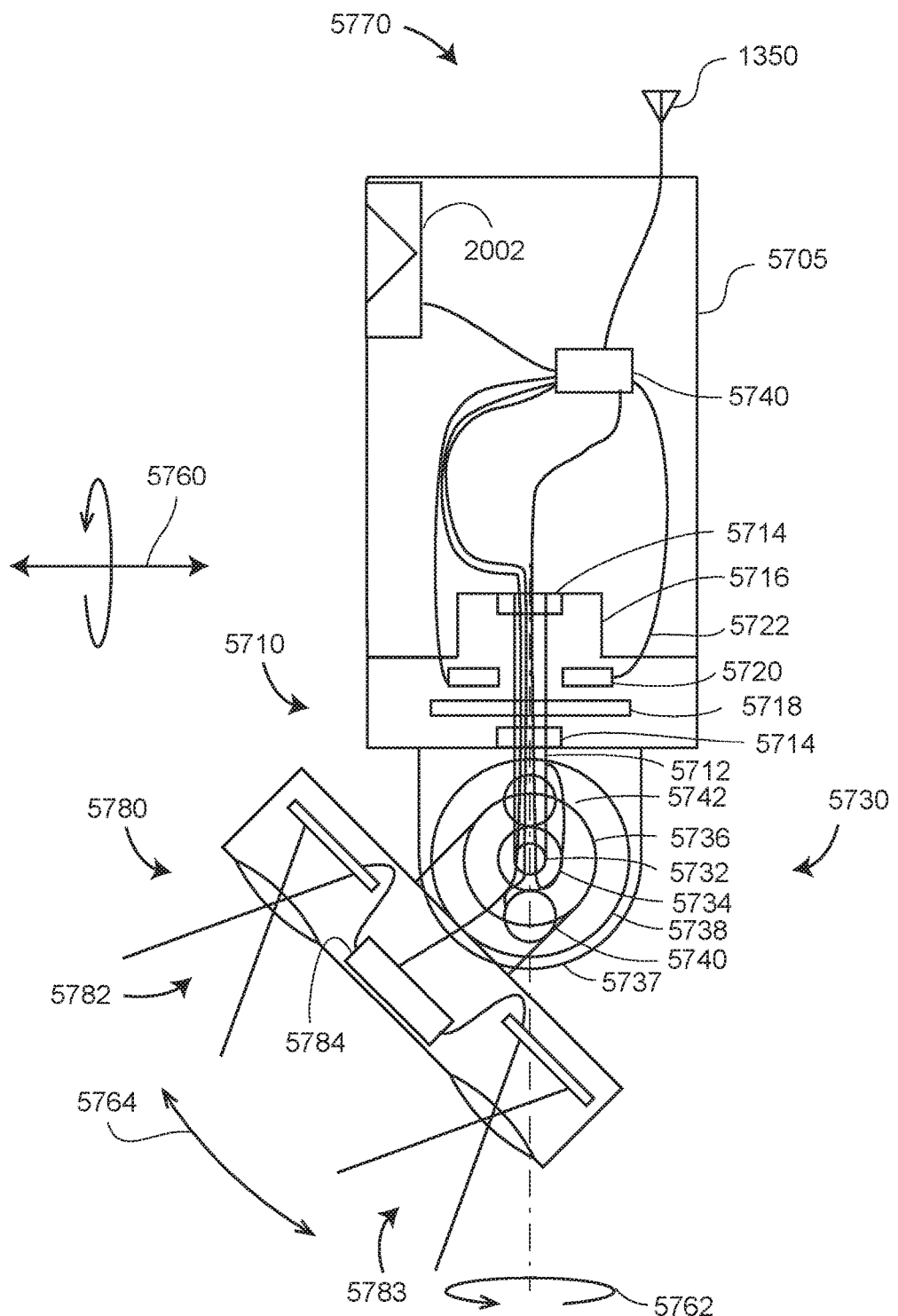
FIG. 58 illustrates a method of using a six-DOF sensor assembly in combination with a triangulation scanner attached to the assembly with two rotating mechanisms and angular encoders according to an embodiment.

FIG. 58 is a schematic representation of a six-DOF triangulation scanner 5770. It includes the elements of six-DOF tactile probe 5700 of FIG. 57 but replaces the tactile probe assembly 5705 with a triangulation scanner assembly 5780. In an embodiment, the triangulation scanner includes a projector 5782, a camera 5783, and a processor 5784. The triangulation scanner may be rotated to a wide variety of positions as explained herein above for the case of the six-DOF tactile probe 5700 of FIG. 57. Many types of triangulation scanners are available. Some project a line of light, while other scanners project an area of light. Some scanners make multiple sequential measurements, while others measure in single shots as discussed herein above.

The six-DOF triangulation scanner 5770 measures 3D coordinates of a workpiece using the principles of triangulation. There are several ways that the triangulation measurement may be implemented, depending on the pattern of light emitted by the scanner light source and the type of photosensitive array. For example, if the pattern of light emitted by the scanner light source is a line of light or a point of light scanned into the shape of a line and if the photosensitive array is a two dimensional array, then one dimension of the two dimensional array corresponds to a direction of a point on the surface of the workpiece. The other dimension of the two dimensional array corresponds to the distance of the point from the scanner light source. Hence the three dimensional coordinates of each point along the line of light emitted by scanner light source is known relative to the local frame of reference of the six-DOF scanner 5770.

For a six-DOF scanner 5770 held by hand, a line of laser light emitted by the scanner light source may be moved in such a way as to "paint" the surface of the workpiece, thereby obtaining the three dimensional coordinates for the entire surface. It is also possible to "paint" the surface of a workpiece using a scanner light source that emits a structured pattern of light over an area. In an embodiment, the structured light may be in the form of a coded pattern that may be evaluated to determine three-dimensional coordinates based on single image frames collected by the camera 5783 of the scanner 5780.

Figure 59F:
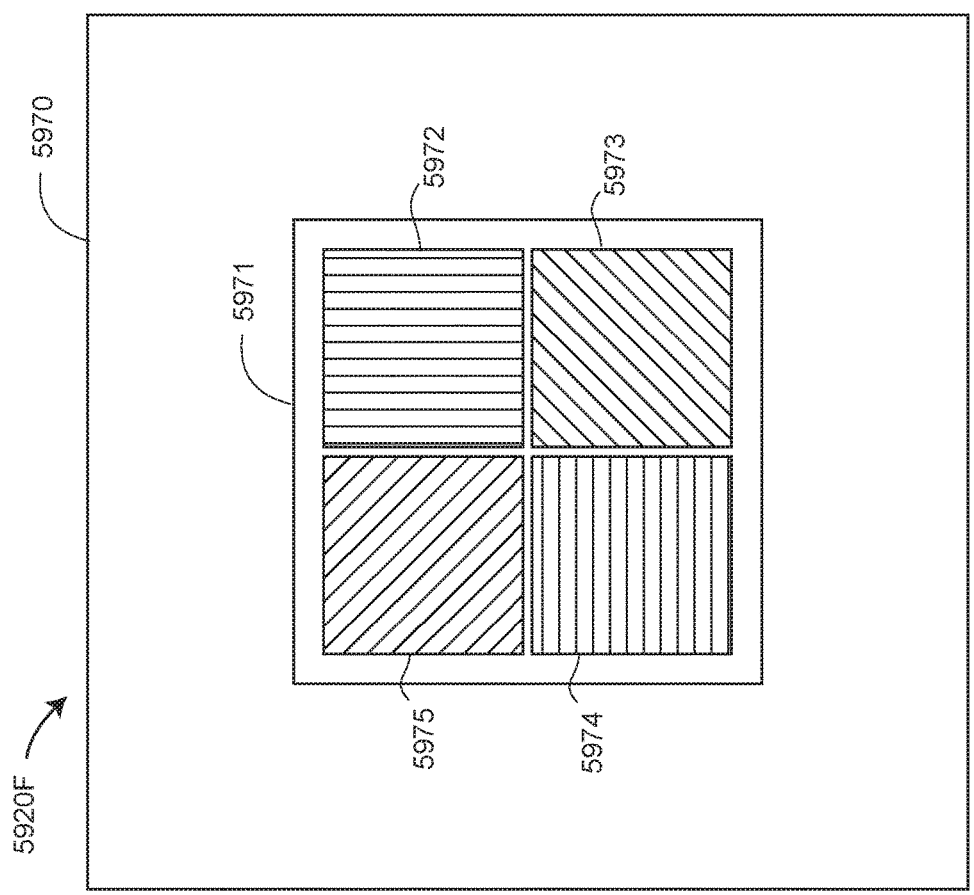

In an embodiment, the roll angle of a six-DOF probe is based on projection of non-rotating linearly polarized light onto a collection of polarizers in front of optical detectors. In an embodiment illustrated in FIG. 59A, the collection of polarizers and optical detectors are attached to a housing 5902 that also holds a retroreflector 5910. In an embodiment, the collection of polarizers includes four linear polarizers 5922A, 5923A, 5924A, and 5925A, each of the detectors oriented at a different angle. In an embodiment, the polarizers are placed over optical detectors 5930, represented as circles in FIG. 59A. In an embodiment, the polarizers 5922A, 5923A, 5924A, and 5925A have polarization directions (with respect to a horizontal axis) of 90, 135, 0, and 45 degrees, respectively. The optical power through these four directions may be analyzed to determine the direction of linear polarization of an incoming beam of light from a laser tracker. A collection of polarization and detector elements sufficient to determination a polarization angle of light striking the assembly may be referred to as a polarization angle detector. In FIG. 59A, the polarization angle detector is the element 5920A. In FIGS. 59B-F, the polarization angle detectors are 5920B, 5920C, 5920D, 5920E, and 5920F. In an embodiment, a plurality of polarization angle detectors are placed around the retroreflector 5910 on a housing 5902. In an embodiment, three polarization angle detectors are placed at intervals of 120 degrees, along with three pitch/yaw sensors, in a manner analogous to that shown in FIGS. 43A-C. In other embodiments, more or fewer polarization angle sensors are placed around the retroreflector 5910. In an embodiment, the polarization sensor is tilted at an angle to permit a probe tilt angle of more than 45 degrees, as illustrated in FIG. 43B and FIG. 43C.

For polarizer angles shown in FIG. 59A-FIG. 59F, each of the polarization angle detectors 5920A-5920F is an example of a Stokes polarimeter, which is a device capable of measuring polarization angle by measuring the Stokes parameters of the incoming light. The Stokes parameters, also referred to as the Stokes vectors, may be represented by a matrix having four matrix elements $S_0$, $S_1$, $S_2$, and $S_3$. These four matrix elements are alternatively referred to as I, Q, U, and V. Let $P_x$ be the optical power of light polarized in the x direction, and let $P_y$ be the optical power of light polarized in the y direction. Let $P_a$ be the optical power of light polarized in at +45 degrees, and let $P_b$ be the optical power of light polarized at −45 degrees. Let $P_l$ be the optical power of light having left circular polarization, and let $P_r$ be light having right circular polarization. For the case considered here, the polarization state of the light is not random. In this case, the Stokes parameter $S_0$ is the total optical power.

In other words, $S_0=P_x+P_y=P_a+P_b=P_l+P_r$. The other Stokes parameters are defined as $S_1=P_x-P_y$, $S_2=P_a-P_a$, and $S_3=P_l-P_r$. For the case of linearly polarized light, it can be shown that the angle of linear polarization is AoLP=0.5 arctan($S_2$/$S_1$). Hence, for this case, the angle of linear polarization may be found by measuring the optical power through each of the four polarizers 5922A, 5923A, 5924A, 5925A onto the optical detectors 5930, taking the differences in the optical powers to obtain $S_2$ and $S_1$, and then substituting these values into the formula above.

In some embodiments, the polarizers 5922A, 5923A, 5924A, and 5925A are not exactly spaced at increments of 45 degrees. It is still possible to calculate the angle of linear polarization if the angles of the polarizers are known. In this case, an optimization procedure, such as a least squares fit, is performed to determine AoLP.

Alternative realizations of a polarization angle detector are illustrated as elements 5920B, 5920C, 5920D, 5920E, and 5920F shown in FIGS. 59B, 59C, 59D, 59E, and FIG. 59F, respectively. FIG. 59B illustrates the four linear polarizers 5922A, 5923A, 5924A, and 5925A placed over four separated regions of a quadrant detector 5935, the regions being separated by gap lines 5937. Electrical signals from the four quadrant regions are evaluated to determine the optical power present on each region.

As explained herein below, the optical source of linearly polarized light in the laser tracker is configured to provide uniform optical power over the area of each polarization angle detector. However, optical power per unit area is never exactly uniform, and hence several embodiments described herein below are provided to assist in accounting for the variations in optical power. In an embodiment, a polarization angle detector 5920C of FIG. 59C includes a photosensitive array 5940 having a plurality of pixels. The photosensitive array 5940 is placed beneath the four linear polarizers 5922A, 5923A, 5924A, and 5925A. The pixels to the sides of each polarizer indicate the variation in optical power. In an embodiment, this variation provides an estimate of the optical power incident on the polarizers 5922A, 5923A, 5924A, and 5925A. The optical powers received through the polarizers 5922A, 5923A, 5924A, and 5925A by the photosensitive array are normalized to account for the estimated variations in incident optical power.

In an embodiment of FIG. 59D incident optical power is measured by detectors 5930 placed about the linear polarizers 5922A, 5923A, 5924A, and 5925A (e.g above, below, left and right of the linear polarizers when viewed from a position shown in FIG. 59D). As in the embodiment of FIG. 59C, interpolation of received optical power by the detectors 5930 is used to estimate the incident optical power received by linear polarizers 5922A, 5923A, 5924A, and 5925A.

In an embodiment of FIG. 59E, a polarization angle detector 5920E includes four linear polarizers 5922A, 5923A, 5924A, and 5925A placed over four photodetector elements of a 5 by 5 array of photodetectors 5962. As in the case of the collection of detectors in FIG. 59D, the detectors 5962 not covered by the linear polarizers provide information on the optical power surrounding each of the linear polarizers. Interpolation is used to estimate the level of optical power incident on each of the polarizers 5922A, 5923A, 5924A, and 5925A. The electrical die 5960 includes a substrate 5963 having an array of photodetectors 5962. The substrate 5963 is attached to the chip package by wire bonds 5965 that make electrical connection between die contacts 5964 and package contacts 5966.

In some embodiments, the linear polarizers in the polarization angle detector are made of a thin glass containing nanoparticles. An example of such a material is the Polarcor™ polarizer made by Corning Incorporated of Corning, N.Y. This type of polarizer may be diced into square sections and placed over detector elements. For example, the polarizers 5922A, 5923A, 5924A, and 5925A in FIG. 59A-FIG. 59E may be Polarcor™ polarizers. In another embodiment, illustrated in FIG. 59F, the polarizer may be a wiregrid polarizer. In an embodiment, a polarization angle sensor 5920F includes a glass substrate 5970 on which are placed lithographically constructed metal gratings having sub-wavelength spacing. In an embodiment, the metal gratings 5972, 5973, 5974, and 5975 are constructed to produce the same directions of linear polarization as the polarizers 5922A, 5923A, 5924A, and 5925A, respectively. In an embodiment, the four metal gratings are sized to fit over a quadrant detector such as the SPOT-4D detector manufactured by OSI Optronics of Hawthorne, Calif. Each of the four metal gratings is large enough to cover a corresponding photosensitive region of the quadrant detector. Regions of solid metal 5971 are placed around the collection of four gratings 5972, 5973, 5974, and 5975 and in the gaps between the metal gratings. In other embodiment, the wiregrid polarizers 5972, 5973, 5974, and 5975 are placed over other types of optical detectors.

Figure 60:
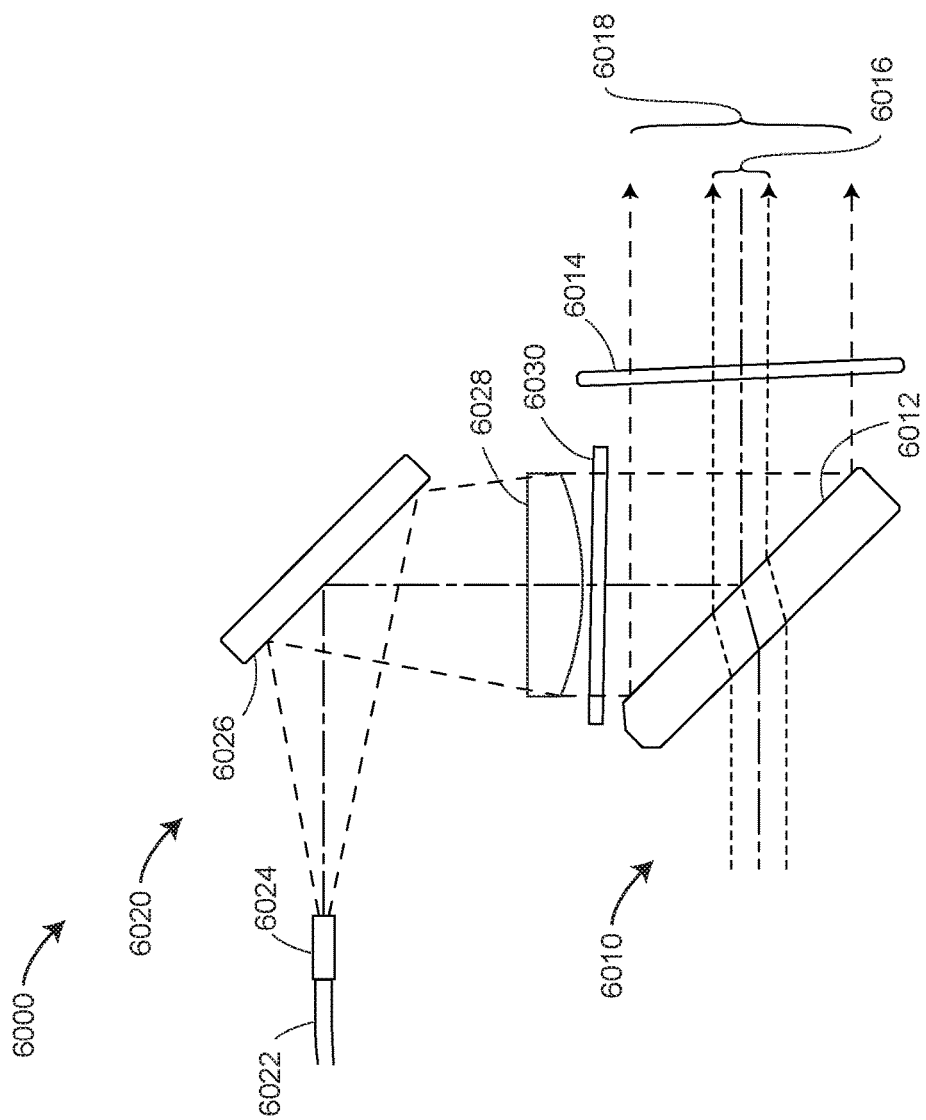
FIG. 60 is a cross-sectional representation of optical elements used to launch beams of light from a laser tracker according to an embodiment.

FIG. 60 is a cross-sectional representation of optical elements in an exemplary beam launching system 6000. In an embodiment, the beam launch that provides light used to determine orientational degrees of freedom such as pitch, roll, and yaw angles is a secondary launch used in combination with a main optics assembly used to launch a beam of light to determine three translational degrees of freedom such as x, y, and z. In a previous embodiment illustrated in FIG. 47, a secondary optics path 4730 was used to generate a beam of light having a rotating linear polarization state. In the embodiment of FIG. 60, a beam of light 6018 generated by a secondary optical path 6020 has a fixed linear polarization, which is combined with a beam of light 6016 from a main optics assembly 6010. In an embodiment, the second optical path 6020 includes an optical fiber 6022, a ferrule 6024, a mirror 6026, a lens 6028, a linear polarizer 6030, a dichroic beam splitter 6012, and an exit window 6014. In an embodiment, the optical fiber carries light produced by an LED at a wavelength of 940 nm. In an embodiment, the light is a multimode optical fiber that launches light from the ferrule 6024 in a diverging top hat pattern. Such a pattern is has a nearly flat wavefront and optical irradiance over a cylindrical cross section. In an embodiment, the launched light overfills the mirror 6026 and the lens 6028. In an embodiment, the lens 6028 is an aspheric lens configured to minimize aberrations, including spherical aberration. The aspheric lens collimates the light and sends it through the polarizer 6030, which produces linearly polarized light. In an embodiment, the linearly polarized light strikes the dichroic beam splitter 6012 in an s-polarized state and exits the laser tracker in a horizontal polarization direction. In an embodiment, the dichroic beam splitter 6012 includes a coating that reflects light at a wavelength of 940 nm but transmits red light 6016 from the main optics assembly 6010. In other embodiments, other wavelengths are used in the main and secondary optical paths. In an embodiment, the beam of light 6016 has a diameter of 8 millimeters and the beam of light 6018 has a beam diameter of 32 millimeters.

A potential limitation with the roll-measuring systems illustrated in FIGS. 59A, 59B, 59C, 59D, 59E, 59F may result if the calculated roll angle depends, not only on the polarization state of the projected light, but also on the non-uniformity of the projected beam of light received by the four polarizers. A way around this potential limitation is now described in reference to FIGS. 61-65. FIG. 61A shows, in a top view, components of a secondary optical path 6100 configured to replace the secondary optical path 4730 shown in FIG. 47. In an embodiment, light is provided alternately through optical fibers 6102A, 6102B to corresponding collimating lenses 6104A, 6104B. In an embodiment, light 6106B from the collimating lens 6104B passes through a Risley prism pair 6108B and then through a polarizing beam splitter 6112. Each Risley prism in the pair is a window of glass having a slight wedge angle. The two Risley prisms in the Risley prism pair 6108B are rotated to adjust the pointing direction of the light 6106B. In an embodiment, the light 6106B entering the polarizing beam splitter 6112 is a nearly flat-top beam having a random polarization. In an embodiment, the polarizing beam splitter transmits only the p-polarization state of the light 6106B so that the light 6106B emerges from the polarizing beam splitter 6112 polarized in the plane of the paper of FIG. 61A.

In an embodiment, light 6106A from the collimating lens 6104A passes through a Risley prism pair 6108A to adjust the pointing direction of the light 6106A. In an embodiment, the light 6106A reflects off a right-angle prism 6110 and a glass extender 6111 before it enters the polarizing beam splitter 6112, which causes the reflected light to be linearly polarized perpendicular to the polarization of the light 6106B. In an embodiment, the polarizing beam splitter 6112 reflects only the s-polarization state of the light 6106A so that the light 6106A merges from the polarizing beam splitter 6112 being polarized perpendicular to the plane of the paper of FIG. 61A. Upon exiting the polarizing beam splitter 6112, the beams of light 6106A and 6016B are together the beam of light 6114. In an embodiment, the light 6106A is turned on when the light 6106B is turned off and vice versa. Consequently the beam of light 6114 alternately changes its polarization state from a first linearly polarized state to a second linearly polarized state perpendicular to the first linearly polarized state. In an embodiment, additional polarizing elements are added to improve the extinction ratio of the undesired linear polarization state to the desired linear polarization state for each of the two polarization states in the beam of light 6114. In an embodiment, the extinction ratio is at least 40 dB. In a further embodiment, an optical detector 6113 is used to measure the optical power of the light beam 6106A transmitted by the polarizing beam splitter 6112 and the optical power of the light beam 6106B reflected by the polarizing beam splitter 6112. These optical powers are sent to the optical detector 6113 in a beam of light 6115. The optical powers in the two polarization states in the beam of light 6115 are proportional to the optical powers in the orthogonal polarization states of the beam of light 6114. Hence the optical powers received by the optical detector 6113 may be used to correct for relative differences in optical powers delivered sent through the two optical fibers 6102A and 6102B, as explained further herein below. The output of the optical detector 6113 is sent to a processor for use in calculations of the roll angle of a remote six-DOF sensor, as further described in herein below in reference to FIG. 62.

FIG. 61B shows, in a side view, the secondary optical path 6100. The beam of light 6114 travels through negative lens element 6116, reflects off mirror 6118, travels through positive lens assembly 6120, and reflects off dichroic beam splitter 6122. The dichroic beam splitter 6122 is configured to reflect light having the wavelengths of the beam of light 6114, while transmitting light having the wavelengths of beam of light 6124 arriving from the main optics path. The beams of light 6114 and 6124 are combined into a composite beam of light 6126. In an embodiment, the beam of light 6124 is red light having a wavelength of around 637 nm, while the beam of light 6114 is near-infrared light having a wavelength of around 940 nm. The composite beam of light 6126 travels to a six-DOF target. Possible embodiments of the six-DOF target elements are illustrated schematically in FIGS. 62A, 62B, 62C.

FIG. 62A shows elements on the front face of a six-DOF device 6200A such as a six-DOF tactile probe or six-DOF scanner. The elements include a body 6202, a retroreflector 6204, and a roll sensor 6205. The roll sensor 6205 includes a first sensor 6210 and a second sensor 6220. The first sensor 6210 includes a polarizer/optical filter 6212, an optical detector 6214, and electronics discussed herein below with reference to FIGS. 63A-63C. The optical filter in the polarizer/optical filter 6212 helps block out unwanted background light. In an embodiment, the optical filter is constructed as a thin film multi-layer dielectric coating placed on top of the polarizer element. The polarizer transmits linearly polarized light in a preferred direction and blocks light polarized perpendicular to the preferred direction. In an embodiment, the polarizer is a relatively thin sodium-silicate glass in which are embedded spherical ellipsoidal nanoparticles. In an embodiment, the polarizer has an extinction ratio of −50 dB at the wavelength of the light 6114 from the secondary channel of FIGS. 61A, 61B.

According to an embodiment, elements of the first sensor 6210 and the second sensor 6220 are shown in profile in FIG. 62C. A beam of light 6230 arrives at a front surface of the sensor 6240, which might be the first sensor 6210 or the second sensor 6220. The light 6230 enters a thin-film dielectric coating 6241 that blocks light except at the desired wavelength, which in an embodiment is 940 nm. The thin-film dielectric coating 6241 is applied to the polarizer 6242, which in an embodiment is a sodium-silicate glass having embedded spherical ellipsoidal nanoparticles. In an embodiment, the relatively thin polarizer element 6242 is glued on a substrate 6244 by a thin, flat glue layer 6243. The substrate 6244 is glued onto an optical detector 6246 by a thin, flat glue layer 6245. In an embodiment, to minimize reflections, the indexes of refraction of the glue layers 6243, 6245 are matched closely as possible to the indexes of refraction of the polarizer 6242, substrate 6244, and detector 6246. A wire 6248 sends the electrical signal from the optical detector 6246 to an electrical circuit in communication with a processor.

The second sensor 6220 includes a polarizer/optical filter 6222 and an optical detector 6224. In an embodiment, the polarizer transmits light that is linearly polarized at 45 degrees relative to the polarization direction of the polarizer/optical filter 6212.

FIG. 62B shows elements on the front face of a six-DOF device 6200B. The device 6200B includes a retroreflector 6204 and three roll sensors 6205A, 6205B, and 6205C, each similar to the roll sensor 6205 of FIG. 62A. In an embodiment, the roll sensors are tilted at an angle, as illustrated in FIGS. 43A, 43B, 43C. In an embodiment, the specifications for extinction ratio of the polarizer in the polarizer/optical filter 6212 are valid up to a tilt angle of 25 degrees. By providing three roll sensors 6205A, 6205B, 6205C and tilting the sensors as illustrated in FIGS. 43A, 43B, 43C, the six-DOF tactile probe is capable of operating over an extended range of tilt angles. In further embodiments, pitch/yaw sensors such as those discussed herein above may be added to the front-face of the six-DOF device, 6200A or 6200B.

Figures 63A, 63B, 63C:
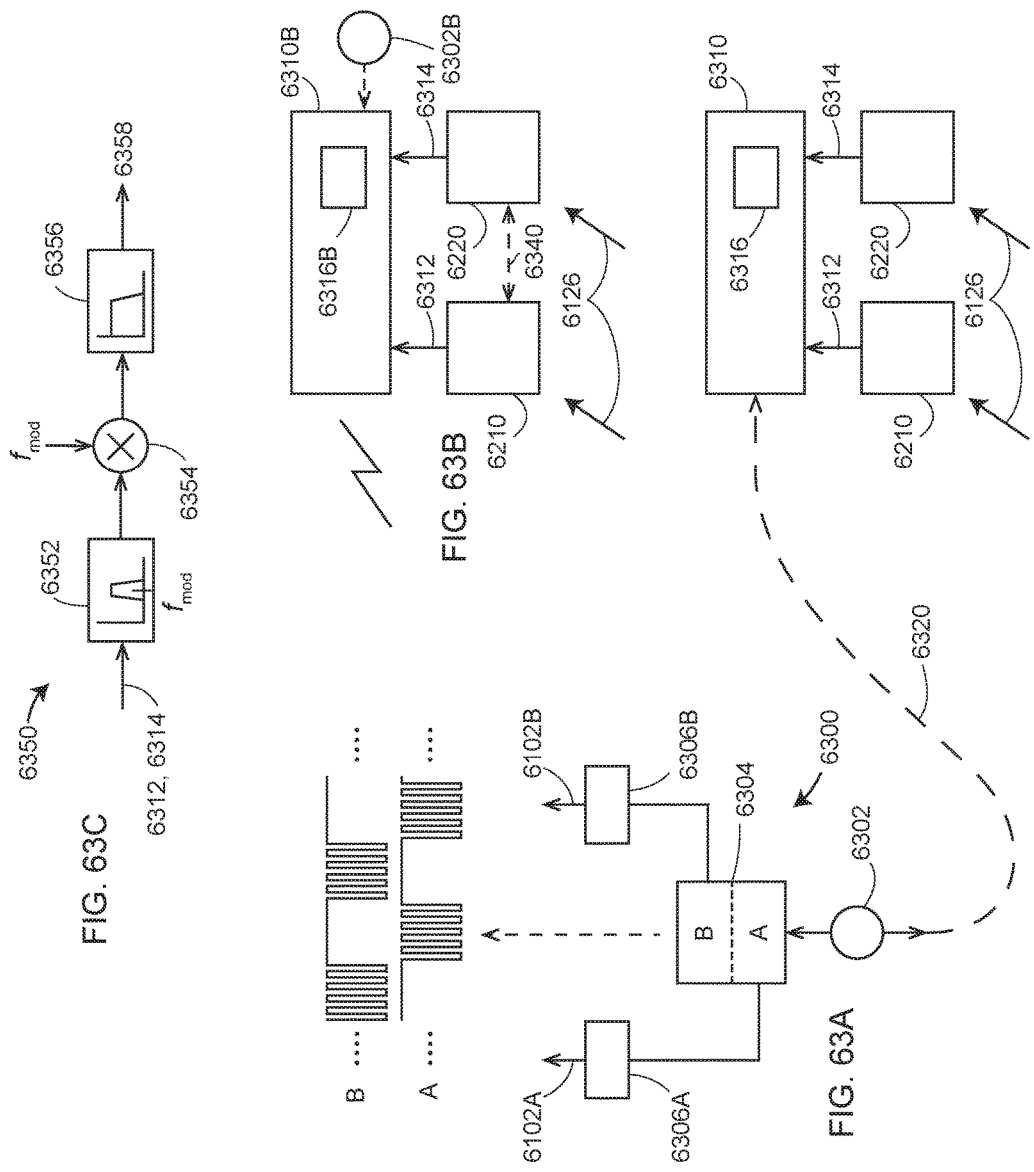
FIG. 63A is a schematic illustration of electro-optical components in a secondary optical path of a laser tracker according to an embodiment.
FIG. 63B is another embodiment of optical and electrical components in the roll sensors of a six-DOF device according to an embodiment.
FIG. 63C is a block diagram showing components of a synchronous demodulator according to an embodiment.

FIG. 63A is a block diagram showing the main elements in electro-optic system 6300. The electro-optic system 6300 includes a reference clock 6302, a modulator 6304, a first light source 6306A, and a second light source 6306B. The light sources 6306A, 6306B send modulated light to optical fibers 6102A, 6102B, respectively. The reference clock 6302 provides a stable clock signal to the modulator 6304, which has two channels A and B. The modulator 6304 provides a first modulation signal from the A channel to the first light source 6306A and a second modulation signal from the B channel to the second light source 6306B. One aspect of the A and B modulation signals is that the light source 6306B is turned off when the light source 6306A is turned on and vice versa. This alternating electrical ON-OFF modulation provides an alternating polarization state in the beam of light 6126. In an embodiment, a further modulation is provided in the modulation ON state. In the illustration of FIG. 63A, the further modulation is square-wave modulation between a maximum and a minimum value, with multiple square-wave cycles provided for each polarization state. In other embodiments, another type of modulation such as sinusoidal modulation is provided instead of square-wave modulation.

The two orthogonal polarizations of light in the light beam 6126 strike the sensors 6210, 6220, which in response send electrical signals 6312, 6314, respectively, to an electrical circuit 6310. In an embodiment, the electrical circuit 6310 includes a processor 6316 that determines the roll angle of the sensor based on methods discussed herein below with respect to FIGS. 64, 65. In an embodiment, the calculated roll angles are sent from the six-DOF device 6200A over a wired or wireless channel 6320 to the laser tracker or other device that projects the light 6126 onto the six-DOF device 6200A. In a further embodiment, the laser tracker or other device also sends the six-DOF device 6200A synchronization signals for modulation of channels A and B over the wired or wireless channel 6320. In an alternative embodiment, the electronics circuit 6316 sends signals to a processor outside the six-DOF device 6200A for determination of the roll angle of the six-DOF device 6200A.

In another embodiment illustrated in FIG. 63B, the first sensor 6210 and the second sensor 6220 rely on the received optical signals (e.g. light 6126) to reconstruct synchronization signals for modulation channels A and B. The dashed line 6340 indicates that the received optical signals provide their own synchronization. In a further embodiment, a clock 6302B is used to assist in establishing the synchronization. In an embodiment, the electronics circuit 6310B includes a processor 6316B that determines the roll angle of the sensor based on methods discussed herein below with respect to FIGS. 64, 65. In an alternative embodiment, the electronics circuit 6316B sends signals to a processor outside the six-DOF device 6200A for determination of the roll angle of the six-DOF device 6200A.

The electrical circuit 6310 or 6310B may process the received signals 6312, 6314 to reduce background light or electrical noise. Background (ambient) light will usually have a detected optical time signature that is mainly DC or that varies at twice the frequency of the electrical mains. The light 6326 on the other hand is modulated with a square wave or sine wave at a much higher frequency, for example, 1 kHz or higher. One way to exclude the unwanted background light, as well as unwanted electrical noise, is to use a digital lock-in amplifier or analog lock-in amplifier. The principles of a digital lock-in amplifier were discussed herein above. FIG. 63C shows an example of an analog lock-in amplifier 6350, also known as a synchronous demodulator. In an embodiment, electrical signals 6312, 6314 are sent to a bandpass filter 6352, which is centered at the modulation frequency $f_{mod}$ of the relatively rapid square-wave modulation shown in FIG. 63A or other modulation such as sinusoidal modulation. For example, if this modulation frequency is $f_{mod}$=8 kHz, then the modulation of the background (ambient) light, which is typically at DC or twice the line frequency will be eliminated, as will electrical noise outside the passband. The filtered electrical signal is applied to a mixer 6354 having the modulation frequency $f_{mod}$ applied to the local oscillator port of the mixer 6354, which causes the modulated signal to be down converted to DC. A low-pass filter 6356 filters unwanted high frequency signals from the mixer and provides a DC level that may be read by an analog-to-digital converter to determine a digital value 6358 corresponding to the noisier input signal 6312 or 6314.

Figure 64A:
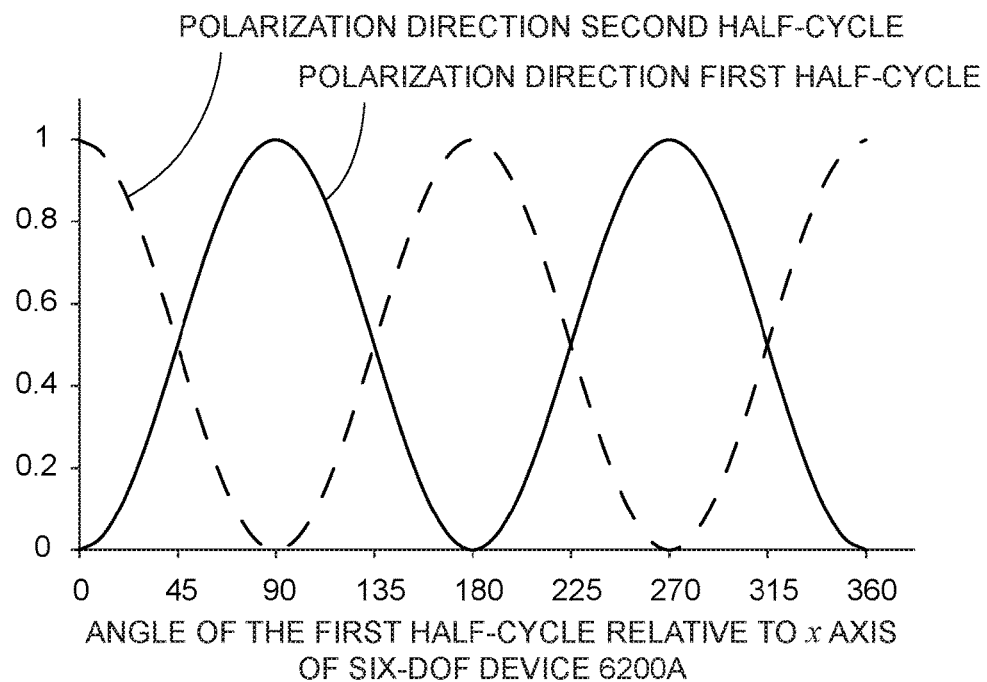
FIGS. 64A, 64B are electrical signals produced by a first roll sensor and a second roll sensor according to an embodiment.

The graph of FIG. 64A indicates on the vertical axis the optical power received by the optical detector of the second sensor 6220. The polarization state of the light 6126 alternates between two orthogonal polarization states in a first half-cycle and a second half-cycle as explained herein above. The horizontal axis of FIG. 64A indicates the angle of polarization of the light 6126 during the first half-cycle relative to the x axis (shown in FIG. 62A) of the six-DOF device 6200A. The solid line shows the detected optical power during the first half-cycle, and the dashed line shows the detected optical power during the second half-cycle. If the sensor 6220 is oriented normal to the light 6126 and the optical power of the beam of light 6126 is the same in the first and second half-cycles, then the solid and dashed lines of FIG. 64A are also the same, only shifted by 90 degrees. Furthermore the sum of the values of the solid and dashed curves is constant at all angles, here set to a normalized value of 1. This enables the roll angle of the six-DOF device to be determined from the horizontal-axis angle corresponding to the measured value of the solid line. For the sensor 6220, the horizontal-axis angle may be determined without ambiguity within a range of 90 degrees since the pattern repeats in inverted form every 90 degrees.

Figure 64B:
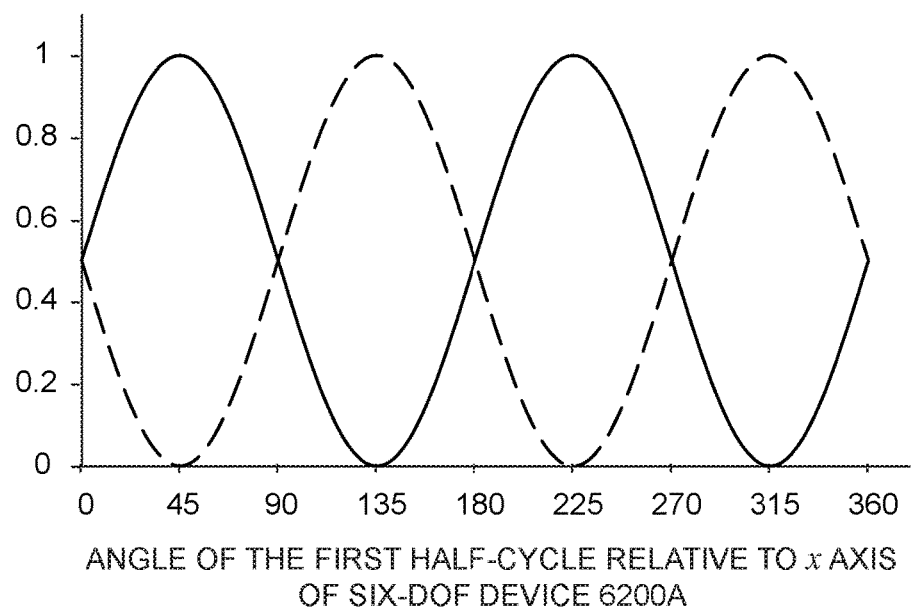

A way to extend the ambiguity in the roll angle to 180 degrees is to add a sensor 6210. The response of the sensor 6210 to the beam of light 6126 is shown in FIG. 64B. The solid and dashed curves are shifted by 45 degrees relative to the solid and dashed curves in FIG. 64A. The ambiguity near 90 degrees in FIG. 64A is removed in FIG. 64A since the solid and dashed curves are either increasing or decreasing in this range of angles.

Another advantage of using two sensors 6310, 6320 is to increase the sensitivity of the roll measurement. In FIG. 64A, the measurement of roll angle by the sensor 6220 is most sensitive near an angle of 45 degrees since this is the angle at which the level of detected optical power changes most rapidly with angle. The measurement of roll angle is least sensitive near an angle of 90 degrees since this is the angle at which the level of detected optical power changes least rapidly with angle. By adding the sensor 6210, the overall sensitivity is improved since this sensor is most sensitive near 45 degrees and least sensitive near 90 degrees.

A potential problem may occur if the optical power in the first half-cycle is different than the optical power in the second half-cycle. In an embodiment, this potential problem is corrected by measuring the optical power in the first and second half-cycles with the optical detector 6113 in FIG. 61A. The optical powers detected by the optical detector 6113 in the first and second half-cycles are proportional to the corresponding optical powers in the first and second half cycles of the first and second half cycles of the beam of light 6126 at the desired wavelength. By measuring the optical powers at the desired wavelength in the first and second half cycles of the beam of light 6126 as it leaves the tracker (or similar device), the proportionality constant may be determined for the first and second half cycles. In an embodiment, the powers measured by the optical detector 6113 in the first and second half-cycles are multiplied by the determined proportionality constants to obtain the optical power of the beam of light 6126 in the first and second half cycles (at the desired wavelength).

Figure 65B:
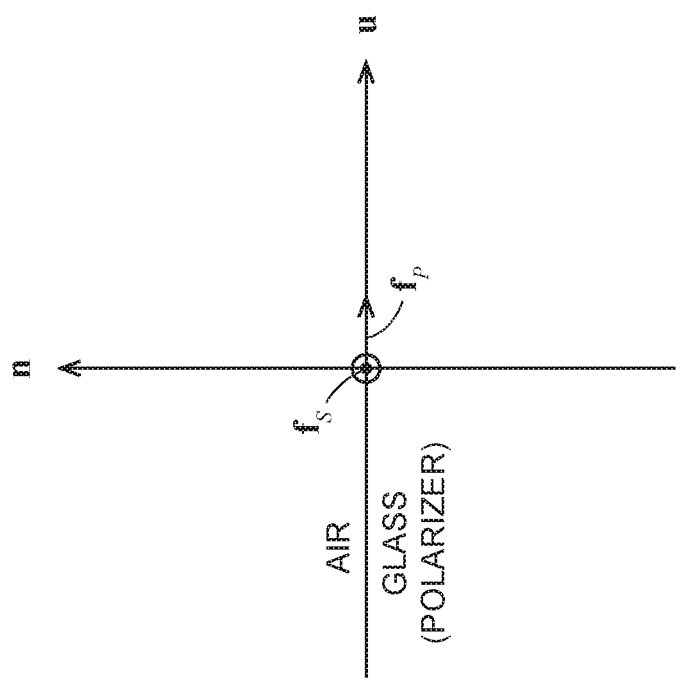
FIG. 65B shows two directions of polarizations of a polarizer at a plane of incidence at an air-polarizer interface.
Figure 65A:
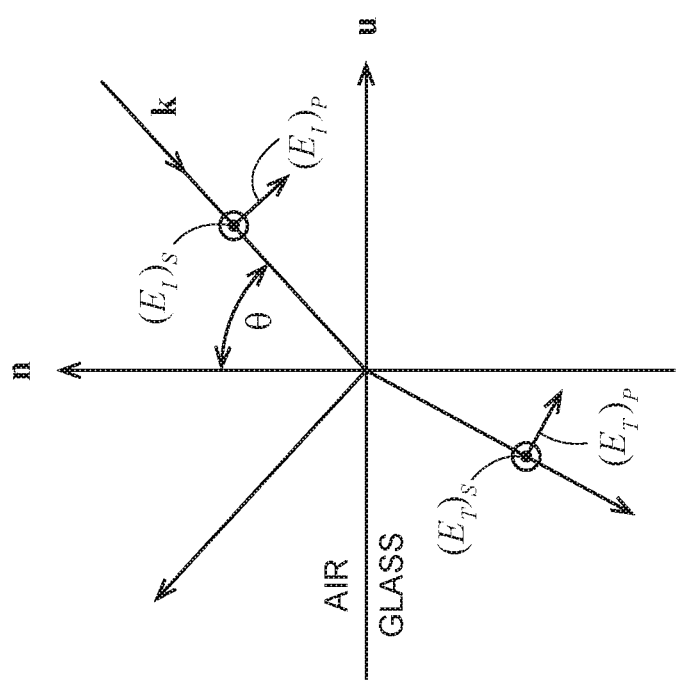
FIG. 65A illustrates s- and p-polarizations of incident and transmitted light at an air-glass interface.

In general, the six-DOF device 6200A may vary in roll, pitch, and yaw angles. A method for accounting for the effects of pitch and yaw angles on the determined roll angle is now discussed. FIG. 65A shows the interface between air and glass, with the interface between the air and the glass having a normal unit vector n. Light arrives in a direction given by a propagation unit vector k. The vectors n and k define a plane of incidence that intersects the air-glass interface in a unit vector u.

The amount of light reflected and transmitted through an interface depends on whether the light is in an s-polarization state or a p-polarization state. FIG. 65A shows that the incident electric field $E_I$ has an s-polarized component $(E_I)_S$ perpendicular to the plane of incidence and a p-polarized component $(E_I)_P$ perpendicular to the s-polarized component and to the propagation unit vector k. The s- and p-polarized components for the transmitted light $E_T$ is defined in an analogous way. The amount of p-polarized light transmitted into the glass is given by $(E_T)_P = T_P \cdot (E_I)_P$ and the amount of s-polarized light transmitted into the glass is $(E_T)_S = T_S \cdot (E_I)_S$, where $T_P$ and $T_S$ are transmission coefficients for s- and p-polarized light at this air-glass interface. These equations assume that the glass does not have a preferred polarization direction. For the case in which the glass is a polarizer, as shown in FIG. 65B, we need to decompose the unit vector for the direction of polarization f into its component parts along the s- and p-directions as $f_S$ and $f_P$. The fraction of the incident s-polarized light that aligns with $f_S$ passes into the polarizer after applying the formula $(E_T)_S = T_S \cdot (E_I)_S$. The fraction of the incident p-polarized light that lies in the plane of incidence (that also contains $f_P$) passes into the polarizer after applying the formula $(E_T)_P = T_P \cdot (E_I)_P$.

In an embodiment, for the generally complicated geometry of the sensor 6240 as illustrated in FIG. 62C, the transmission coefficients $T_S$, $T_P$ are experimentally determined as a function of the angle θ of the propagation unit vector k relative to the unit vector n. These transmission coefficients are determined as a function of θ for both the direction of polarization of the polarizer (such as the polarizer 6212, 6222) and the direction perpendicular to the polarization of the polarizer.

In an embodiment, the pitch and yaw angles are provided by a pitch/yaw sensor. These angles are provided to the processor 6316 or to an external processor configured to determine the roll angle of the six-DOF device 6200A. The pitch and yaw angles determine the angle θ in FIG. 65A. The processor extracts the transmission coefficients $T_S(\theta)$ and $T_P(\theta)$ from a look-up table or formula based on previous experimental results as discussed herein above. In an embodiment, an assumed initial roll angle is used to obtain the components of the polarization of the sensor 6210, 6220 that lie in the s- and p-directions. These polarization components are applied to the corresponding transmission equations to obtain the resulting optical power received by each of the sensors 6210, 6220 for each of the polarization states in the first and second half-cycles. An optimization routine is performed to iteratively adjust the roll angle to match the observed powers to the calculated powers as well as possible. The final roll angle obtained by the iteration is included with the pitch and yaw angles measured by a pitch/yaw sensor and with the three translational coordinates of the retroreflector measured by the laser tracker (or similar device) to obtain the full six degrees-of-freedom of a six-DOF probe such as 6200A or 6200B.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system comprising:
a dimensional measuring device having a light projecting unit, a steering unit, and a tracking unit, the light projecting unit configured to project a first beam of light having a first wavelength and a second beam of light having a second wavelength, the second beam of light being collinear with the first beam of light, the tracking unit configured to steer the first beam of light to a retroreflector;
a remote probe having the retroreflector, a pitch/yaw sensor, and a body, the retroreflector and the pitch/yaw sensor coupled to the body, the pitch/yaw sensor including an aperture, a lens, and a position sensor, the pitch/yaw sensor configured to receive a first portion of the second beam of light through the aperture and to pass the first portion through the lens onto the position sensor, the position sensor being a first optical detector configured to produce a first electrical signal indicative of position of received light on the detector; and
a processor configured to determine a pitch angle and a yaw angle based at least in part on the first electrical signal.

2. The system of claim 1 wherein the dimensional measuring device is further configured to measure a distance, a first angle, and a second angle from the dimensional measuring device to the retroreflector.

3. The system of claim 2 wherein the remote probe further comprises a roll sensor, the roll sensor configured to measure a roll angle of the remote probe.

4. The system of claim 1 wherein the remote probe includes a plurality of pitch/yaw sensors.

5. The system of claim 4 wherein each of the plurality of pitch/yaw sensors and angled in a direction of the retroreflector.

6. The system of claim 1 wherein the position sensor is selected from the group consisting of: a lateral effect detector, a quadrant detector, and a photosensitive array.

7. The system of claim 1 wherein the second beam of light is produced by a light emitting diode (LED).

8. The system of claim 1 wherein the dimensional measuring device is further configured to modulate the second beam of light and the remote probe is further configured to demodulate the second beam of light.

9. The system of claim 8 wherein the remote probe is configured to remove ambient background light by demodulating the second beam of light.

10. The system of claim 3 wherein:
the dimensional measuring device is further configured to generate the second beam of light with a rotating, linear polarization; and
the roll sensor further includes a polarizer, a second optical detector, and an electrical circuit, the second optical detector being configured to send a plurality of electrical signals to the electrical circuit, the electrical circuit configured to determine the roll angle of the remote probe based at least in part on the plurality of electrical signals.

11. The system of claim 1 wherein:
the retroreflector is made of glass; and
the remote probe further includes a beam splitter, the beam splitter configured to produce a virtual image of a cube-corner vertex at the aperture.

12. The system of claim 1 wherein:
the remote probe further includes a light source coupled to the body;
the dimensional measuring device further includes a camera having a camera lens and a photosensitive array, the camera configured to capture a first image of the light source; and
the processor is further configured to determine a roll angle based at least in part on the first image.

13. The system of claim 3 wherein:
the dimensional measuring device is further configured to generate the second beam of light with linearly polarized light;
the remote probe further includes a first sub-sensor, a second sub-sensor, a third sub-sensor, and a fourth sub-sensor, the first sub-sensor having a second optical detector configured to receive light through a first linear polarizer and to generate a first roll electrical signal in response, the second sub-sensor having a third optical detector configured to receive light through a second linear polarizer and to generate a second roll electrical signal in response, the third sub-sensor having a fourth optical detector configured to receive light through a third linear polarizer and to generate a third roll electrical signal in response, the fourth sub-sensor having a fifth optical detector configured to receive light through a fourth linear polarizer and to generate a fourth roll electrical signal in response, the first linear polarizer, the second linear polarizer, the third linear polarizer, and the fourth linear polarizer each having a different polarization direction; and
the processor is further configured to determine the roll angle of the remote probe based at least in part on the first roll electrical signal, the second roll electrical signal, the third roll electrical signal, and the fourth roll electrical signal.

14. The system of claim 3 wherein:
the dimensional measuring device is further configured to generate the second beam of light having a first linear polarization direction in a first time interval and a second linear polarization direction in a second time interval;
the remote probe further includes a first optical detector configured to receive light through a first linear polar-
izer and to generate a first roll electrical signal in response, the first linear polarizer having a first probe direction; and
the processor is further configured to determine the roll angle of the remote probe based at least in part on the first roll electrical signal, the first linear polarization direction, the second linear polarization direction, and the first probe direction.

15. The system of claim 14 wherein:
the remote probe further includes a second optical detector configured to receive light through a second linear polarizer and to generate a second roll electrical signal in response, the second linear polarizer having a second probe direction different than the first probe direction; and
the processor is further configured to determine the roll angle of the remote probe based on the second roll electrical signal, the first linear polarization direction, the second linear polarization direction, and the second probe direction.

16. A method comprising:
providing a dimensional measuring device, a remote probe, and a processor, the dimensional measuring device configured to project a first beam of light having a first wavelength and a second beam of light having a second wavelength, the second beam of light being collinear to the first beam of light, the remote probe having a body coupled to a retroreflector and a pitch/yaw sensor, the pitch/yaw sensor having an aperture, a lens and an position sensor, the position sensor being a first optical detector configured to produce an electrical signal indicative of position of received light on the first optical detector;
projecting the first beam of light onto the retroreflector and the second beam of light onto the pitch/yaw sensor;
passing a portion of the second beam of light through the aperture and the lens onto the position sensor and generating a first electrical signal in response; and
determining with the processor a pitch angle and a yaw angle of the remote probe based at least in part on the first electrical signal.

17. The method of claim 16 further comprising: measuring with the dimensional measuring device a distance, a first angle, and a second angle from the dimensional measuring device to the retroreflector.

18. The method of claim 17 further comprising:
providing the dimensional measuring device with a camera having a camera lens and a photosensitive array;
providing the remote probe with a first light source;
capturing the first light source with the camera to obtain a first image; and
determining with the processor a roll angle of the remote probe based at least in part on the first image.

19. The method of claim 17 further comprising:
providing the dimensional measuring device configured to provide a time-varying linear polarization to the second beam of light;
providing the dimensional measuring device with a roll sensor, the roll sensor including a linear polarizer and a second optical detector;
projecting the second beam of light through the linear polarizer and the second optical detector of the roll sensor to obtain a first roll electrical signal in response; and determining with the processor a roll angle of the remote probe based at least in part on the time-varying linear polarization of the second beam of light and the first roll electrical signal.

20. The method of claim 19 further wherein: the time-varying linear polarization of the second beam of light is selected from the group consisting of: a rotating linear polarization and two alternating orthogonal polarizations.

\* \* \* \* \*